US012793911B2

(12) United States Patent
Park

(10) Patent No.: US 12,793,911 B2
(45) Date of Patent: Nov. 10, 2026

(54) BACKGROUND LIGHTING DEVICE FOR ELECTROSTATIC BUTTON AND METHOD FOR CONTROLLING SAME

(71) Applicant: KORTEK CORPORATION, Incheon (KR)

(72) Inventor: Sung Jun Park, Incheon (KR)

(73) Assignee: KORTEK CORPORATION, Incheon (KR)

( * ) Notice: Subject to any disclaimer, the term of this patent is extended or adjusted under 35 U.S.C. 154(b) by 18 days.

(21) Appl. No.: 18/705,627

(22) PCT Filed: Sep. 1, 2022

(86) PCT No.: PCT/KR2022/013137
§ 371 (c)(1),
(2) Date: May 6, 2024

(87) PCT Pub. No.: WO2023/075119
PCT Pub. Date: May 4, 2023

(65) Prior Publication Data
US 2025/0372322 A1 Dec. 4, 2025

(30) Foreign Application Priority Data
Nov. 1, 2021 (KR) ........................ 10-2021-0147788

(51) Int. Cl.
*G06F 3/039* (2013.01)
*H01H 13/52* (2006.01)

(52) U.S. Cl.
CPC ........... *H01H 13/52* (2013.01); *G06F 3/0393* (2019.05)

(58) Field of Classification Search
CPC ........................ G06F 3/04162; H01H 13/705
See application file for complete search history.

(56) References Cited

U.S. PATENT DOCUMENTS

2008/0266270 A1* 10/2008 Nakamura ......... H03K 17/9622 345/173
2012/0162268 A1* 6/2012 Fleck .................... G02F 1/1336 345/102
2020/0073513 A1 3/2020 Ballan et al.
2021/0033776 A1* 2/2021 Harkema ............. G02B 6/0068
2023/0099860 A1* 3/2023 Souloumiac ......... G02B 6/0045 362/23.03

FOREIGN PATENT DOCUMENTS

JP 2011-233004 A 11/2011
KR 10-1015711 B1 2/2011
KR 10-2012-0111197 A 10/2012
KR 102017637 B1 9/2019
KR 10-2142525 B1 8/2020
KR 10-2021-0051360 A 5/2021

OTHER PUBLICATIONS

International Search Report for PCT/KR2022/013137 mailed on Dec. 16, 2022.

* cited by examiner

*Primary Examiner* — Kevin M Nguyen
(74) *Attorney, Agent, or Firm* — Schmeiser Olsen PLLC

(57) ABSTRACT

A background lighting device for an electrostatic button is provided, the background lighting device including: a substrate formed in a shape corresponding to an outer shape of the electrostatic button; a plurality of light sources attached at predetermined intervals onto the substrate; and a cable connected to the substrate to provide a signal for applying power to the plurality of light sources and driving the same.

11 Claims, 49 Drawing Sheets

BACKGROUND LIGHTING DEVICE FOR ELECTROSTATIC BUTTON AND METHOD FOR CONTROLLING SAME

CROSS-REFERENCE TO RELATED APPLICATIONS

This application is a national stage of PCT Application No. PCT/KR2022/013137, having a filing date of Sep. 1, 2022, claiming priority to KR Application No. 10-2021-0147788, having a filing date of Nov. 1, 2021, the entire both contents of which are hereby incorporated by reference.

FIELD OF TECHNOLOGY

The following relates to a background lighting device for an electrostatic button and a method of controlling the same, and more particularly, to a background lighting device for an electrostatic button and a method of controlling the same that, even when a lighting and a power device are not installed in an electrostatic button that is attachable to and detachable from a surface of a touchscreen of a computing device using the touchscreen, such as a game machine, allow a background of the electrostatic button to be adaptively illuminated according to a situation in response to an operation of the electrostatic button or a game event.

BACKGROUND

Generally, a display unit is installed at an electronic device. A button device is fixed to the display unit. The display unit includes a circuit board, a touch panel, and a glass portion, and the button device is connected to the circuit board by a wire. Touch-detecting lines are arranged to cross each other in the horizontal direction and the vertical direction on the touch panel. Also, the button device is fixed to an upper side of the glass portion (a glass portion of the touch panel) by a screw or a latch portion. As a signal of a push button portion is input to the circuit board, a specific function of the electronic device is selected.

However, in the conventional electronic device, since a wire-passing hole or a button-mounting hole is formed in the glass portion to connect the button device to the circuit board by the wire, stiffness of the glass portion may decrease. Also, when an impact or external force is applied to the glass portion, a crack may be formed around the wire-passing hole or the button-mounting hole.

Also, in a case where the thickness of the glass portion is increased to reinforce the stiffness of the glass portion, manufacturing costs of the glass portion may increase, and touch sensitivity of the glass portion may decrease.

Also, in a case where external moisture enters the display unit through the wire-passing hole or the button-mounting hole of the glass portion, failure of or damage to the display unit may occur.

Also, since the button device is fixed to the glass portion by the screw or latch portion, an installation structure of the button device may become complex, and manufacturing costs thereof may increase.

Also, in a case where the glass portion or the button device is disassembled or assembled, the screw or latch portion should be released, the button device should be entirely separated from the glass portion, and then the glass portion or the button device should be disassembled. Accordingly, the time taken to disassemble or assemble the glass portion or the button device and repair costs thereof may significantly increase.

Meanwhile, the touch panel is an input device that may be operated by a user directly touching a display screen and touching the corresponding point where the user wants to make an input.

Types of touch panels include a capacitive touch panel, a resistive touch panel, an infrared touch panel, an acoustic wave touch panel, a pressure touch panel, and the like according to an operational method. Initially, resistive touch panels that are operated by a pressing force were mainly used, but nowadays, capacitive touch panels are mainly used. Numerous computing devices (for example, a small game machine, a large game machine of a casino, a laptop, a smartphone, a smart pad, and the like) that use a touchscreen to which a capacitive touch panel is applied (that is, the touchscreen is made of a display panel and a touch panel glass portion) have been launched.

However, in a case where a user directly touches a touchscreen (that is, the touch panel glass portion) to control a computing device (for example, the user touches a touchscreen of a game machine with his or her finger to control the game machine), there are problems in that a portion of the touchscreen in contact with the finger may be contaminated, and a haptic feeling is not good due to the absence of a feeling of actually pressing a button. Also, there is a problem in that it is difficult to make an input while wearing a glove.

Accordingly, there is a need for a button that can be easily attached to and detached from a surface of a touchscreen and allows a user to have a haptic feeling without directly touching the touchscreen with his or her finger (hereinafter, in embodiments described herein, the button may be referred to as an electronic device button device or an electrostatic button).

Further, since a separate lighting device is not embedded in the button (that is, an electronic device button device or an electrostatic button), there is a problem in that a visual input effect cannot be expected. Accordingly, a lighting technology that allows a visual input effect to be felt without a lighting and a power device being directly installed in the button (that is, an electronic device button device or an electrostatic button) is necessary.

The conventional art is disclosed in Korean Patent Registration No. 10-1015711 (Date of Registration: Feb. 10, 2011, “Button adapter kit for touchscreen”).

SUMMARY

An aspect relates to a background lighting device for an electrostatic button and a method of controlling the same that, even when a lighting and a power device are not installed in an electrostatic button that is attachable to and detachable from a surface of a touchscreen of a computing device using the touchscreen, such as a game machine, allow a background of the electrostatic button to be adaptively illuminated according to a situation in response to an operation of the electrostatic button or a game event.

One aspect of embodiments of the present invention provide a background lighting device for an electrostatic button, the background lighting device including: a substrate formed in a shape corresponding to an outer shape of the electrostatic button; a plurality of light sources attached at predetermined intervals onto the substrate; and a cable connected to the substrate to provide a signal for applying power to the plurality of light sources and driving the same.

Another aspect of embodiments of the present invention provide a method of controlling a background lighting device for an electrostatic button, the method including: by a controller of the background lighting device for the electrostatic button, detecting an input on the electrostatic button; by the controller, operating a button background lighting unit in a predetermined color or a predetermined pattern based on data prestored in a storage unit, in response to the input on the electrostatic button being detected; and by the controller, stopping the operation of the button background lighting unit that is being operated in the predetermined color or the predetermined pattern, in response to a release of the input on the electrostatic button being detected.

According to a further aspect of embodiments of the present invention, even when a lighting and a power device are not installed in an electrostatic button that is attachable to and detachable from a surface of a touchscreen of a computing device using the touchscreen, such as a game machine, a background of the electrostatic button can be adaptively illuminated according to a situation in response to an operation of the electrostatic button or a game event.

BRIEF DESCRIPTION

Some of the embodiments will be described in detail, with references to the following Figures, wherein like designations denote like members, wherein.

DETAILED DESCRIPTION

Figure 1:
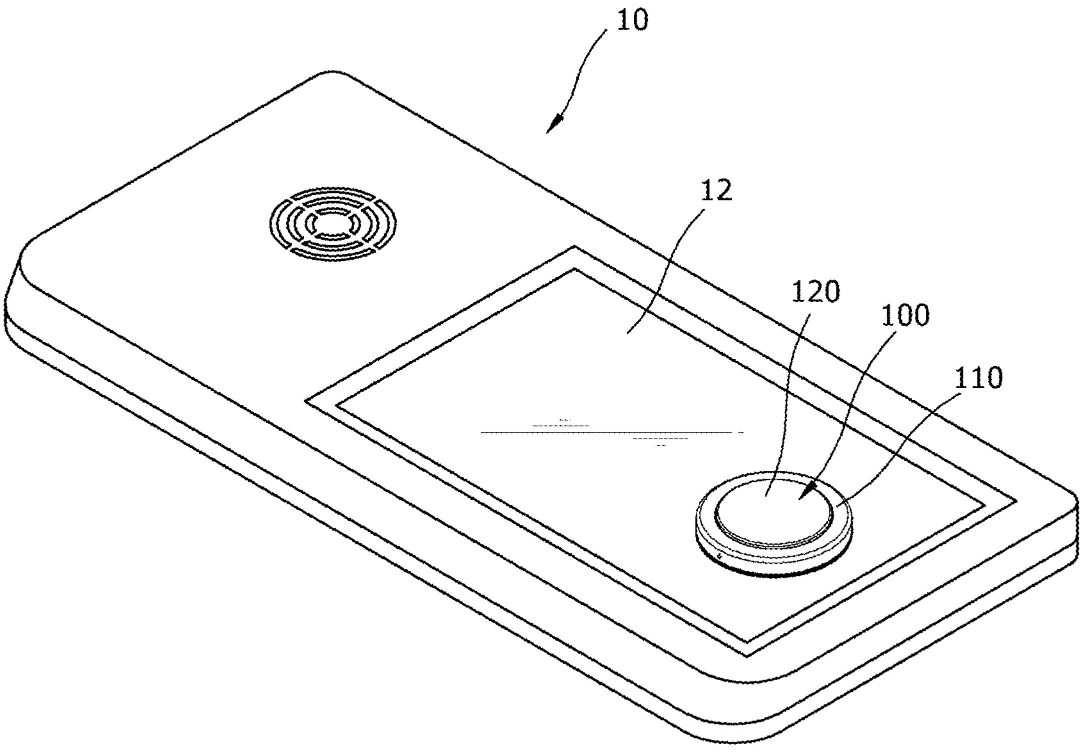
FIG. 1 shows a perspective view illustrating a state wherein an electronic device button device according to a first embodiment of the present invention is adhered to a touch panel unit.

Hereinafter, a background lighting device for an electrostatic button and a method of controlling the same according to embodiments of the present invention will be described with reference to the accompanying drawings.

In this process, thicknesses of lines or sizes of components illustrated in the drawings may be exaggerated for clarity and convenience of description. Also, terms used below are terms defined in consideration of functions in embodiments of the present invention and may be changed according to an intention or customary practice of a user or an operator. Therefore, such terms should be defined based on the content throughout the present specification.

Figure 2:
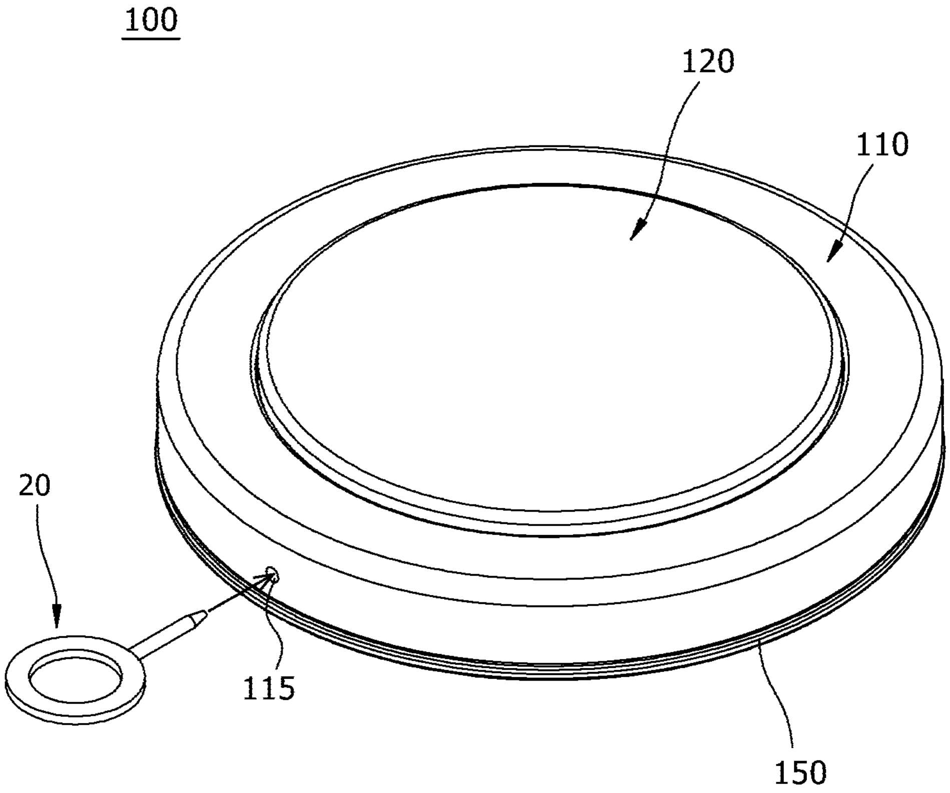
FIG. 2 shows a perspective view illustrating the electronic device button device according to the first embodiment of the present invention.
Figure 3:
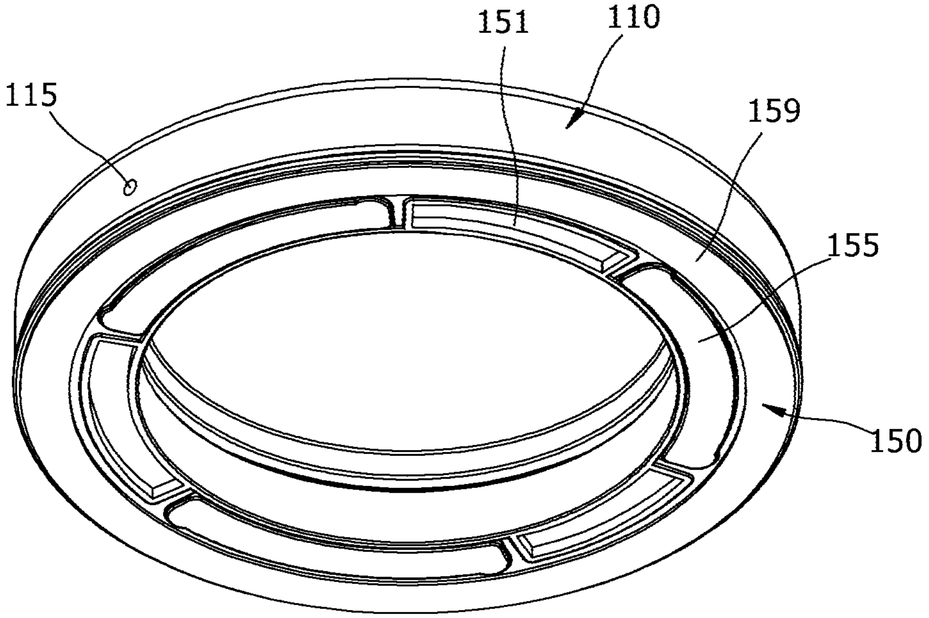
FIG. 3 shows a perspective view illustrating a lower side of the electronic device button device according to the first embodiment of the present invention.
Figure 4:
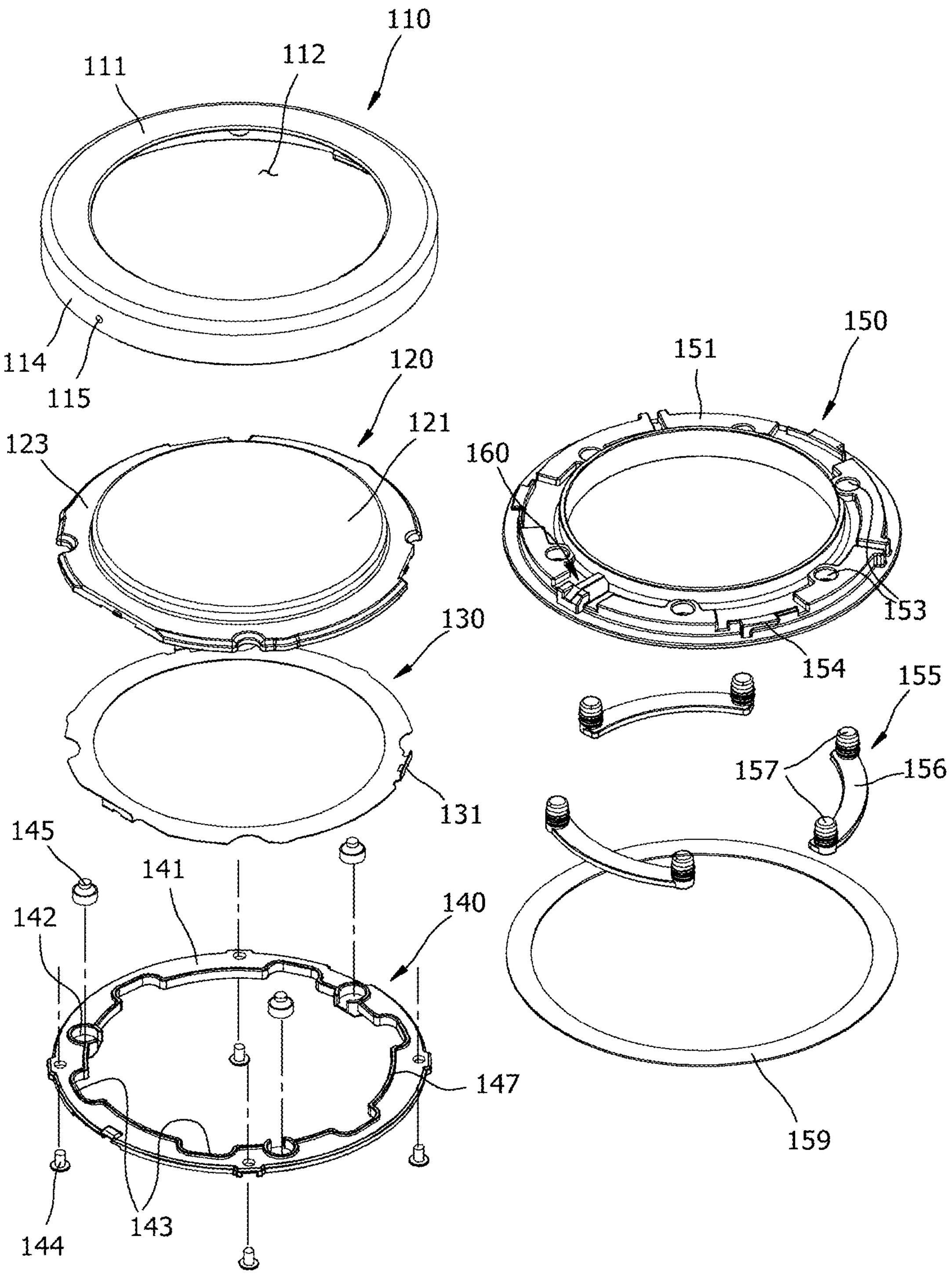
FIG. 4 shows an exploded perspective view illustrating the electronic device button device according to the first embodiment of the present invention.
Figure 5:
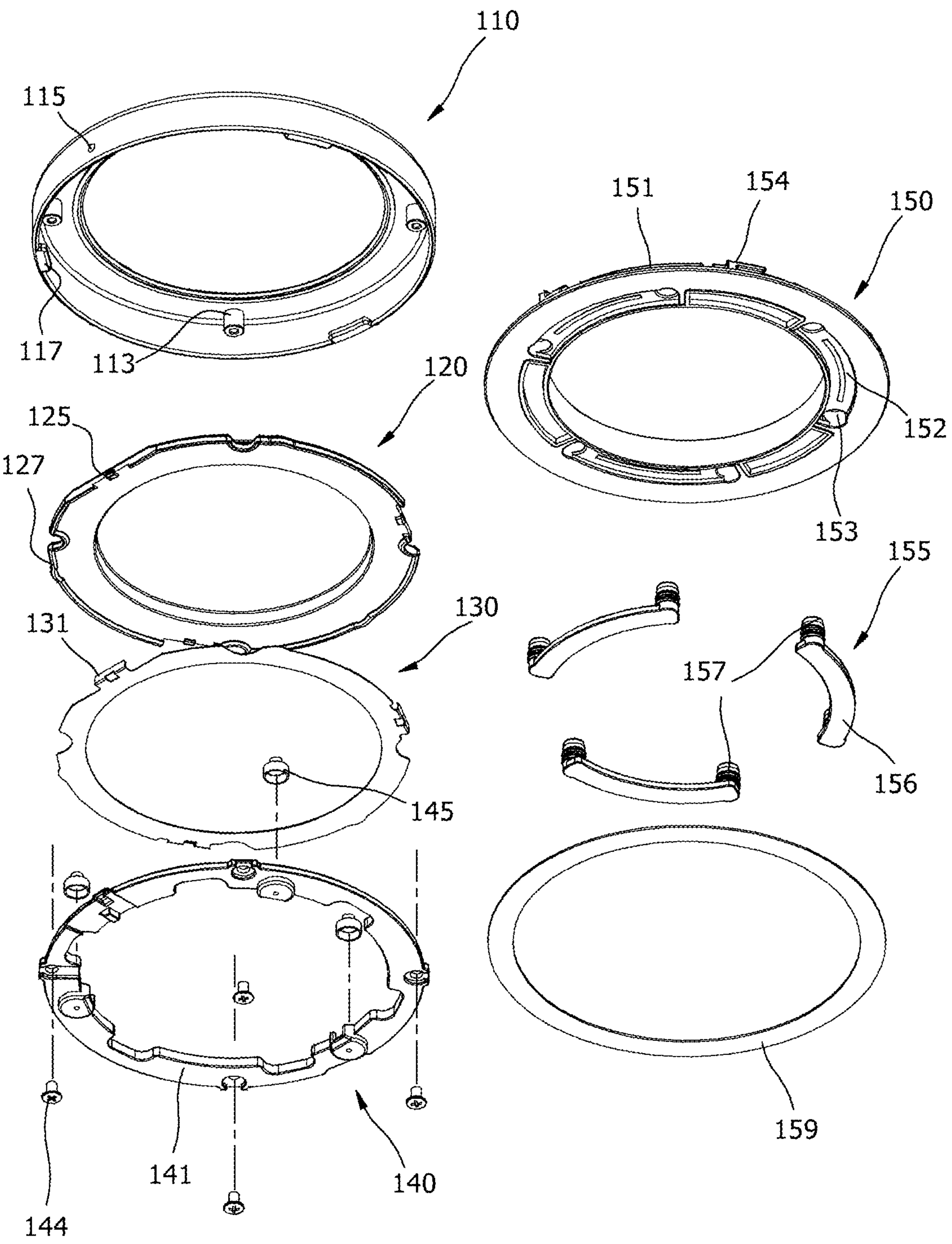
FIG. 5 shows an exploded perspective view illustrating the lower side of the electronic device button device according to the first embodiment of the present invention.
Figure 6:
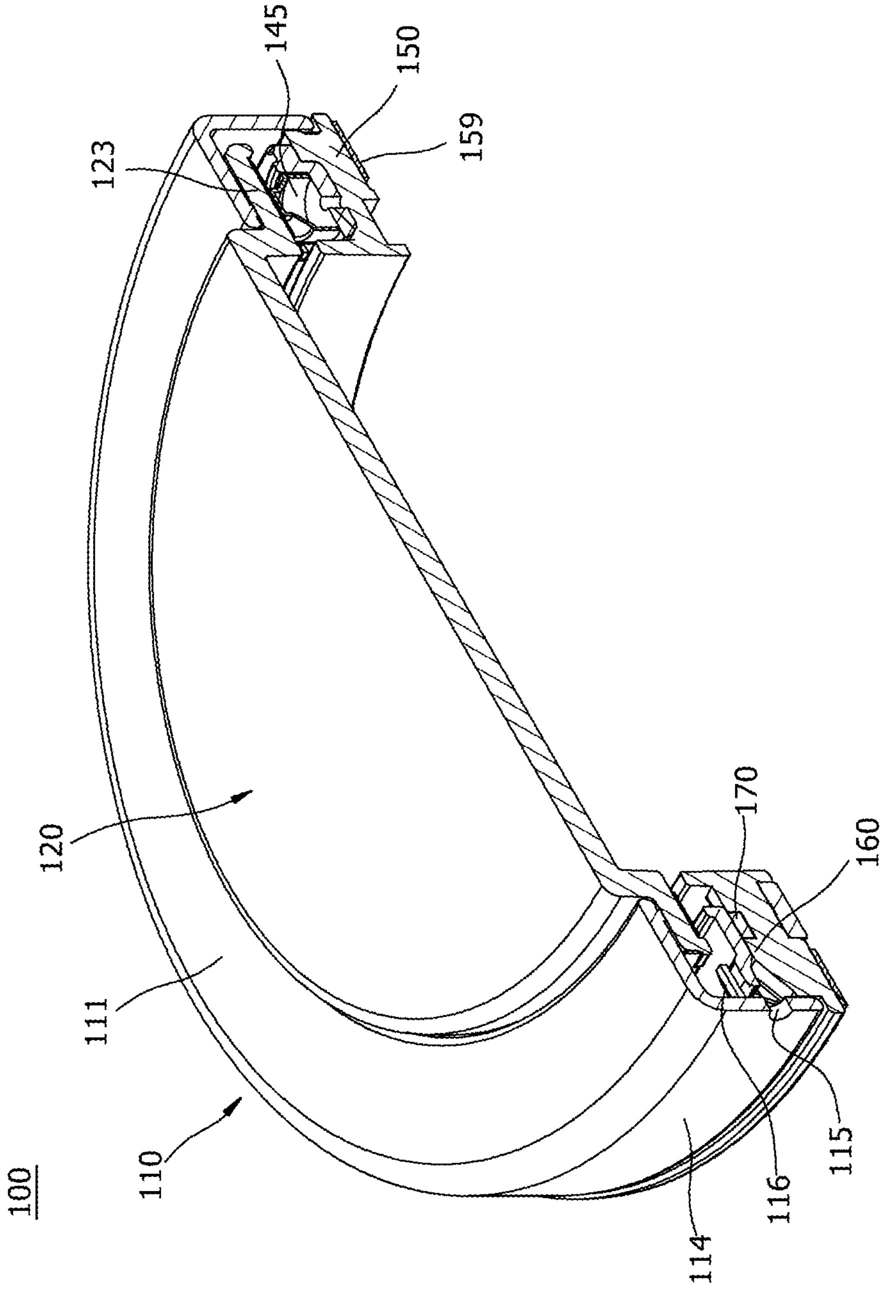
FIG. 6 shows a cross-sectional perspective view illustrating the electronic device button device according to the first embodiment of the present invention.

FIG. 1 is a perspective view illustrating a state wherein an electronic device button device according to a first embodiment of the present invention is adhered to a touch panel unit, FIG. 2 is a perspective view illustrating the electronic device button device according to the first embodiment of the present invention, FIG. 3 is a perspective view illustrating a lower side of the electronic device button device according to the first embodiment of the present invention, FIG. 4 is an exploded perspective view illustrating the electronic device button device according to the first embodiment of the present invention, FIG. 5 is an exploded perspective view illustrating the lower side of the electronic device button device according to the first embodiment of the present invention, and FIG. 6 is a cross-sectional perspective view illustrating the electronic device button device according to the first embodiment of the present invention.

Referring to FIGS. 1 to 6, an electronic device button device 100 according to the first embodiment of the present invention includes a frame unit 110, a button unit 120, an inner conductive unit 130, a support unit 140, and an adhesive conductive unit 150. Examples of an electronic device 10 according to the first embodiment of the present invention may include various devices such as a casino machine and a game machine.

A touch panel unit 12 is installed on the electronic device 10. The touch panel unit 12 includes a circuit board (not illustrated), a touch film portion 14 laminated on the circuit board, and a glass portion 13 laminated on the touch film portion 14. A liquid crystal display portion (not illustrated) and a controller (not illustrated) are included in the circuit board. Touch-detecting lines (not illustrated) are arranged to cross each other in the vertical and horizontal directions on the touch film portion 14. The glass portion 13 may be formed of a transparent glass material or a synthetic resin material.

The frame unit 110 includes a conductive material. Here, the frame unit 110 may be formed of the conductive material as a whole or have a plating layer formed on a surface of a synthetic resin. Since the frame unit 110 includes the conductive material, capacitance of the frame unit 110 may increase. The capacitance increases proportionally to an area of the frame unit 110 and a dielectric constant of the conductive material. The frame unit 110 may be formed as an annular frame, an elliptical frame, or a frame having a shape similar thereto as a whole.

The button unit 120 is movably coupled to the frame unit 110. The button unit 120 may be formed in an identical or similar shape to the frame unit 110. The button unit 120 may be formed of a synthetic resin material.

The inner conductive unit 130 is disposed at the button unit 120 to be moved together with the button unit 120 and receives electrostatic energy caused by the capacitance of the frame unit 110. The inner conductive unit 130 is disposed at a lower side of the frame unit 110 to be invisible from the outside. The inner conductive unit 130 may be formed in an identical or similar shape to the frame unit 110. Also, the inner conductive unit 130 may be formed of a conductive material as a whole or manufactured in a form wherein a conductive powder is mixed with a synthetic resin material such as silicone. An outer side surface of the inner conductive unit 130 may be installed to be spaced about 1 mm to 3 mm from an inner side surface of a circumferential portion of the frame unit 110.

The support unit 140 is coupled to the frame unit 110 to elastically support the button unit 120. The support unit 140 may be formed of a flexible synthetic resin material. The support unit 140 may be formed as an annular frame, an elliptical frame, or a frame having a shape similar thereto as a whole.

The adhesive conductive unit 150 is coupled to the frame unit 110, is adhered to the touch panel unit 12, and comes in contact with the inner conductive unit 130 to transfer the electrostatic energy of the inner conductive unit 130 to the touch panel unit 12 during movement of the button unit 120. As the adhesive conductive unit 150 is adhered to the touch panel unit 12, and the button unit 120 is moved to a lower side due to an external force, the electrostatic energy caused by the capacitance is transferred to the touch film portion 14 of the touch panel unit 12 through the frame unit 110, the inner conductive unit 130, and the adhesive conductive unit 150. Therefore, a function of the electronic device 10 may be input and selected as a user operates the electronic device button device 100.

Since the adhesive conductive unit 150 is adhered to the touch panel unit 12, it is not necessary to form a wire-passing hole or a button-mounting hole in the glass portion 13. Therefore, a decrease in stiffness of the glass portion 13 may be prevented, and formation of cracks in the glass portion 13 due to an impact or external force may be prevented. Also, since it is not necessary to increase a thickness of the glass portion 13 to reinforce the stiffness of the glass portion 13, manufacturing costs of the glass portion 13 may be decreased, and touch sensitivity may be improved due to a decrease in the thickness of the glass portion 13.

Also, since external moisture is prevented from entering the glass portion 13, failure of or damage to the touch panel unit 12 or the electronic device 10 may be prevented.

Also, since it is not necessary to install a separate screw or latch portion to fix the button device 100 to the touch panel unit 12, an installation structure of the button device 100 may be simplified, and manufacturing costs thereof may be significantly decreased. Further, since it is not necessary to release a screw or latch portion when disassembling or assembling the glass portion 13 or the button device 100, the time taken to disassemble or assemble the glass portion 13 or the button device 100 and repair costs thereof may be significantly decreased.

The button unit 120 includes a button body portion 121 and a button flange portion 123. The button body portion 121 is inserted into a frame hole portion 112 of the frame unit 110. The button flange portion 123 is formed at a circumferential portion of the button body portion 121 to be caught on the frame unit 110, and the inner conductive unit 130 is disposed at the button flange portion 123. Since the button flange portion 123 is formed in an annular shape to be caught on a frame flange portion 114, the button unit 120 may be prevented from being separated from the frame flange portion 114 even when lifted due to an elastic force of the support unit 140.

The button unit 120 is formed of a transparent material. The button unit 120 may be manufactured using a transparent acrylic material or silicone material. Therefore, the user may visually check an image on the touch panel unit 12 through the button unit 120.

The inner conductive unit 130 is formed in a ring shape to be attached to the button flange portion 123. The inner conductive unit 130 is installed to avoid the button body portion 121. Here, a coupling rib 131 extends from the inner conductive unit 130, and a coupling protrusion 125 is formed on the button flange portion 123 to restrain the coupling rib 131. Therefore, the inner conductive unit 130 may be stably attached to the button flange portion 123. Of course, the inner conductive unit 130 may be directly attached to a lower surface of the button flange portion 123 using a conductive adhesive.

Figure 8:
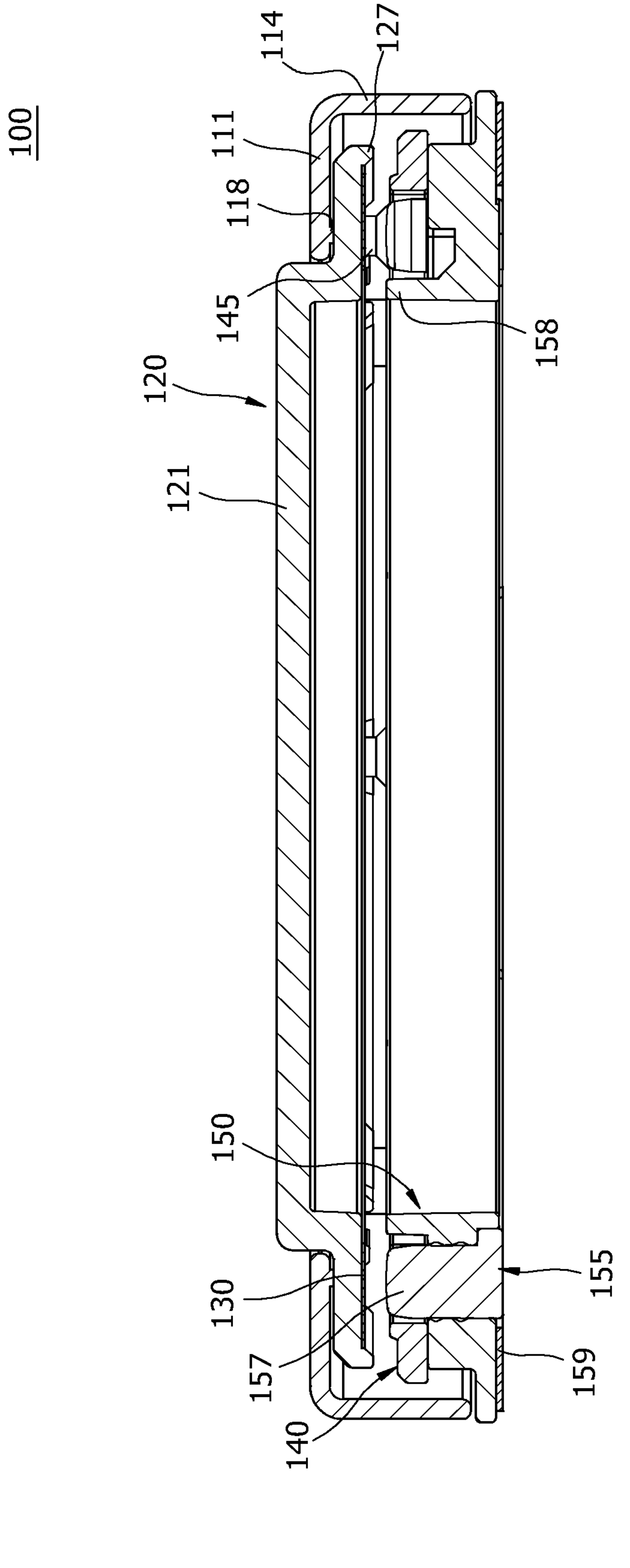
FIG. 8 shows a cross-sectional view illustrating the electronic device button device according to the first embodiment of the present invention.
Figure 9:
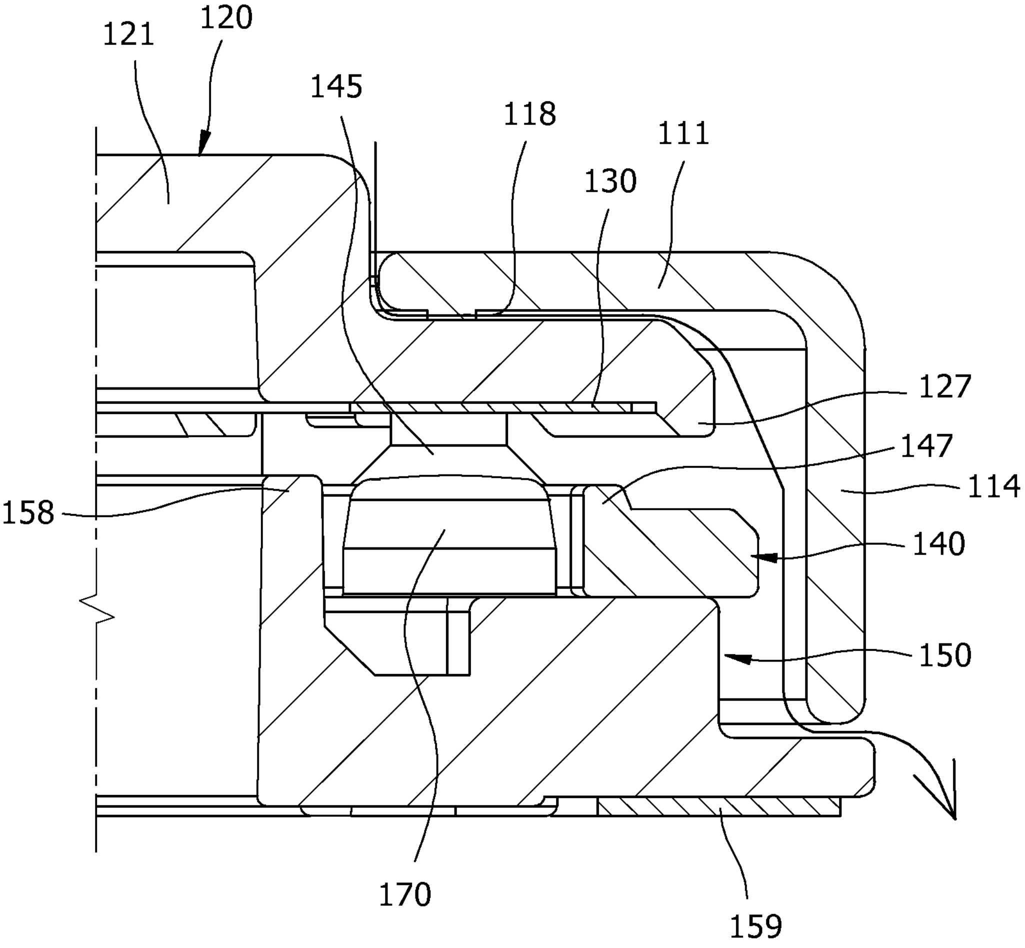
FIG. 9 shows a cross-sectional view illustrating a state wherein moisture is drained while a button unit is not pressed in the electronic device button device according to the first embodiment of the present invention.
Figure 10:
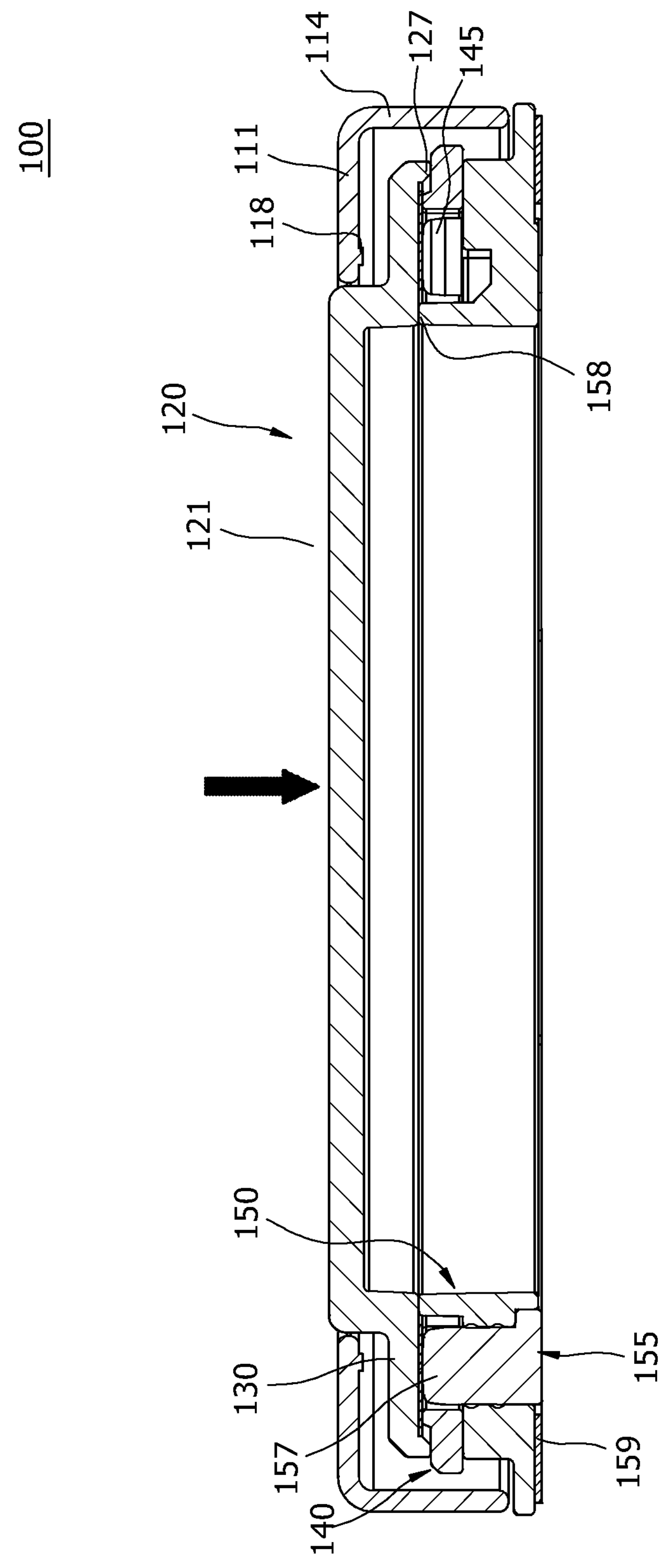
FIG. 10 shows a cross-sectional view illustrating a state wherein the button unit is pressed in the electronic device button device according to the first embodiment of the present invention.
Figure 11:
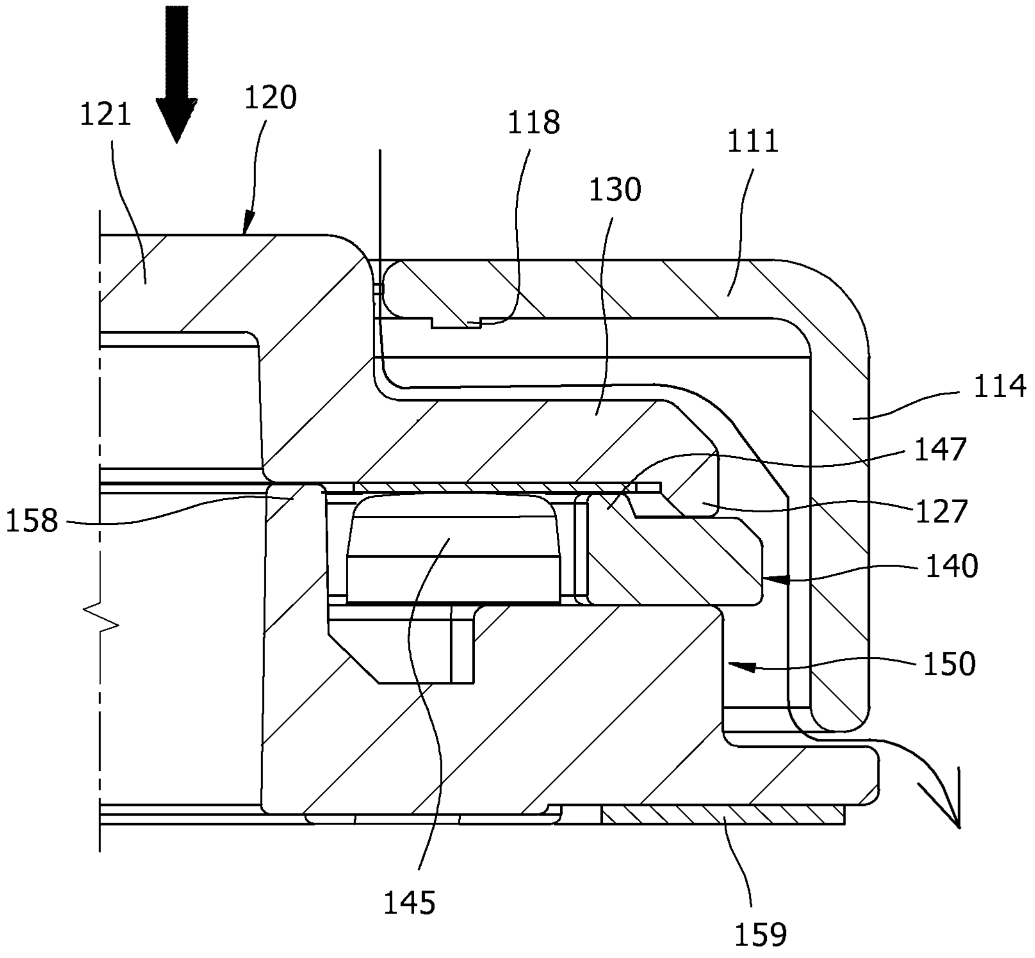
FIG. 11 shows a cross-sectional view illustrating a state wherein moisture is drained while the button unit is pressed in the electronic device button device according to the first embodiment of the present invention.

FIG. 8 is a cross-sectional view illustrating the electronic device button device according to the first embodiment of the present invention, FIG. 9 is a cross-sectional view illustrating a state wherein moisture is drained while a button unit is not pressed in the electronic device button device according to the first embodiment of the present invention, FIG. 10 is a cross-sectional view illustrating a state wherein the button unit is pressed in the electronic device button device according to the first embodiment of the present invention, and FIG. 11 is a cross-sectional view illustrating a state wherein moisture is drained while the button unit is pressed in the electronic device button device according to the first embodiment of the present invention.

Referring to FIGS. 8 to 11, the adhesive conductive unit 150 includes an adhesive base portion 151 and one or more conductive members 155.

The adhesive base portion 151 is adhered to the touch panel unit 12. The adhesive base portion 151 may be formed in an annular shape or a shape similar thereto. The adhesive base portion 151 may be formed of a flexible synthetic resin material. The adhesive base portion 151 is adhered to the touch panel unit 12 using an adhesive member 159 such as a conductive adhesive or a conductive tape.

The conductive member 155 is coupled to the adhesive base portion 151 to come in contact with the touch panel unit 12 and comes in contact with the inner conductive unit 130 to transfer the electrostatic energy of the inner conductive unit 130 to the touch panel unit 12 during movement of the button unit 120. The conductive member 155 may be formed in a form wherein a conductive powder is mixed with a synthetic resin material or may be formed of a metallic material. Since the conductive member 155 constitutes a part of the adhesive conductive unit 150, manufacturing costs can be decreased compared to a configuration wherein the adhesive conductive unit 150 is formed of a conductive material as a whole. Also, when the number of installed conductive members 155 is increased, points of contact of the touch-detecting lines and facing areas of the conductive members 155 are significantly increased. Therefore, since an area wherein the electrostatic energy caused by the capacitance is transferred is significantly increased, the electrostatic energy can be stably transferred to the touch panel unit 12 regardless of a direction wherein the button unit 120 is obliquely pressed.

The conductive member 155 includes a conductive rod portion 156 coupled to the adhesive base portion 151 to come in contact with the touch panel unit 12 and a conductive protrusion 157 formed to protrude from the conductive rod portion 156 to pass through the adhesive base portion 151 and come in contact with the inner conductive unit 130. The conductive rod portion 156 may be installed in a circumferential direction of a conductive panel unit, and the conductive protrusion 157 may be formed as a plurality of conductive protrusions 157 on the conductive rod portion 156. As the conductive protrusion 157 comes in contact with the inner conductive unit 130, the electrostatic energy of the frame unit 110 is transferred to the conductive protrusion 157 through the inner conductive unit 130, and the conductive protrusion 157 transfers the electrostatic energy to the touch panel unit 12 through the conductive rod portion 156.

The adhesive base portion 151 includes a seating portion 152 formed to be recessed in the adhesive base portion 151 for the conductive rod portion 156 to be seated thereon and a connection hole portion 153 formed in the seating portion 152 for the conductive protrusion 157 to pass therethrough. An upper end of the conductive protrusion 157 is exposed at an upper side of the adhesive base portion 151 through the connection hole portion 153.

The support unit 140 faces the inner conductive unit 130 and includes a support body portion 141 coupled to the frame unit 110 and an elastic member 145 installed at the support body portion 141 to elastically support the button unit 120. The support body portion 141 is formed in an annular shape to correspond to the button flange portion 123 of the button unit 120. The support body portion 141 is disposed to avoid the button body portion 121. The elastic member 145 may be formed in a cylindrical shape or conical shape to be contracted in the longitudinal direction due to a pressing force of the button unit 120. The elastic member 145 may be formed of a synthetic resin material.

A plurality of coupling members 144 are installed to pass through the support body portion 141, and a plurality of boss portions 113 are formed on an inner side surface of the frame unit 110 for the plurality of coupling members 144 to be coupled thereto. Therefore, the support body portion 141 may support the button unit 120 and the inner conductive unit 130 to prevent the button unit 120 and the inner conductive unit 130 from being separated from the frame unit 110.

A plurality of exposed groove portions 143 are formed to be recessed in the support body portion 141 for the conductive protrusions 157 to pass therethrough. Since the conductive protrusions 157 pass through the exposed groove portions 143, even when the support body portion 141 is disposed between the inner conductive unit 130 and a conductive base portion, the inner conductive unit 130 may be lowered and come in contact with the conductive protrusions 157 when the button unit 120 is pressed.

The frame unit 110 includes a frame body portion 111, the frame flange portion 114, and a plurality of restraining sliders 117.

The frame body portion 111 is formed in an annular shape to surround outer sides of the button unit 120, the inner conductive unit 130, and the support unit 140. The frame flange portion 114 is formed in an annular shape along a circumferential portion of the frame body portion 111. The frame flange portion 114 extends to a lower side of the frame body portion 111. The plurality of restraining sliders 117 are formed to protrude from the frame flange portion 114 to be caught on a holder portion 154 of the adhesive conductive unit 150 and restrained. The restraining sliders 117 extend inward from the frame flange portion 114. The holder portion 154 of the adhesive conductive unit 150 may be formed in an L-shape of which a top and one side are blocked. The holder portion 154 is provided as a plurality of holder portions 154 formed along a circumferential portion of the adhesive conductive unit 150. Therefore, when the frame unit 110 is seated on an upper side of the adhesive conductive unit 150 and then rotated a predetermined angle, as the restraining sliders 117 are fitted to the holder portions 154 of the adhesive conductive unit 150, the frame unit 110 can be prevented from being separated to an upper side of the touch panel unit 12.

A circumferential portion of the button flange portion 123 and a circumferential portion of the support unit 140 may be formed to be tapered or round, and a circumferential portion of the adhesive base portion 151 is disposed outward from the circumferential portion of the button flange portion 123 and the circumferential portion of the support unit 140.

A first waterproof protrusion 118 that protrudes to a lower side is formed on the circumferential portion of the frame unit 110, and a second waterproof protrusion 127 that protrudes downward is formed on a circumferential portion of the button unit 120. Here, the first waterproof protrusion 118 is formed in an annular shape or a shape similar thereto on an outer side surface of the frame flange portion 114 in the circumferential direction (see FIG. 5). Also, the second waterproof protrusion 127 is formed in an annular shape or a shape similar thereto in the circumferential direction of the button flange portion 123.

Since the first waterproof protrusion 118 comes in close contact with an upper surface of the button flange portion 123 when the button unit 120 is not pressed, the first waterproof protrusion 118 may block almost all external moisture from entering the button unit 120 and the adhesive conductive unit 150. Also, moisture entering through the first waterproof protrusion 118 is drained to the outside of the frame unit 110 while flowing along the circumferential portion of the button flange portion 123 and the circumferential portion of the support unit 140.

Also, when the button unit 120 is pressed, even when external moisture is introduced through a gap between the frame unit 110 and the button unit 120, the external moisture is drained to the outside of the frame unit 110 while flowing along the circumferential portion of the button flange portion 123 and the circumferential portion of the support unit 140. Also, since the second waterproof protrusion 127 of the button flange portion 123 comes in close contact with an upper surface of the circumferential portion of the support unit 140, the second waterproof protrusion 127 may block external moisture from entering the button unit 120 and the adhesive conductive unit 150.

Figure 7:
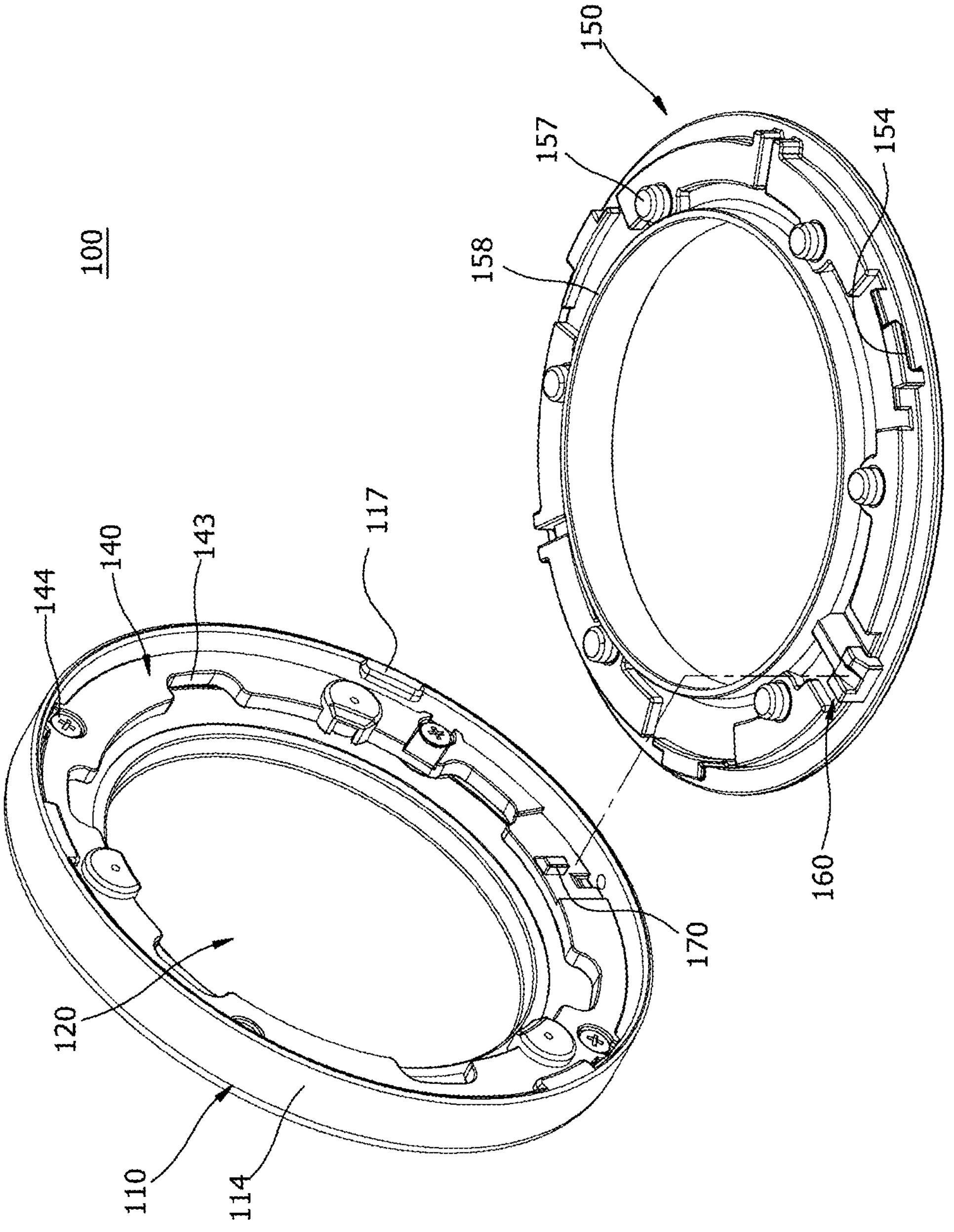
FIG. 7 shows a perspective view illustrating a state wherein an adhesive conductive unit and a frame unit are separated from the electronic device button device according to the first embodiment of the present invention.

A third waterproof protrusion 158 is formed to protrude to an upper side from the adhesive conductive unit 150 (see FIG. 7). The third waterproof protrusion 158 is formed in an annular shape at an inner side of the adhesive base portion 151 in the circumferential direction. Therefore, regardless of whether the button unit 120 is pressed, the third waterproof protrusion 158 may prevent moisture that has entered the button unit 120 from being introduced into the adhesive conductive unit 150.

A fourth waterproof protrusion 147 is formed to protrude to an upper side from the support unit 140 (see FIGS. 4 and 9). The fourth waterproof protrusion 147 is formed in an annular shape at an inner side or outer side of the support unit 140 in the circumferential direction. Therefore, regardless of whether the button unit 120 is pressed, the fourth waterproof protrusion 147 may prevent moisture that has entered the button unit 120 from being introduced into the adhesive conductive unit 150.

Since the first waterproof protrusion 118, the second waterproof protrusion 127, the third waterproof protrusion 158, and the fourth waterproof protrusion 147 induce natural drainage of moisture, moisture may be prevented from stagnating in the electronic device button device 100. Also, malfunctioning of the electronic device button device 100 due to moisture entering the frame unit 110, the inner conductive unit 130, and the adhesive conductive unit 150 may be prevented.

Figure 12:
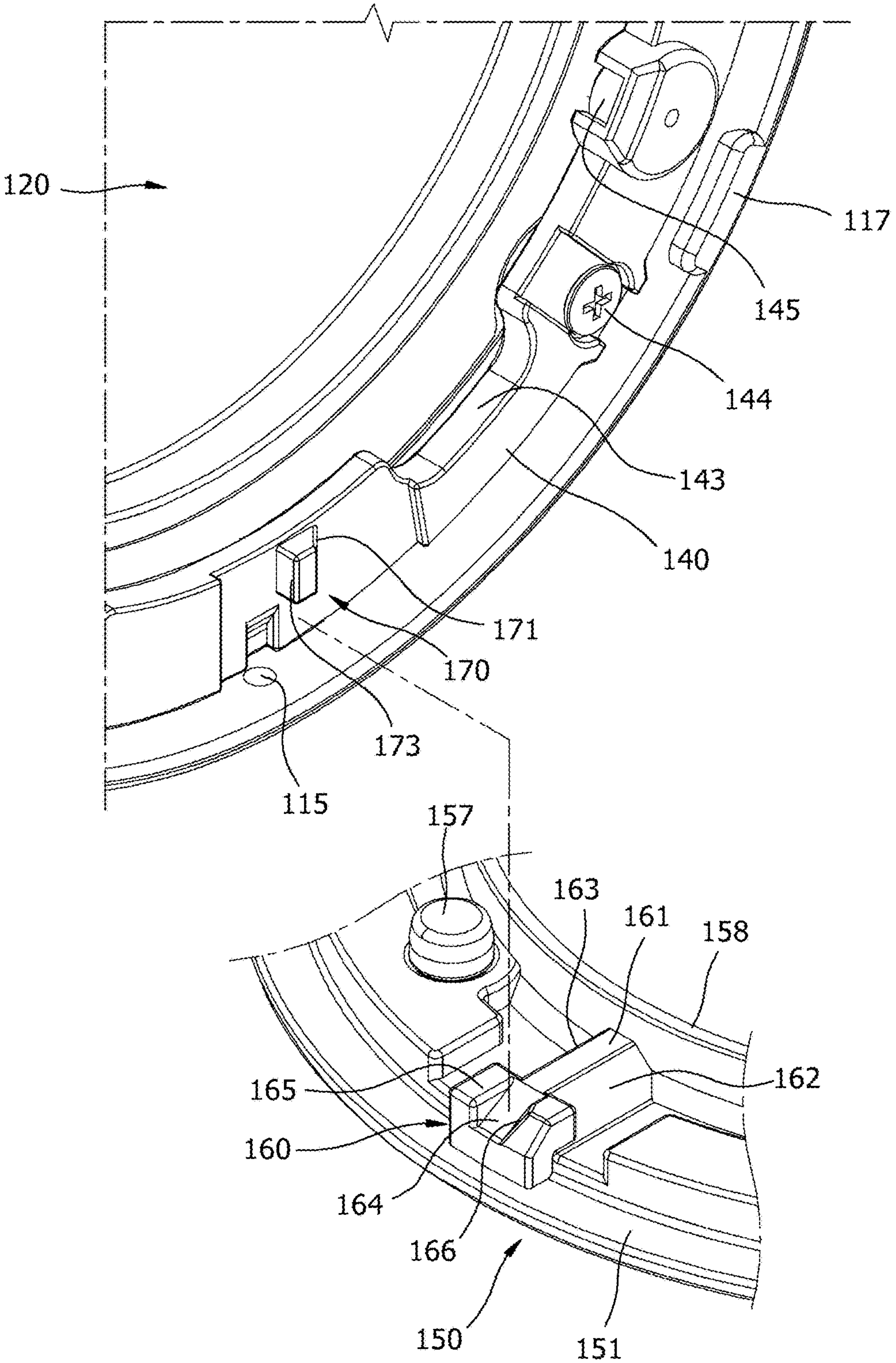
FIG. 12 shows an enlarged view illustrating a restraining unit and a locking unit in the electronic device button device according to the first embodiment of the present invention.
Figure 13:
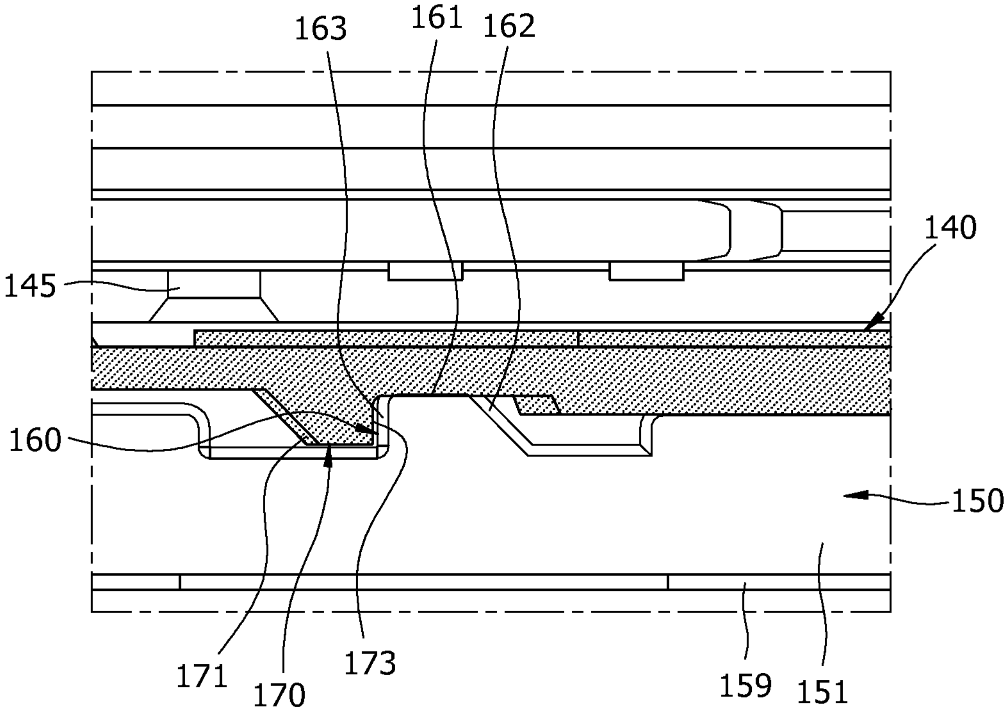
FIG. 13 shows an enlarged view illustrating a state wherein the locking unit is restrained by the restraining unit in the electronic device button device according to the first embodiment of the present invention.
Figure 14:
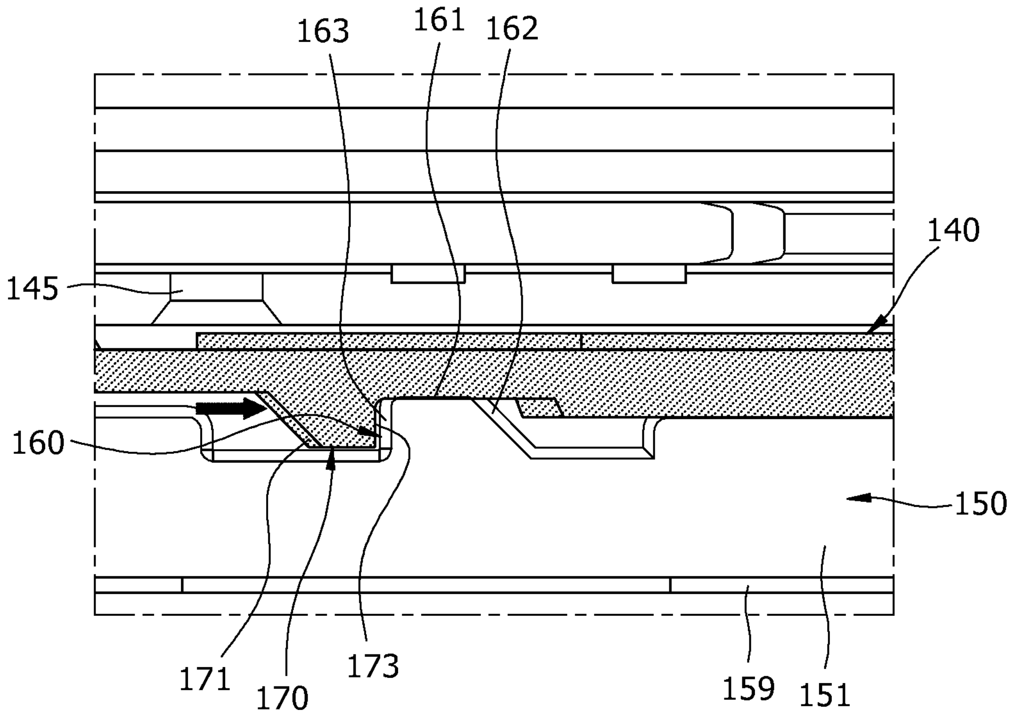
FIG. 14 shows an enlarged view illustrating a state wherein rotation of the frame unit is prevented as the locking unit is restrained by the restraining unit in the electronic device button device according to the first embodiment of the present invention.
Figure 15:
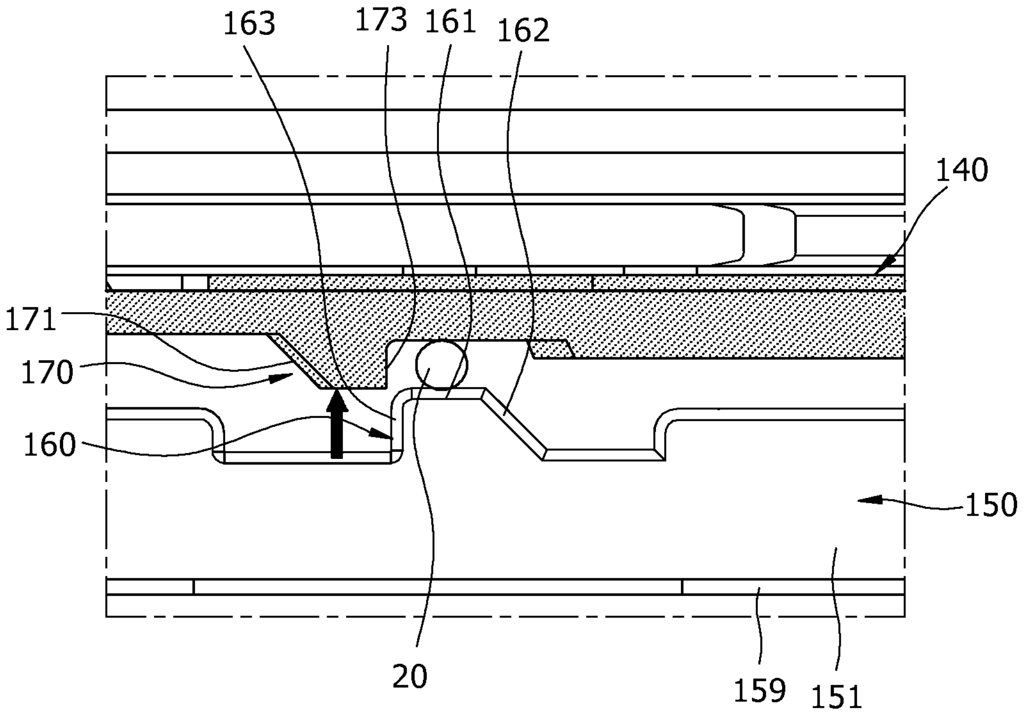
FIG. 15 shows an enlarged view illustrating a state wherein the locking unit is unrestrained by the restraining unit as a key is inserted into the restraining unit in the electronic device button device according to the first embodiment of the present invention.
Figure 16:
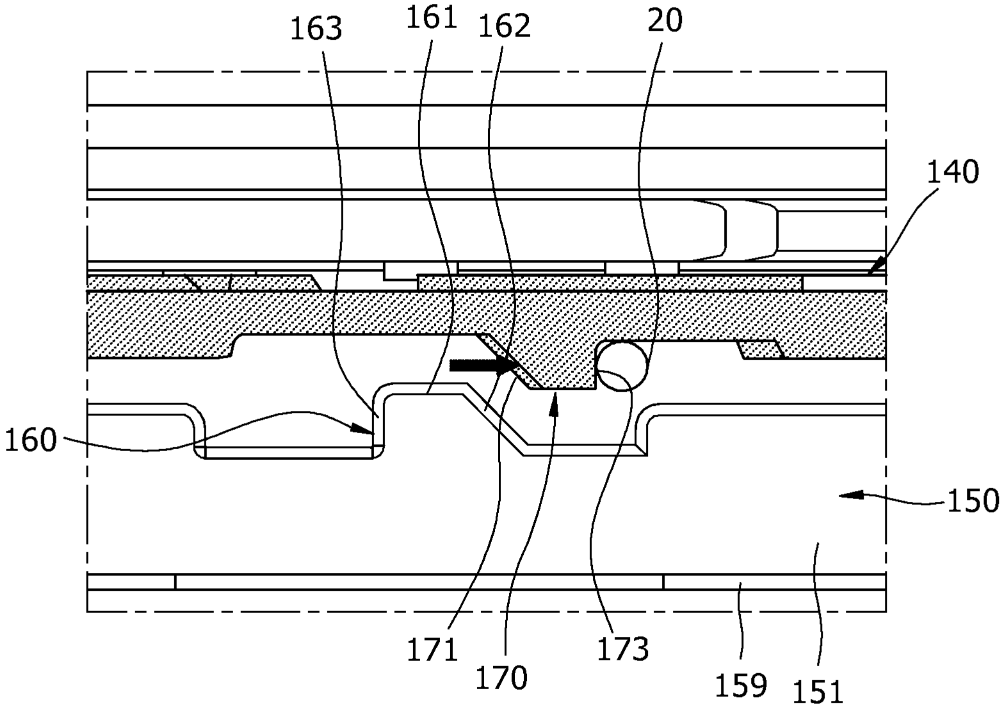
FIG. 16 shows an enlarged view illustrating a state wherein the locking unit is moved to a release region as the frame unit rotates while the key is inserted into the restraining unit in the electronic device button device according to the first embodiment of the present invention.
Figure 17:
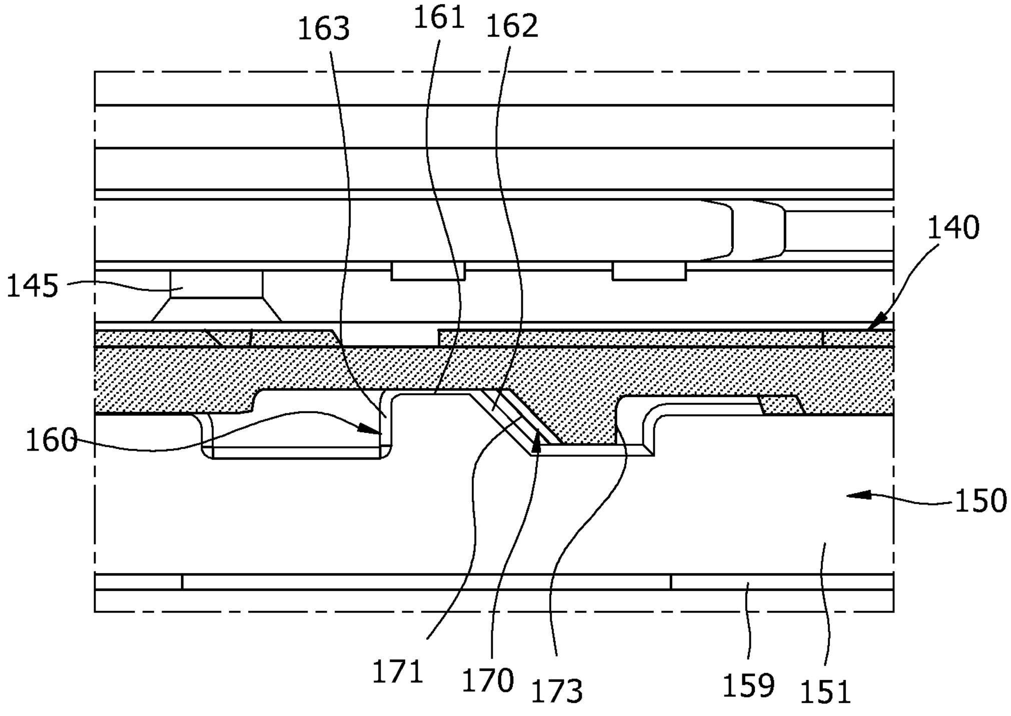
FIG. 17 shows an enlarged view illustrating a state wherein the key is removed from the restraining unit in the electronic device button device according to the first embodiment of the present invention.
Figure 18:
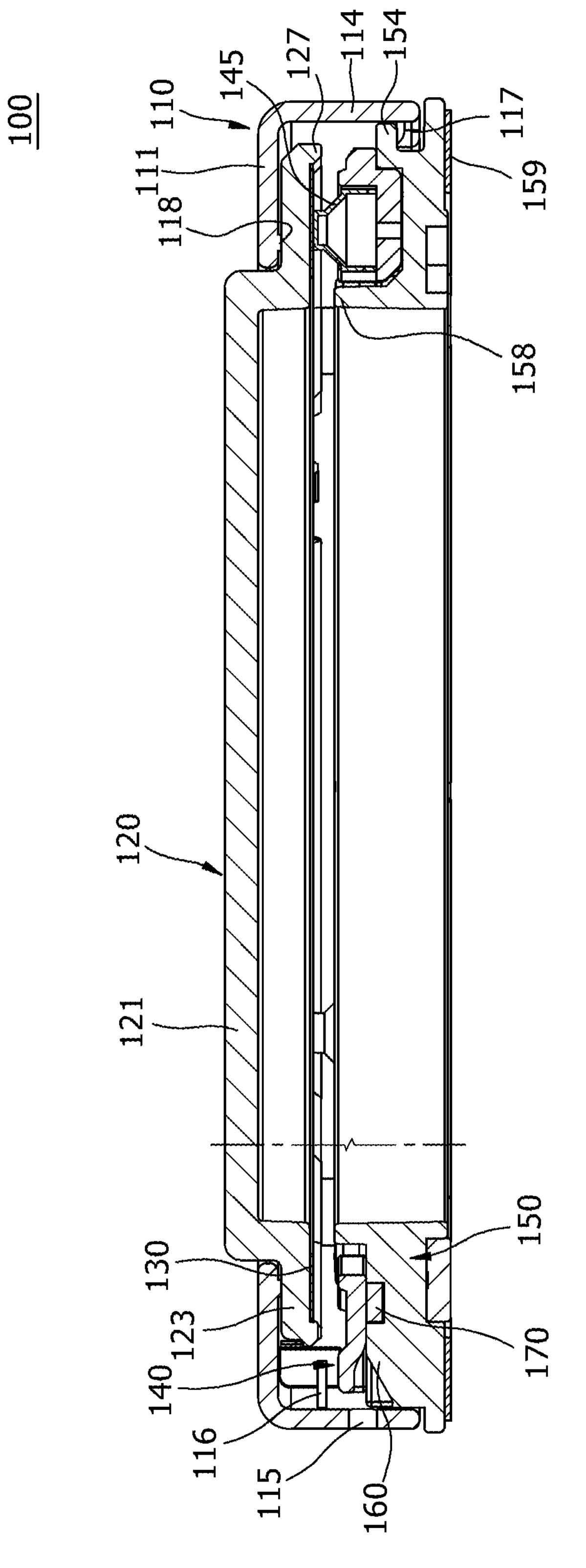
FIG. 18 shows a cross-sectional view illustrating a state before the key is inserted into the restraining unit in the electronic device button device according to the first embodiment of the present invention.
Figure 19:
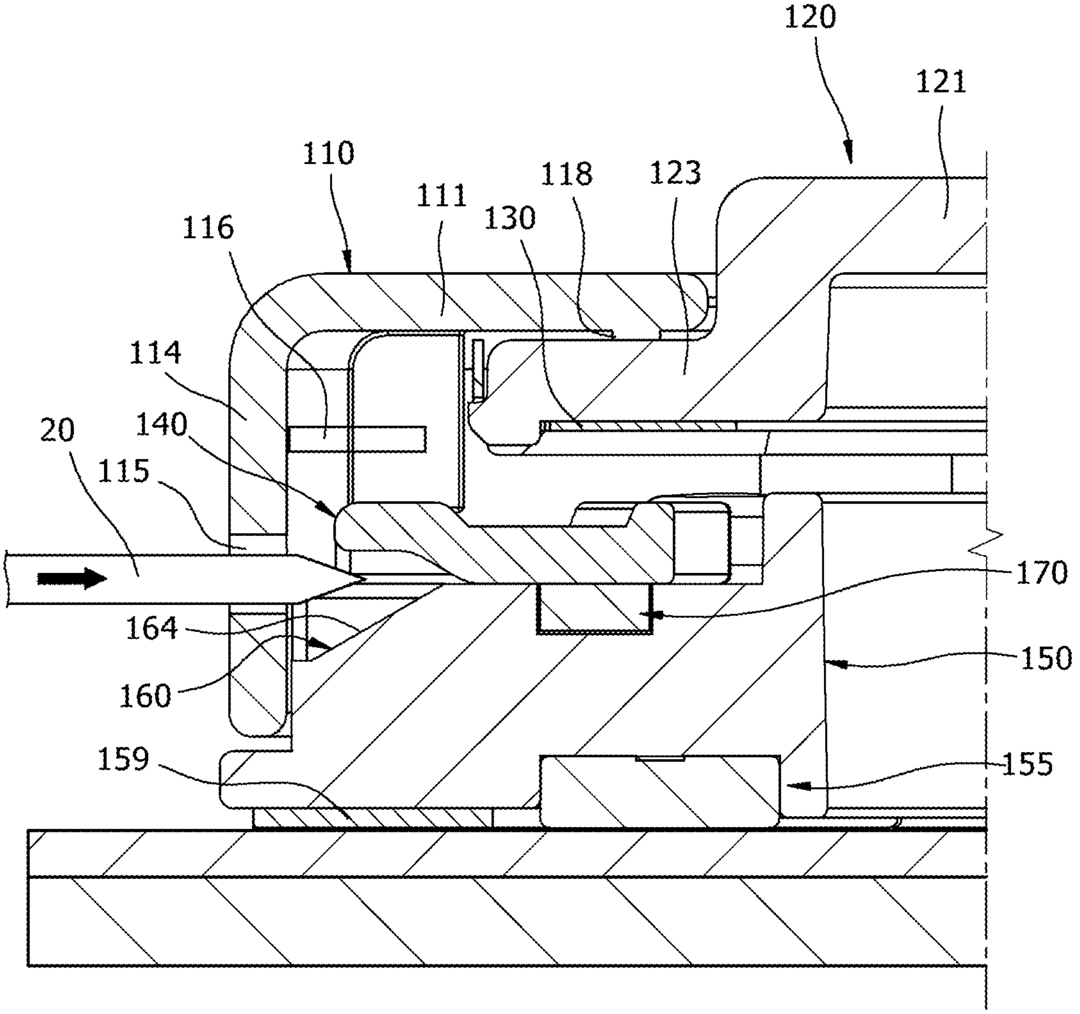
FIG. 19 shows an enlarged view illustrating a state wherein the key is inserted into the restraining unit in the electronic device button device according to the first embodiment of the present invention.
Figure 20:
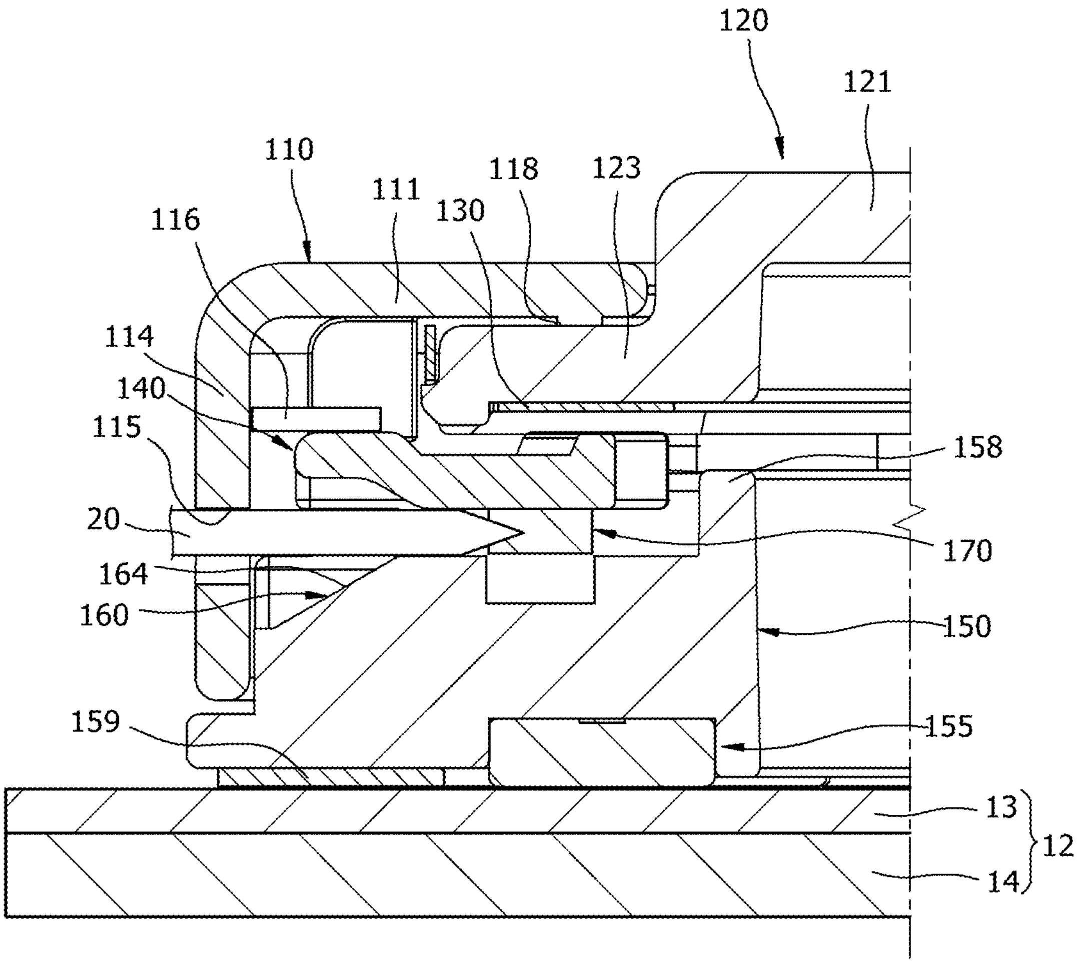
FIG. 20 shows an enlarged view illustrating a state wherein the locking unit is released from the restraining unit as the key is inserted into the restraining unit in the electronic device button device according to the first embodiment of the present invention.
Figure 21:
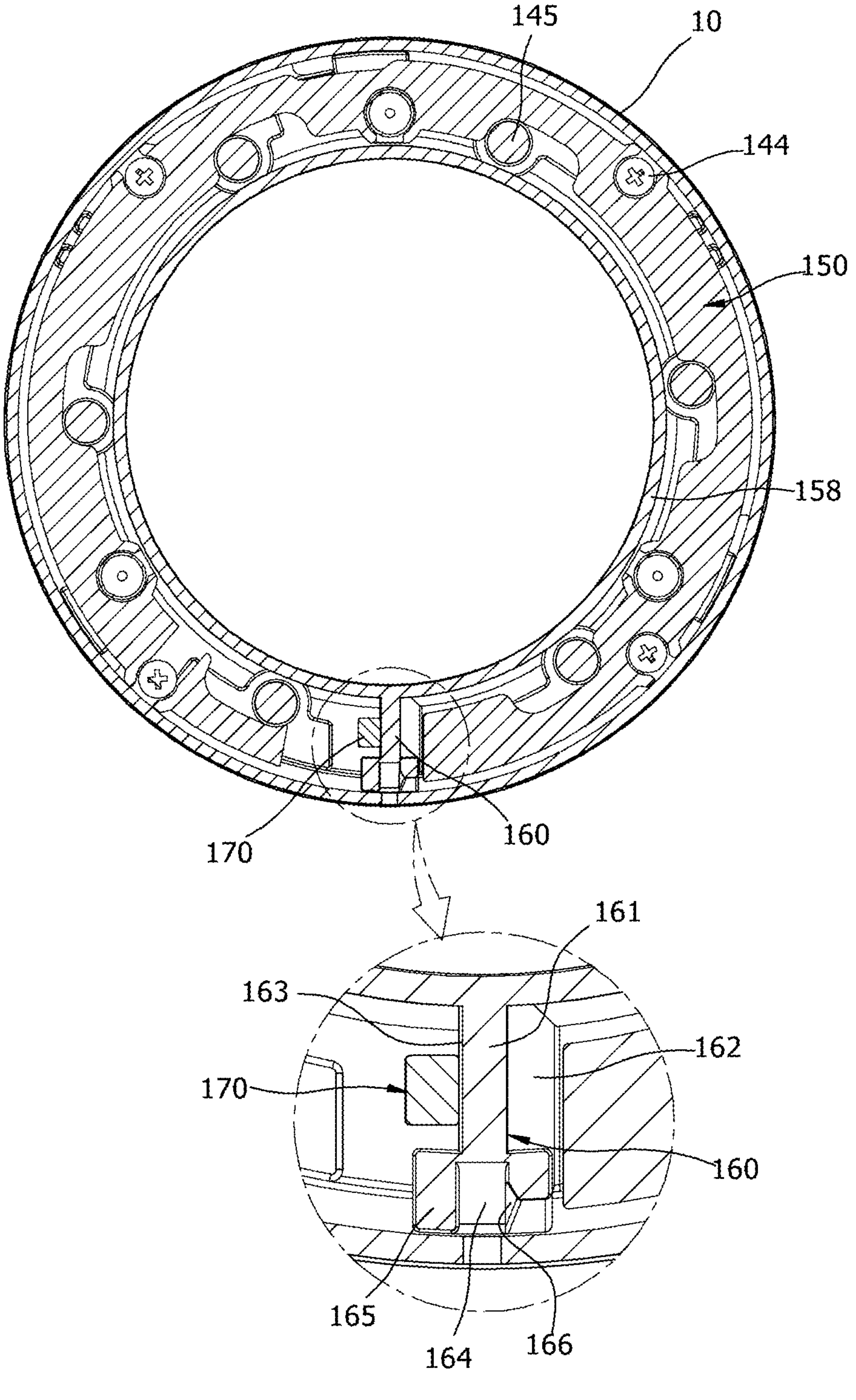
FIG. 21 shows a rear view illustrating a state wherein the locking unit is restrained by the restraining unit in the electronic device button device according to the first embodiment of the present invention.
Figure 22:
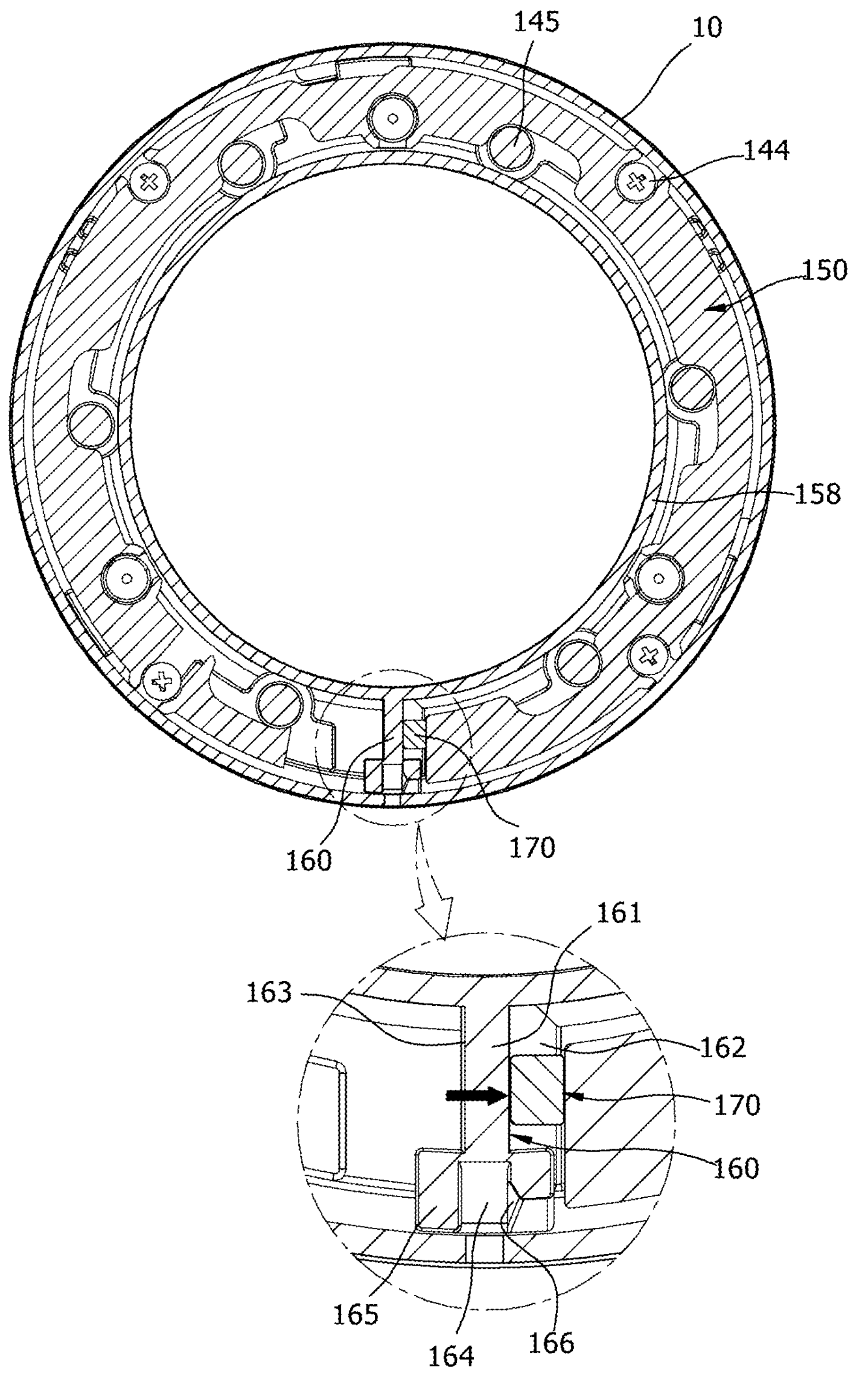
FIG. 22 shows a rear view illustrating a state wherein the locking unit is released from the restraining unit in the electronic device button device according to the first embodiment of the present invention.

FIG. 12 is an enlarged view illustrating a restraining unit and a locking unit in the electronic device button device according to the first embodiment of the present invention, FIG. 13 is an enlarged view illustrating a state wherein the locking unit is restrained by the restraining unit in the electronic device button device according to the first embodiment of the present invention, FIG. 14 is an enlarged view illustrating a state wherein rotation of the frame unit is prevented as the locking unit is restrained by the restraining unit in the electronic device button device according to the first embodiment of the present invention, FIG. 15 is an enlarged view illustrating a state wherein the locking unit is unrestrained by the restraining unit as a key is inserted into the restraining unit in the electronic device button device according to the first embodiment of the present invention, FIG. 16 is an enlarged view illustrating a state wherein the locking unit is moved to a release region as the frame unit rotates while the key is inserted into the restraining unit in the electronic device button device according to the first embodiment of the present invention, FIG. 17 is an enlarged view illustrating a state wherein the key is removed from the restraining unit in the electronic device button device according to the first embodiment of the present invention, FIG. 18 is a cross-sectional view illustrating a state before the key is inserted into the restraining unit in the electronic device button device according to the first embodiment of the present invention, FIG. 19 is an enlarged view illustrating a state wherein the key is inserted into the restraining unit in the electronic device button device according to the first embodiment of the present invention, FIG. 20 is an enlarged view illustrating a state wherein the locking unit is released from the restraining unit as the key is inserted into the restraining unit in the electronic device button device according to the first embodiment of the present invention, FIG. 21 is a rear view illustrating a state wherein the locking unit is restrained by the restraining unit in the electronic device button device according to the first embodiment of the present invention, and FIG. 22 is a rear view illustrating a state wherein the locking unit is released from the restraining unit in the electronic device button device according to the first embodiment of the present invention.

Referring to FIGS. 12 to 22, the electronic device button device 100 further includes a restraining unit 160 disposed at the adhesive conductive unit 150 to correspond to a key hole portion 115 of the frame unit 110, and a locking unit 170 formed at the support unit 140 to be caught on the restraining unit 160 and restrained and configured to be unrestrained by the restraining unit 160 as a key 20 is inserted into the key hole portion 115.

Since the locking unit 170 of the support unit 140 is caught on the restraining unit 160 and restrained, the support unit 140 and the frame unit 110 may be prevented from being separated by rotating in the circumferential direction from the adhesive conductive unit 150. Also, since the locking unit 170 is unrestrained by the restraining unit 160 as the key 20 is inserted into the key hole portion 115, the frame unit 110 and the support unit 140 may be easily and promptly separated by rotating a predetermined angle in the circumferential direction. Therefore, when a component of the button device 100 is damaged or fails, the component may be easily and promptly replaced. Here, an angle of rotation of the frame unit 110 and the support unit 140 may be appropriately designed in consideration of a range wherein the locking unit 170 is restrained by and released from the restraining unit 160.

A deformation limiter 116 is formed to protrude from the frame unit 110 to limit a range wherein the support unit 140 is deformed when restraining of the locking unit 170 is released. Therefore, when the key 20 is fitted between the support unit 140 and the restraining unit 160 and the support unit 140 is pushed upward, the support unit 140 is caught on the deformation limiter 116, and a deformation amount of the support unit 140 is limited.

The restraining unit 160 corresponds to the key hole portion 115 and includes a restraining step portion 161 formed to protrude from the adhesive conductive unit 150 for the locking unit 170 to be caught on the restraining step portion 161 and restrained, and a pair of detachment preventers 165 formed to protrude from both sides of the restraining step portion 161 to prevent detachment of the key 20 when the key 20 is inserted into the key hole portion 115. Since the pair of detachment preventers 165 guide a direction of entry of the key 20 when the key 20 is inserted into the key hole portion 115, the key 20 may be prevented from being detached from an upper surface of the restraining step portion 161. Also, since the key 20 is moved along the upper surface of the restraining step portion 161 when inserted into the key hole portion 115, the key 20 pushes the locking unit 170 upward and causes the locking unit 170 to be released from the restraining step portion 161. Therefore, a worker may operate the key 20 to easily separate the frame unit 110 and the support unit 140 from the adhesive conductive unit 150.

A restraining tapered portion 162 is formed at one side of the restraining step portion 161 in a width direction for the locking unit 170 to be moved to an upper side of the restraining step portion 161, and a restraining step difference portion 163 is formed at the other side of the restraining step portion 161 in the width direction for the locking unit 170 to be caught and restrained. Therefore, when the frame unit 110 is rotated in one direction in a state wherein the frame unit 110 is seated on an upper side of the adhesive conductive unit 150, the locking unit 170 may be smoothly moved to an upper side along the restraining tapered portion 162. Also, when the locking unit 170 is lowered after being moved toward the other side of the restraining step portion 161 in the width direction, the restraining step difference portion 163 restrains the locking unit 170 to prevent the locking unit 170 from moving in the other direction. Therefore, even when an external force is applied to rotate the frame unit 110 in the other direction, the frame unit 110 is not separated from the adhesive conductive unit 150.

An insertion tapered portion 164 is formed to be gradually inclined upward toward the restraining step portion 161 between the pair of detachment preventers 165. Therefore, since the key 20 is moved to an upper side along the insertion tapered portion 164 when being inserted into the key hole portion 115, as the support unit 140 is pushed upward by the key 20, the locking unit 170 is released from the restraining step difference portion 163.

A movement tapered portion 166 is formed at the detachment preventer 165 to allow the key 20 to be moved while inserted into the key hole portion 115. The movement tapered portion 166 is formed at the detachment preventer 165 in a direction wherein the locking unit 170 is released, among the pair of detachment preventers 165. Therefore, when the frame unit 110 is rotated a predetermined angle in the other direction in a state wherein the key 20 is inserted into the key hole portion 115, the key 20 may be smoothly moved by sliding from the movement tapered portion 166.

The locking unit 170 is disposed to avoid the key 20 when the key 20 is being inserted into the key hole portion 115. Therefore, the locking unit 170 may be prevented from being caught on the key 20 when the key 20 is being inserted into the key hole portion 115.

A locking tapered portion 171 is formed at the other side of the locking unit 170 for the locking unit 170 to be moved along the restraining tapered portion 162, and a locking step difference portion 173 is formed at one side of the locking unit 170 for the locking unit 170 to be caught on the restraining step difference portion 163 and restrained. Therefore, in a state wherein the locking unit 170 is released from the restraining step portion 161, the locking tapered portion 171 is in contact with the restraining tapered portion 162, and in a state wherein the locking unit 170 is restrained by the restraining step portion 161, the locking step difference portion 173 is in contact with the restraining step difference portion 163.

Next, an electronic device button device according to a second embodiment of the present invention will be described.

Figure 23:
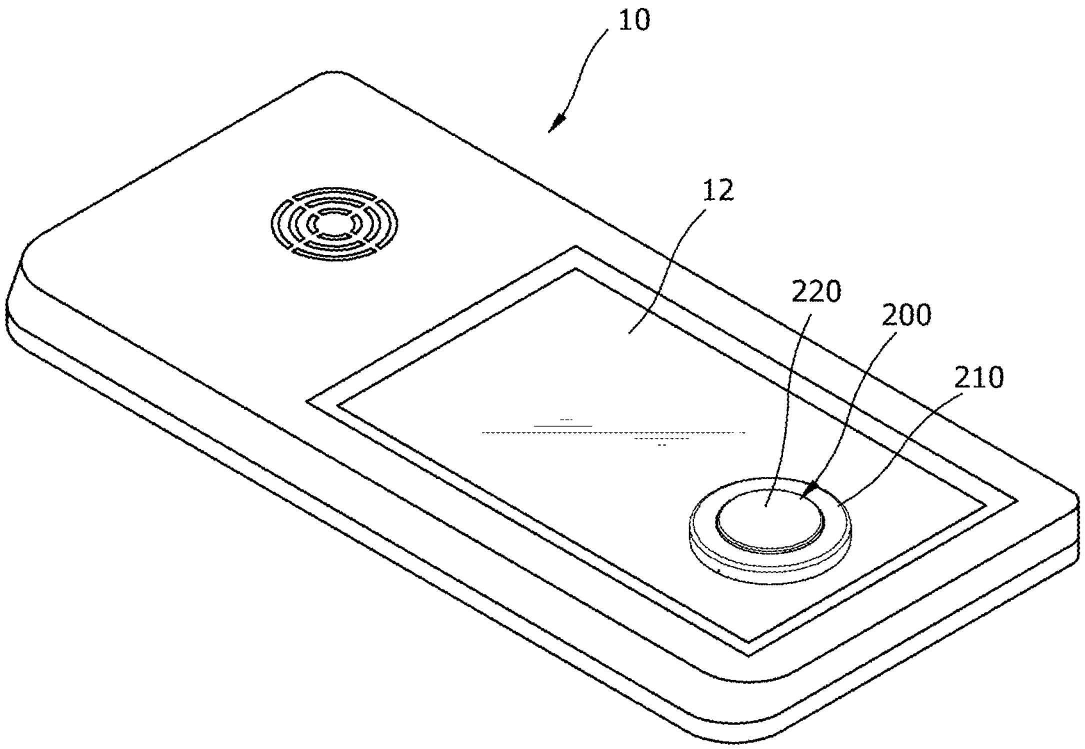
FIG. 23 shows a perspective view illustrating a state wherein an electronic device button device according to a second embodiment of the present invention is adhered to a touch panel unit.
Figure 24:
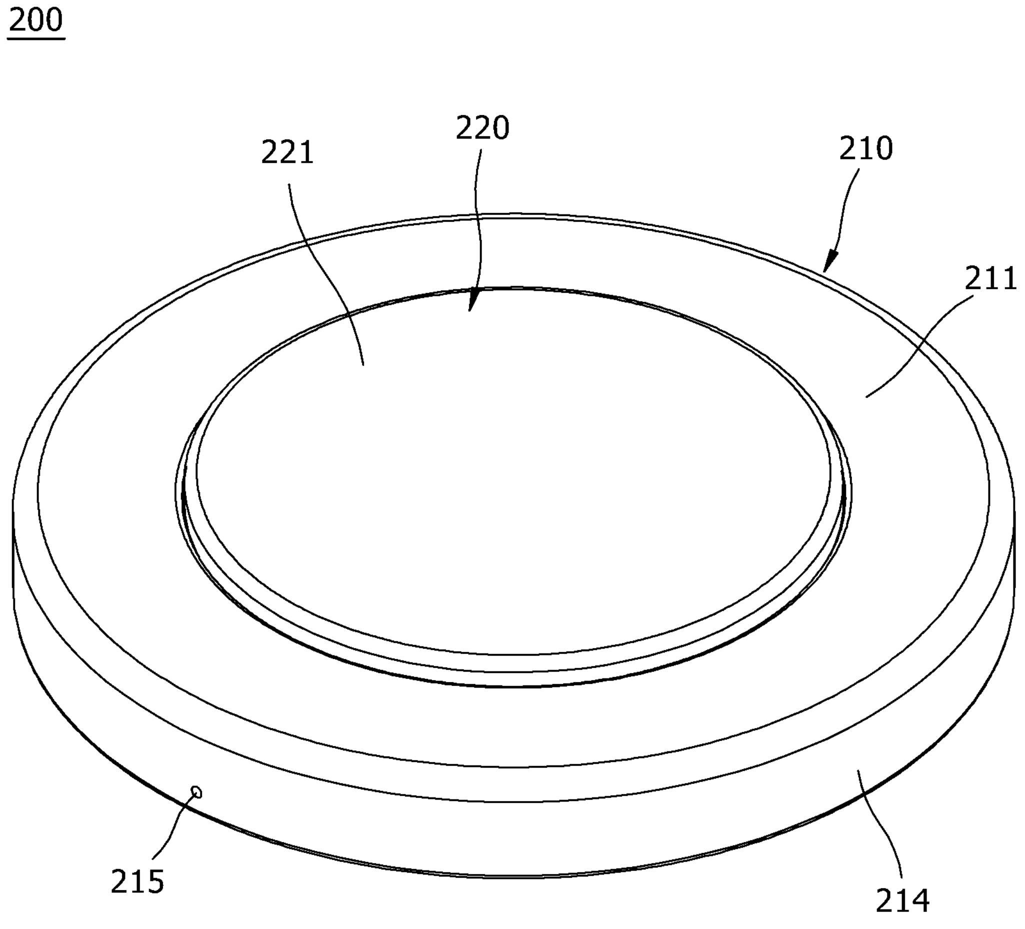
FIG. 24 shows a perspective view illustrating the electronic device button device according to the second embodiment of the present invention.
Figure 25:
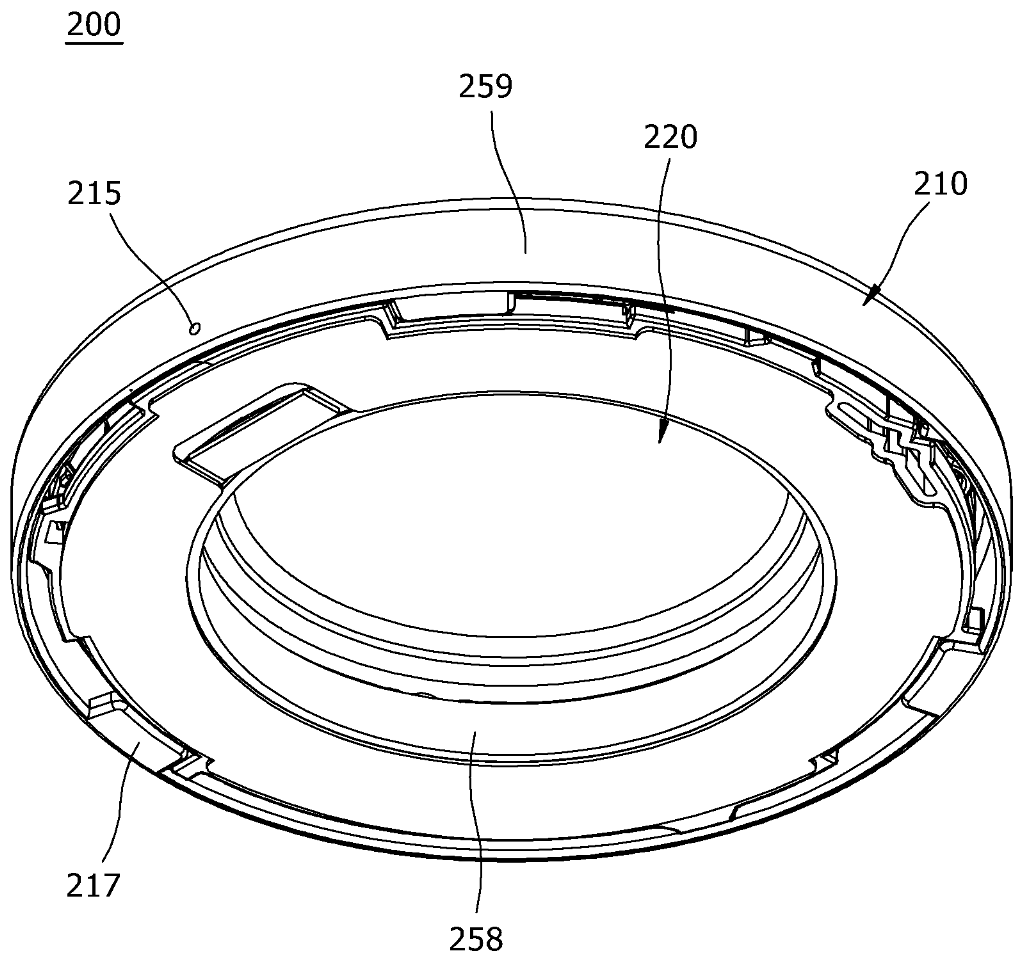
FIG. 25 shows a perspective view illustrating a lower side of the electronic device button device according to the second embodiment of the present invention.
Figure 26:
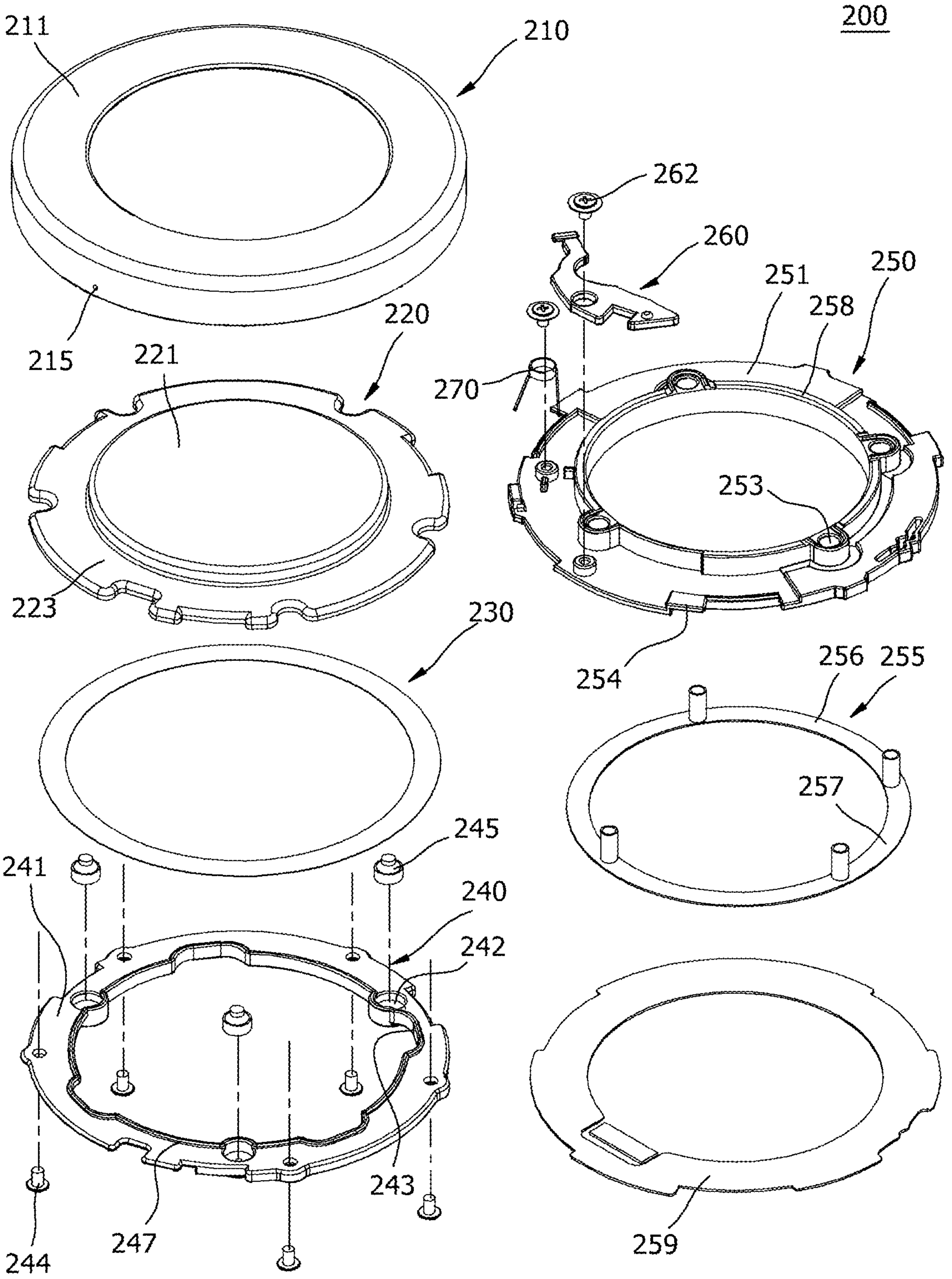
FIG. 26 shows an exploded perspective view illustrating the electronic device button device according to the second embodiment of the present invention.
Figure 27:
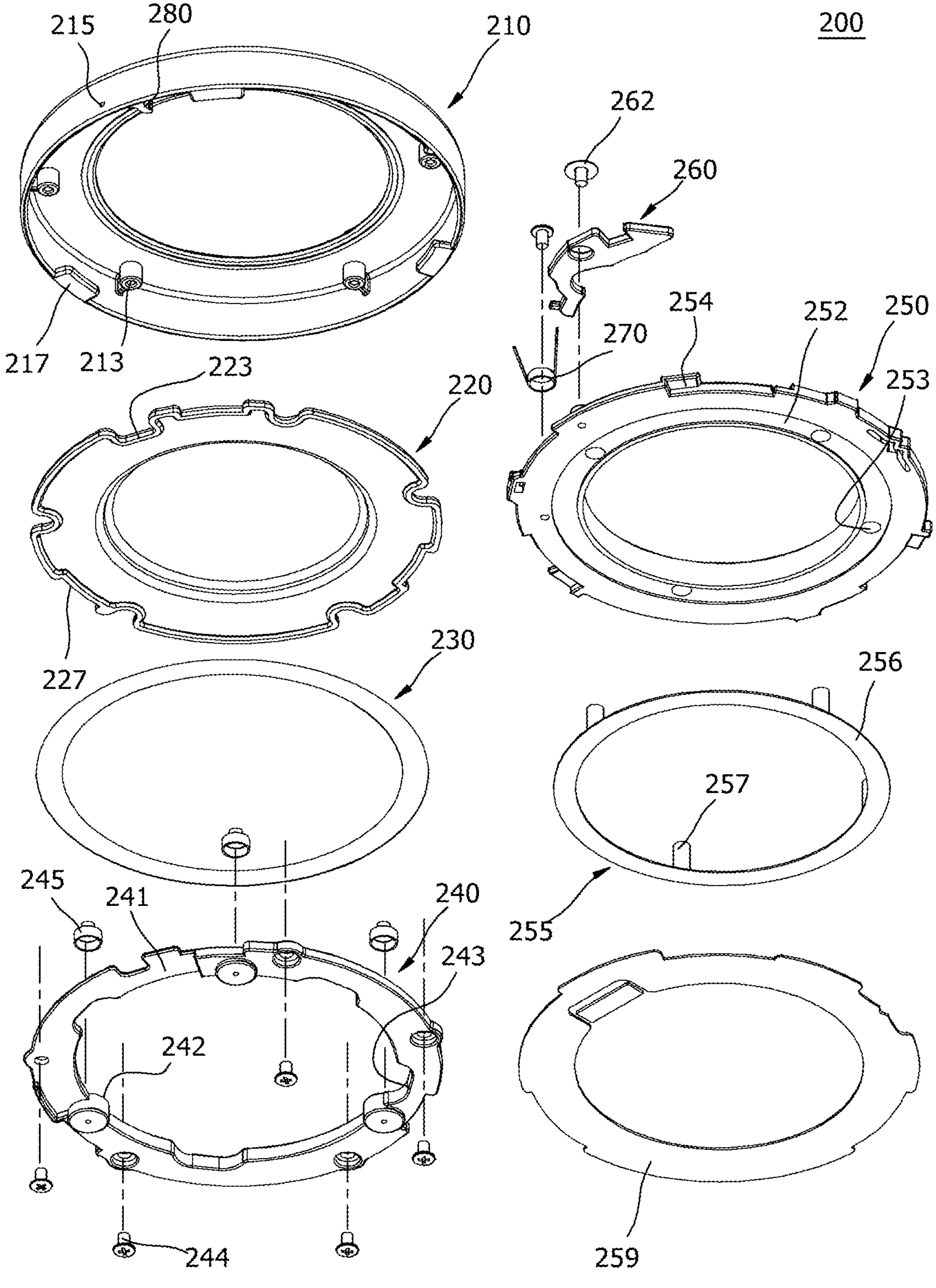
FIG. 27 shows an exploded perspective view illustrating the lower side of the electronic device button device according to the second embodiment of the present invention.
Figure 28:
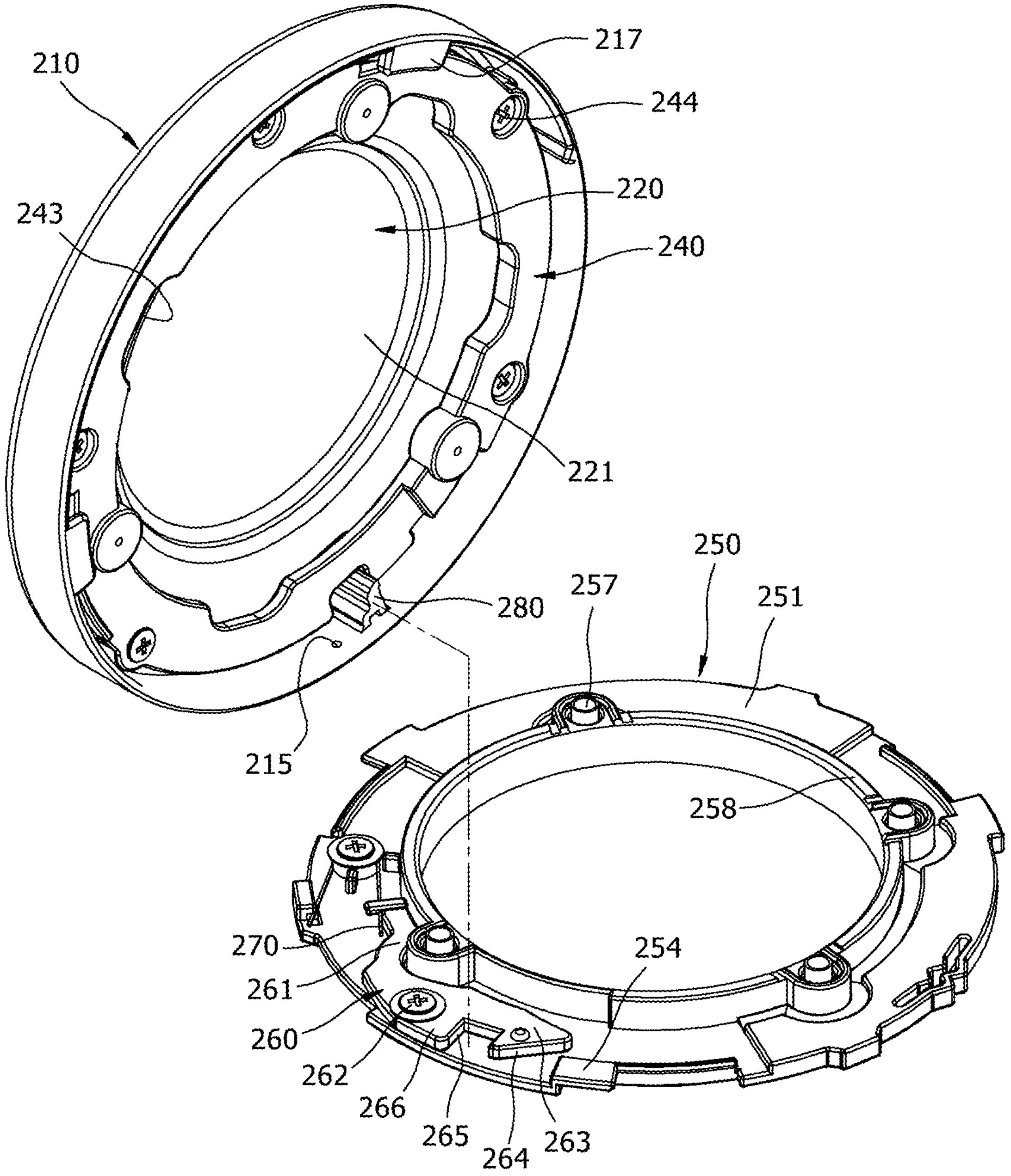
FIG. 28 shows a perspective view illustrating a state wherein an adhesive conductive unit and a frame unit are separated from the electronic device button device according to the second embodiment of the present invention.

FIG. 23 is a perspective view illustrating a state wherein the electronic device button device according to the second embodiment of the present invention is adhered to a touch panel unit, FIG. 24 is a perspective view illustrating the electronic device button device according to the second embodiment of the present invention, FIG. 25 is a perspective view illustrating a lower side of the electronic device button device according to the second embodiment of the present invention, FIG. 26 is an exploded perspective view illustrating the electronic device button device according to the second embodiment of the present invention, FIG. 27 is an exploded perspective view illustrating the lower side of the electronic device button device according to the second embodiment of the present invention, and FIG. 28 is a perspective view illustrating a state wherein an adhesive conductive unit and a frame unit are separated from the electronic device button device according to the second embodiment of the present invention.

Referring to FIGS. 23 to 28, an electronic device button device 200 according to the second embodiment of the present invention includes a frame unit 210, a button unit 220, an inner conductive unit 230, a support unit 240, and an adhesive conductive unit 250. Examples of an electronic device 10 according to the second embodiment of the present invention may include various devices such as a casino machine and a game machine.

A touch panel unit 12 is installed on the electronic device 10. The touch panel unit 12 includes a circuit board (not illustrated), a touch film portion 14 laminated on the circuit board, and a glass portion 13 laminated on the touch film portion 14. A liquid crystal display portion (not illustrated) and a controller (not illustrated) are included in the circuit board. Touch-detecting lines (not illustrated) are arranged to cross each other in the vertical and horizontal directions on the touch film portion 14. The glass portion 13 may be formed of a transparent glass material or a synthetic resin material.

The frame unit 210 includes a conductive material. Here, the frame unit 210 may be formed of the conductive material as a whole or have a plating layer formed on a surface of a synthetic resin. Since the frame unit 210 includes the conductive material, capacitance of the frame unit 210 may be increased. The capacitance is increased proportionally to an area of the frame unit 210 and a dielectric constant of the conductive material. The frame unit 210 may be formed in a circular shape, an elliptical shape, or a polygonal shape as a whole.

The button unit 220 is movably coupled to the frame unit 210. The button unit 220 may be formed in an identical or similar shape to the frame unit 210. The button unit 220 may be formed of a synthetic resin material.

The inner conductive unit 230 is disposed at the button unit 220 to be moved together with the button unit 220 and receives electrostatic energy caused by the capacitance of the frame unit 210. The inner conductive unit 230 is disposed at a lower side of the frame unit 210 to be invisible from the outside. The inner conductive unit 230 may be formed in an identical or similar shape to the frame unit 210. Also, the inner conductive unit 230 may be formed of a conductive material as a whole or manufactured in a form wherein a conductive powder is mixed with a synthetic resin material such as silicone. An outer side surface of the inner conductive unit 230 may be installed to be spaced about 1 mm to 3 mm from an inner side surface of a circumferential portion of the frame unit 210.

The support unit 240 is coupled to the frame unit 210 to elastically support the button unit 220. The support unit 240 may be formed of a flexible synthetic resin material. The support unit 240 may be formed as a circular frame, an elliptical frame, or a polygonal frame as a whole.

The adhesive conductive unit 250 is coupled to the frame unit 210, is adhered to the touch panel unit 12, and comes in contact with the inner conductive unit 230 to transfer the electrostatic energy of the inner conductive unit 230 to the touch panel unit 12 during movement of the button unit 220. As the adhesive conductive unit 250 is adhered to the touch panel unit 12, and the button unit 220 is moved to a lower side due to an external force, the electrostatic energy caused by the capacitance is transferred to the touch film portion 14 of the touch panel unit 12 through the frame unit 210, the inner conductive unit 230, and the adhesive conductive unit 250. Therefore, a function of the electronic device 10 may be input and selected as a user operates the electronic device button device 200.

Since the adhesive conductive unit 250 is adhered to the touch panel unit 12, it is not necessary to form a wire-passing hole or a button-mounting hole in the glass portion 13. Therefore, a decrease in stiffness of the glass portion 13 may be prevented, and formation of cracks in the glass portion 13 due to an impact or external force may be prevented. Also, since it is not necessary to increase a thickness of the glass portion 13 to reinforce the stiffness of the glass portion 13, manufacturing costs of the glass portion 13 may be decreased, and touch sensitivity may be improved due to a decrease in the thickness of the glass portion 13.

Also, since external moisture is prevented from entering the glass portion 13, failure of or damage to the touch panel unit 12 or the electronic device 10 may be prevented.

Also, since it is not necessary to install a separate screw or latch portion to fix the button device 200 to the touch panel unit 12, an installation structure of the button device 200 may be simplified, and manufacturing costs thereof may be significantly decreased. Further, since it is not necessary to release a screw or latch portion when disassembling or assembling the glass portion 13 or the button device 200, the time taken to disassemble or assemble the glass portion 13 or the button device 200 and repair costs thereof may be significantly decreased.

The button unit 220 includes a button body portion 221 and a button flange portion 223. The button body portion 221 is inserted into a frame hole portion 212 of the frame unit 210. The button flange portion 223 is formed at a circumferential portion of the button body portion 221 to be caught on the frame unit 210, and the inner conductive unit 230 is disposed at the button flange portion 223. Since the button flange portion 223 is formed in an annular shape to be caught on a frame flange portion 214, the button unit 220 may be prevented from being separated from the frame flange portion 214 even when lifted due to an elastic force of the support unit 240.

The button unit 220 is formed of a transparent material. The button unit 220 may be manufactured using a transparent acrylic material or silicone material. Therefore, the user may visually check an image on the touch panel unit 12 through the button unit 220.

The inner conductive unit 230 is formed in a ring shape to be attached to the button flange portion 223. The inner conductive unit 230 is installed to avoid the button body portion 221. The inner conductive unit 230 may be directly attached to a lower surface of the button flange portion 223 using a conductive adhesive.

The adhesive conductive unit 250 includes an adhesive base portion 251 and one or more conductive members 255.

The adhesive base portion 251 is adhered to the touch panel unit 12. The adhesive base portion 251 may be formed in an annular shape or a shape similar thereto. The adhesive base portion 251 may be formed of a flexible synthetic resin material. The adhesive base portion 251 is adhered to the touch panel unit 12 using an adhesive member 259 such as a conductive adhesive or a conductive tape.

The conductive member 255 is coupled to the adhesive base portion 251 to come in contact with the touch panel unit 12 and comes in contact with the inner conductive unit 230 to transfer the electrostatic energy of the inner conductive unit 230 to the touch panel unit 12 during movement of the button unit 220. The conductive member 255 may be formed in a form wherein a conductive powder is mixed with a synthetic resin material or may be formed of a metallic material. Since the conductive member 255 constitutes a part of the adhesive conductive unit 250, manufacturing costs can be decreased compared to a configuration wherein the adhesive conductive unit 250 is formed of a conductive material as a whole. Also, when the number of installed conductive members 255 is increased, points of contact of the touch-detecting lines and facing areas of the conductive members 255 are significantly increased. Therefore, since an area wherein the electrostatic energy caused by the capacitance is transferred is significantly increased, the electrostatic energy can be stably transferred to the touch panel unit 12 regardless of a direction wherein the button unit 220 is obliquely pressed.

Figure 29:
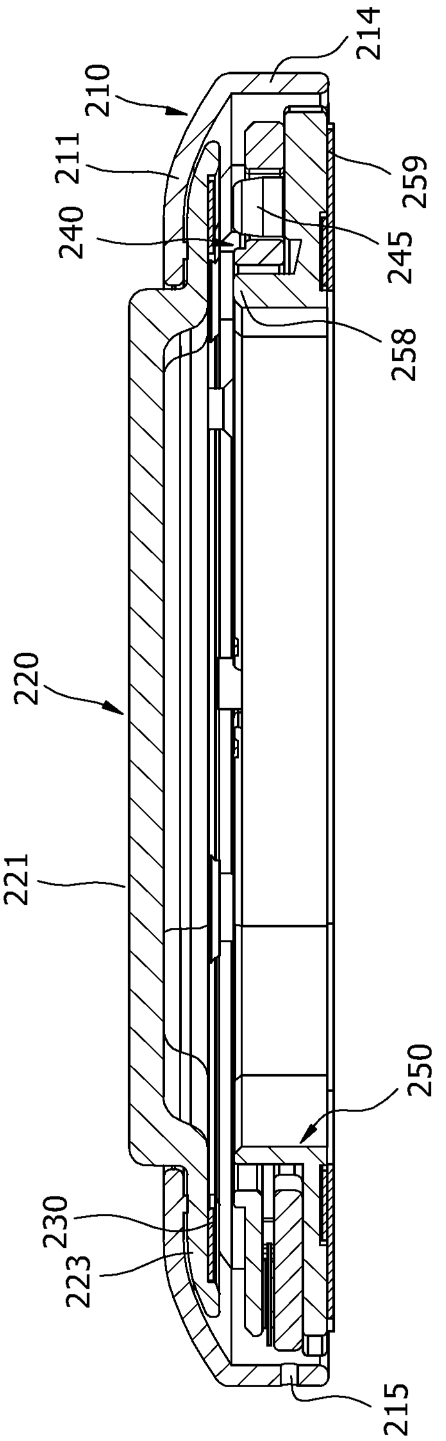
FIG. 29 shows a cross-sectional view illustrating the electronic device button device according to the second embodiment of the present invention.
Figure 30:
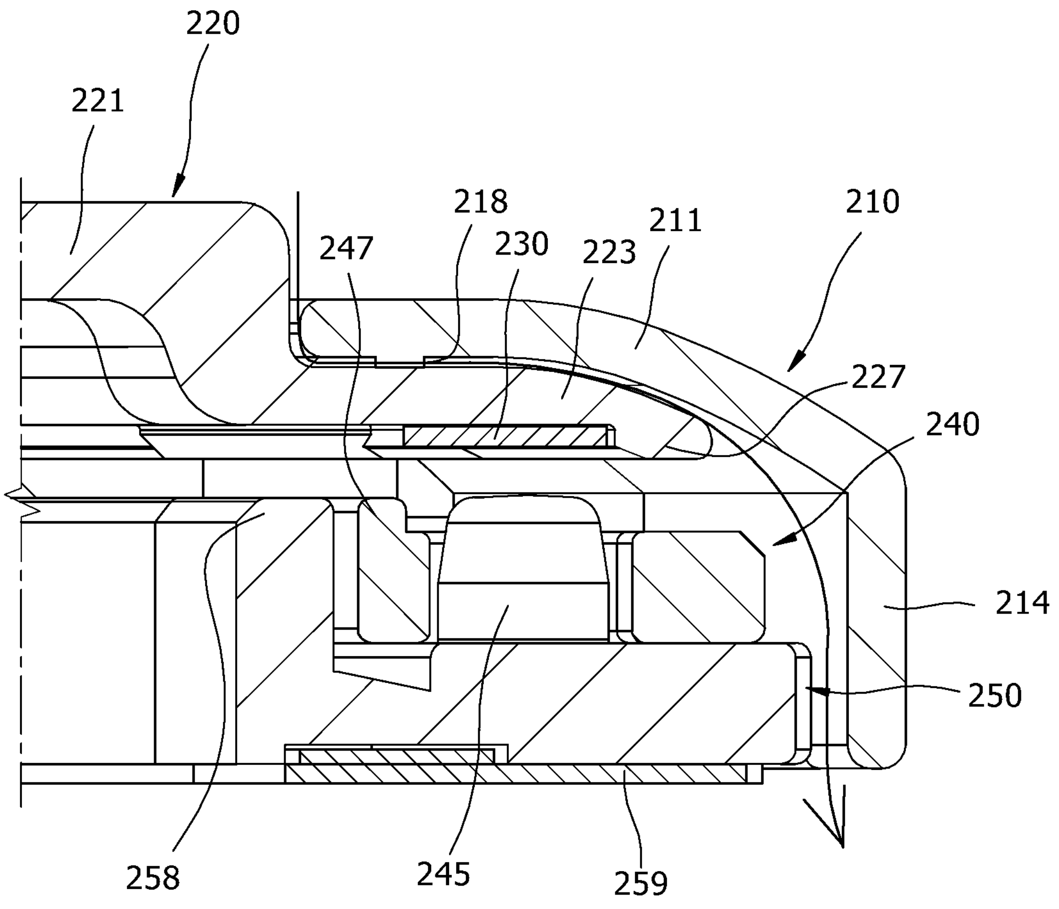
FIG. 30 shows an enlarged view illustrating a state wherein moisture is drained while a button unit is not pressed in the electronic device button device according to the second embodiment of the present invention.
Figure 31:
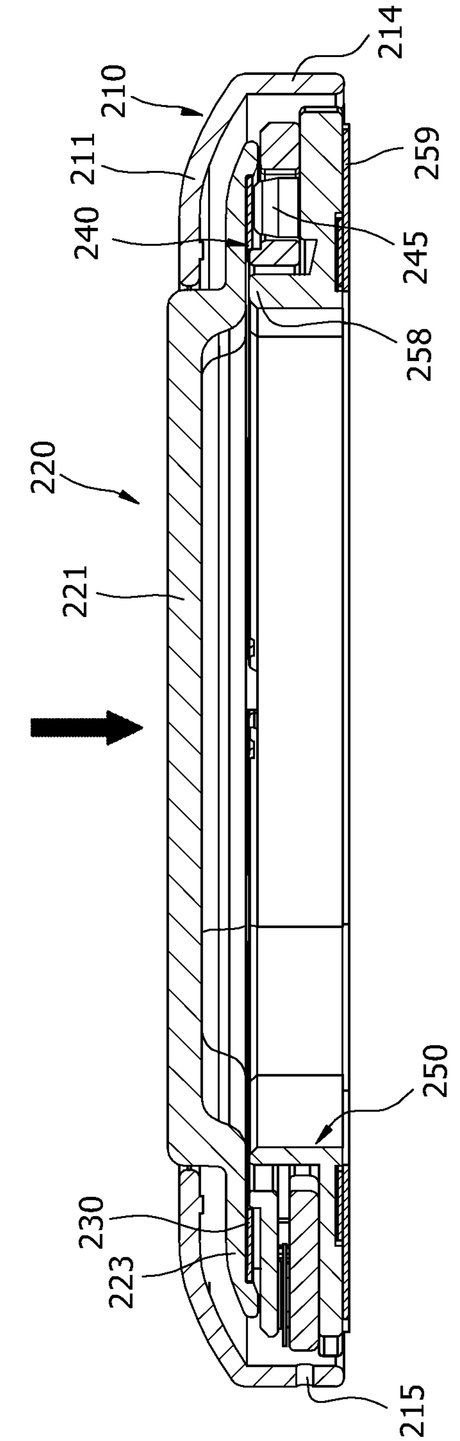
FIG. 31 shows a cross-sectional view illustrating a state wherein the button unit is pressed in the electronic device button device according to the second embodiment of the present invention.
Figure 32:
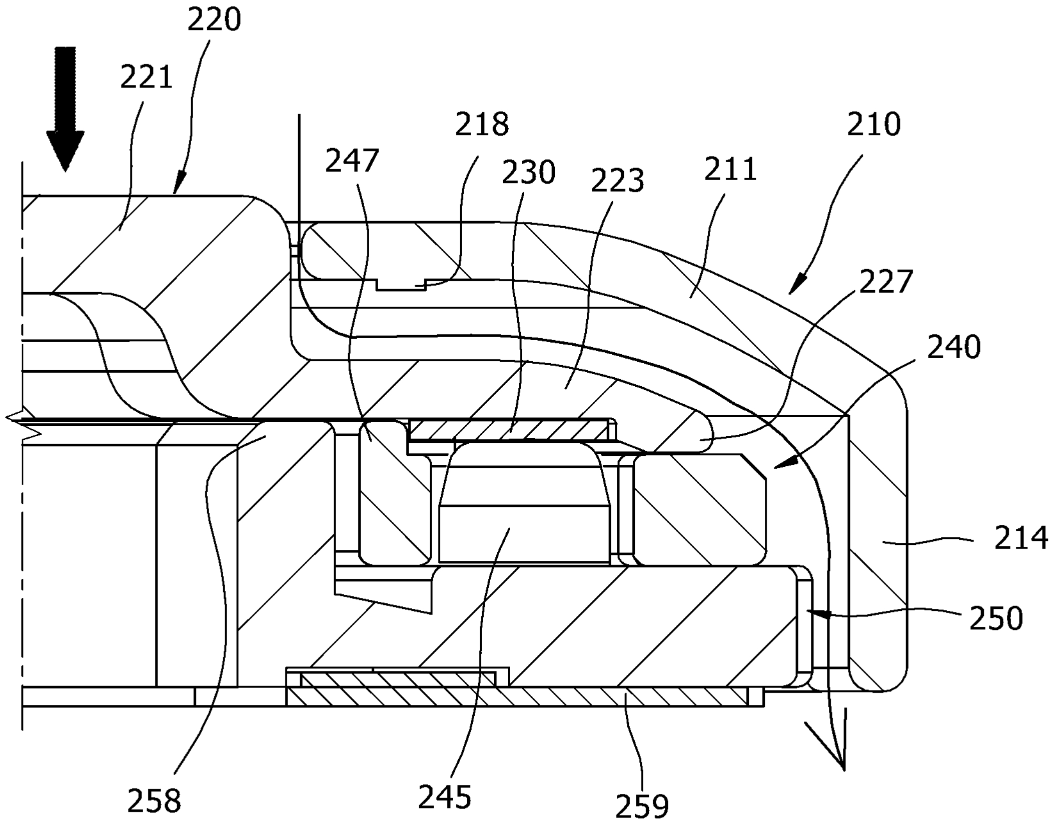
FIG. 32 shows an enlarged view illustrating a state wherein moisture is drained while the button unit is pressed in the electronic device button device according to the second embodiment of the present invention.

FIG. 29 is a cross-sectional view illustrating the electronic device button device according to the second embodiment of the present invention, FIG. 30 is an enlarged view illustrating a state wherein moisture is drained while a button unit is not pressed in the electronic device button device according to the second embodiment of the present invention, FIG. 31 is a cross-sectional view illustrating a state wherein the button unit is pressed in the electronic device button device according to the second embodiment of the present invention, and FIG. 32 is an enlarged view illustrating a state wherein moisture is drained while the button unit is pressed in the electronic device button device according to the second embodiment of the present invention.

Referring to FIGS. 29 to 32, the conductive member 255 includes a conductive rod portion 256 coupled to the adhesive base portion 251 to come in contact with the touch panel unit 12 and a conductive protrusion 257 formed to protrude from the conductive rod portion 256 to pass through the adhesive base portion 251 and come in contact with the inner conductive unit 230. The conductive rod portion 256 may be installed in a circumferential direction of the adhesive base portion 251, and the conductive protrusion 257 may be formed as a plurality of conductive protrusions 257 on the conductive rod portion 256. The conductive rod portion 256 may be formed in an annular shape or made of a plurality of conductive pieces. As the conductive protrusion 257 comes in contact with the inner conductive unit 230, the electrostatic energy of the frame unit 210 is transferred to the conductive protrusion 257 through the inner conductive unit 230, and the conductive protrusion 257 transfers the electrostatic energy to the touch panel unit 12 through the conductive rod portion 256.

The adhesive base portion 251 includes a seating portion 252 formed to be recessed in the adhesive base portion 251 for the conductive rod portion 256 to be seated thereon and a connection hole portion 253 formed in the seating portion 252 for the conductive protrusion 257 to pass therethrough. An upper end of the conductive protrusion 257 is exposed at an upper side of the adhesive base portion 251 through the connection hole portion 253.

The support unit 240 faces the inner conductive unit 230 and includes a support body portion 241 coupled to the frame unit 110 and an elastic member 245 installed at the support body portion 241 to elastically support the button unit 220. The support body portion 241 is formed in an annular shape to correspond to the button flange portion 223 of the button unit 220. The support body portion 241 is disposed to avoid the button body portion 221. The elastic member 245 may be formed in a cylindrical shape or conical shape to be contracted in the longitudinal direction due to a pressing force of the button unit 220. The elastic member 245 may be formed of a synthetic resin material.

A plurality of coupling members 244 are installed to pass through the support body portion 241, and a plurality of boss portions 213 are formed on an inner side surface of the frame unit 210 for the plurality of coupling members 244 to be coupled thereto. Therefore, the support body portion 241 may support the button unit 220 and the inner conductive unit 230 to prevent the button unit 220 and the inner conductive unit 230 from being separated from the frame unit 210.

A plurality of exposed groove portions 243 are formed to be recessed in the support body portion 241 for the conductive protrusions 257 to pass therethrough. Since the conductive protrusions 257 pass through the exposed groove portions 243, even when the support body portion 241 is disposed between the inner conductive unit 230 and the adhesive base portion 251, the inner conductive unit 230 may be lowered and come in contact with the conductive protrusions 257 when the button unit 220 is pressed.

The frame unit 210 includes a frame body portion 211, the frame flange portion 214, and a plurality of restraining sliders 217.

The frame body portion 211 is formed in an annular shape to surround outer sides of the button unit 220, the inner conductive unit 230, and the support unit 240. The frame flange portion 214 is formed in an annular shape along a circumferential portion of the frame body portion 211. The frame flange portion 214 extends to a lower side of the frame body portion 211. The plurality of restraining sliders 217 are formed to protrude from the frame flange portion 214 to be caught on a holder portion 254 of the adhesive conductive unit 250 and restrained. The restraining sliders 217 extend inward from the frame flange portion 214. The holder portion 254 of the adhesive conductive unit 250 may be formed in an L-shape of which a top and one side are blocked. The holder portion 254 is provided as a plurality of holder portions 254 formed along a circumferential portion of the adhesive conductive unit 250. Therefore, when the frame unit 210 is seated on an upper side of the adhesive conductive unit 250 and then rotated a predetermined angle, as the restraining sliders 217 are fitted to the holder portions 254 of the adhesive conductive unit 250, the frame unit 210 can be prevented from being separated to an upper side of the touch panel unit 12.

A circumferential portion of the button flange portion 223 and a circumferential portion of the support unit 240 may be formed to be tapered or round, and a circumferential portion of the adhesive base portion 251 is disposed outward from the circumferential portion of the button flange portion 223 and the circumferential portion of the support unit 240.

A first waterproof protrusion 218 that protrudes to a lower side is formed on the circumferential portion of the frame unit 210, and a second waterproof protrusion 227 that protrudes downward is formed on a circumferential portion of the button unit 220. Here, the first waterproof protrusion 218 is formed in an annular shape or a shape similar thereto on an outer side surface of the frame flange portion 214 in the circumferential direction (see FIG. 30). Also, the second waterproof protrusion 227 is formed in an annular shape or a shape similar thereto in the circumferential direction of the button flange portion 223.

Since the first waterproof protrusion 218 comes in close contact with an upper surface of the button flange portion 223 when the button unit 220 is not pressed, the first waterproof protrusion 218 may block almost all external moisture from entering the button unit 220 and the adhesive conductive unit 250. Also, moisture entering through the first waterproof protrusion 218 is drained to the outside of the frame unit 210 while flowing along the circumferential portion of the button flange portion 223 and the circumferential portion of the support unit 240.

Also, when the button unit 220 is pressed, even when external moisture is introduced through a gap between the frame unit 210 and the button unit 220, the external moisture is drained to the outside of the frame unit 210 while flowing along the circumferential portion of the button flange portion 223 and the circumferential portion of the support unit 240. Also, since the second waterproof protrusion 227 of the button flange portion 223 comes in close contact with an upper surface of the circumferential portion of the support unit 240, the second waterproof protrusion 227 may block external moisture from entering the button unit 220 and the adhesive conductive unit 250.

A third waterproof protrusion 258 is formed to protrude to an upper side from the adhesive conductive unit 250 (see FIG. 32). The third waterproof protrusion 258 is formed in an annular shape at an inner side of the adhesive base portion 251 in the circumferential direction. Therefore, regardless of whether the button unit 220 is pressed, the third waterproof protrusion 258 may prevent moisture that has entered the button unit 220 from being introduced into the adhesive conductive unit 250.

A fourth waterproof protrusion 247 is formed to protrude to an upper side from the support unit 240 (see FIGS. 26 and 30). The fourth waterproof protrusion 247 is formed in an annular shape at an inner side or outer side of the support unit 240 in the circumferential direction. Therefore, regardless of whether the button unit 220 is pressed, the fourth waterproof protrusion 247 may prevent moisture that has entered the button unit 220 from being introduced into the adhesive conductive unit 250.

Since the first waterproof protrusion 218, the second waterproof protrusion 227, the third waterproof protrusion 258, and the fourth waterproof protrusion 247 induce natural drainage of moisture, moisture may be prevented from stagnating in the electronic device button device 200. Also, malfunctioning of the electronic device button device 200 due to moisture entering the frame unit 210, the inner conductive unit 230, and the adhesive conductive unit 250 may be prevented.

Figure 33:
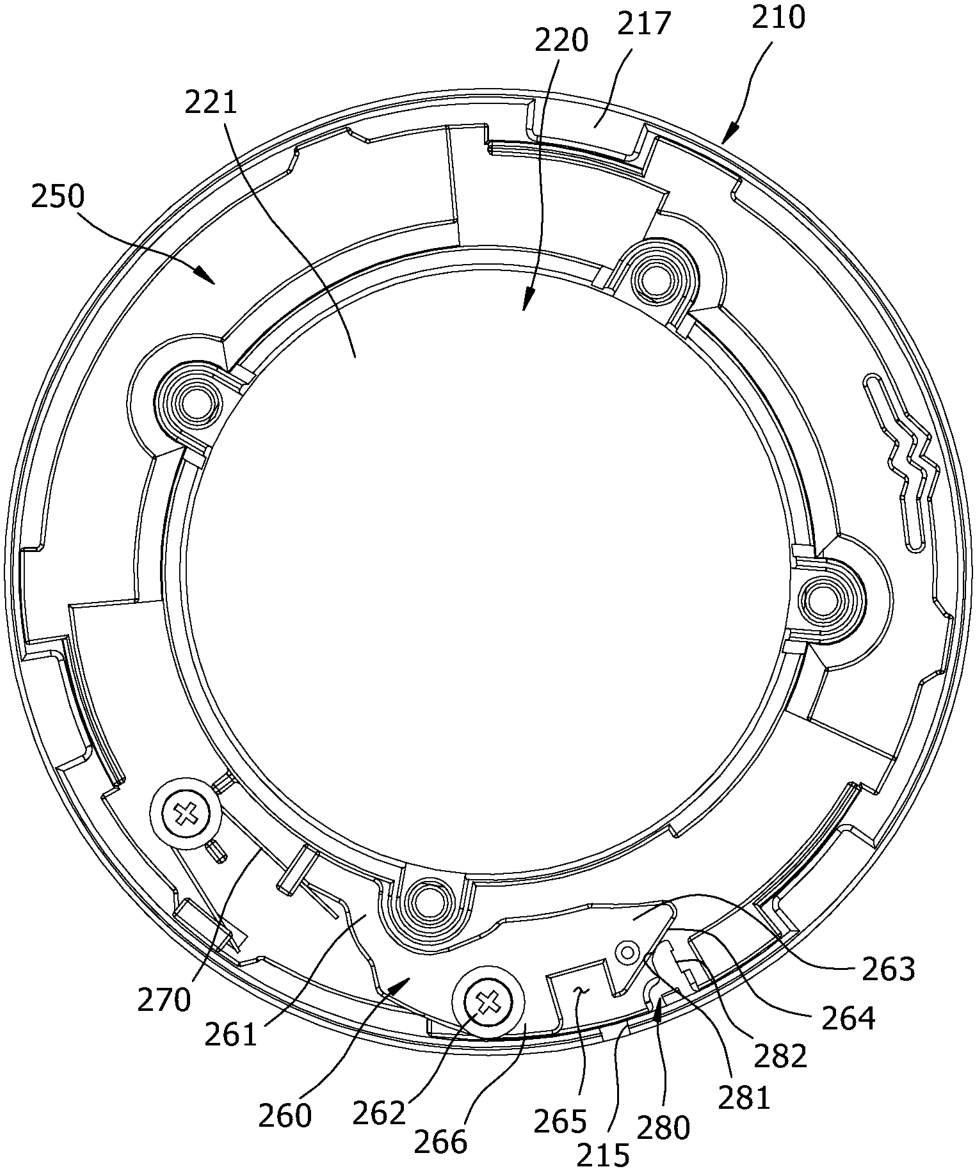
FIG. 33 shows a rear view illustrating a restraining unit and a restraining lever unit in the electronic device button device according to the second embodiment of the present invention.
Figure 34:
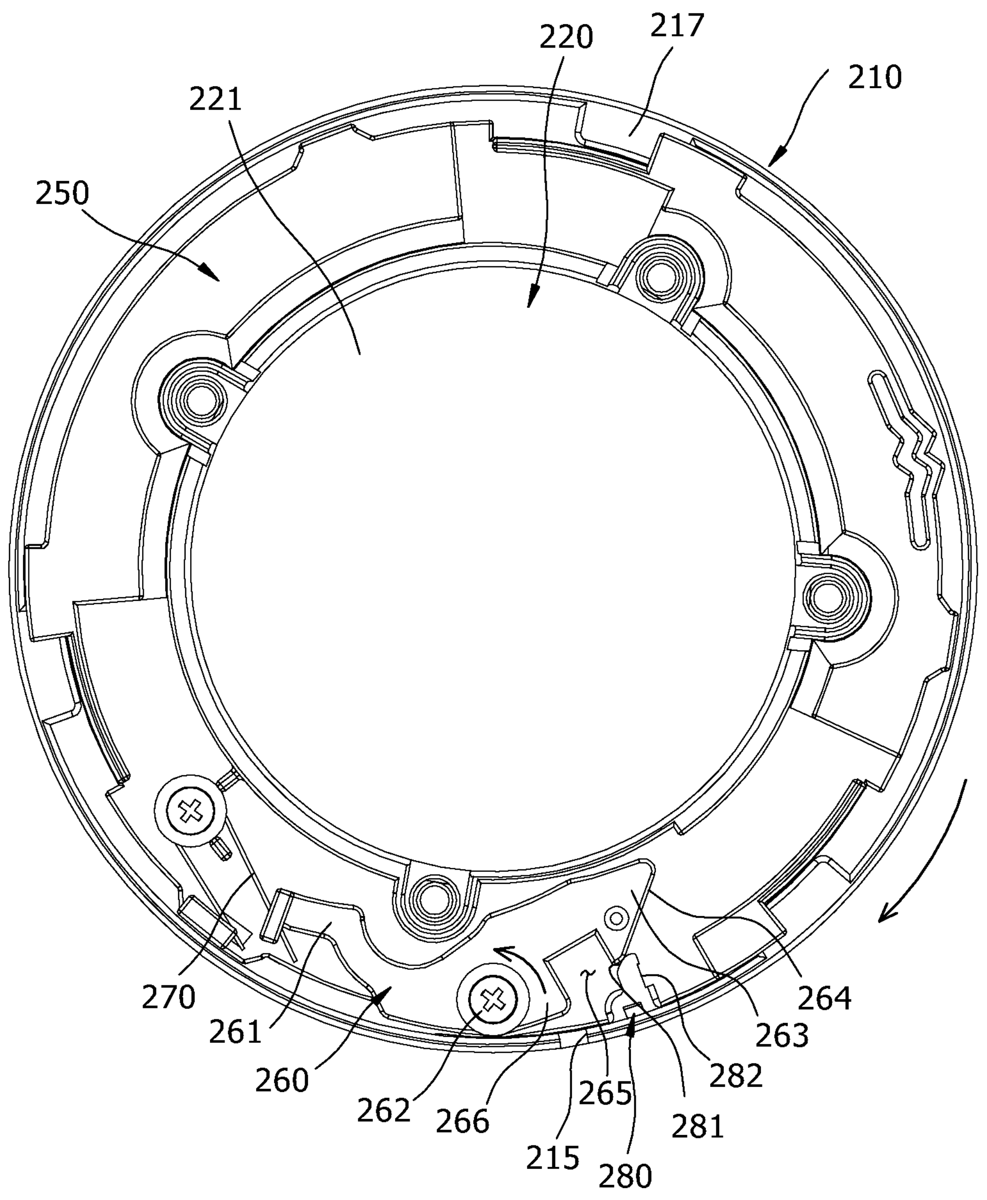
FIG. 34 shows a rear view illustrating a state wherein a locking unit is moved while pressing a hook portion of the restraining lever unit in the electronic device button device according to the second embodiment of the present invention.
Figure 35:
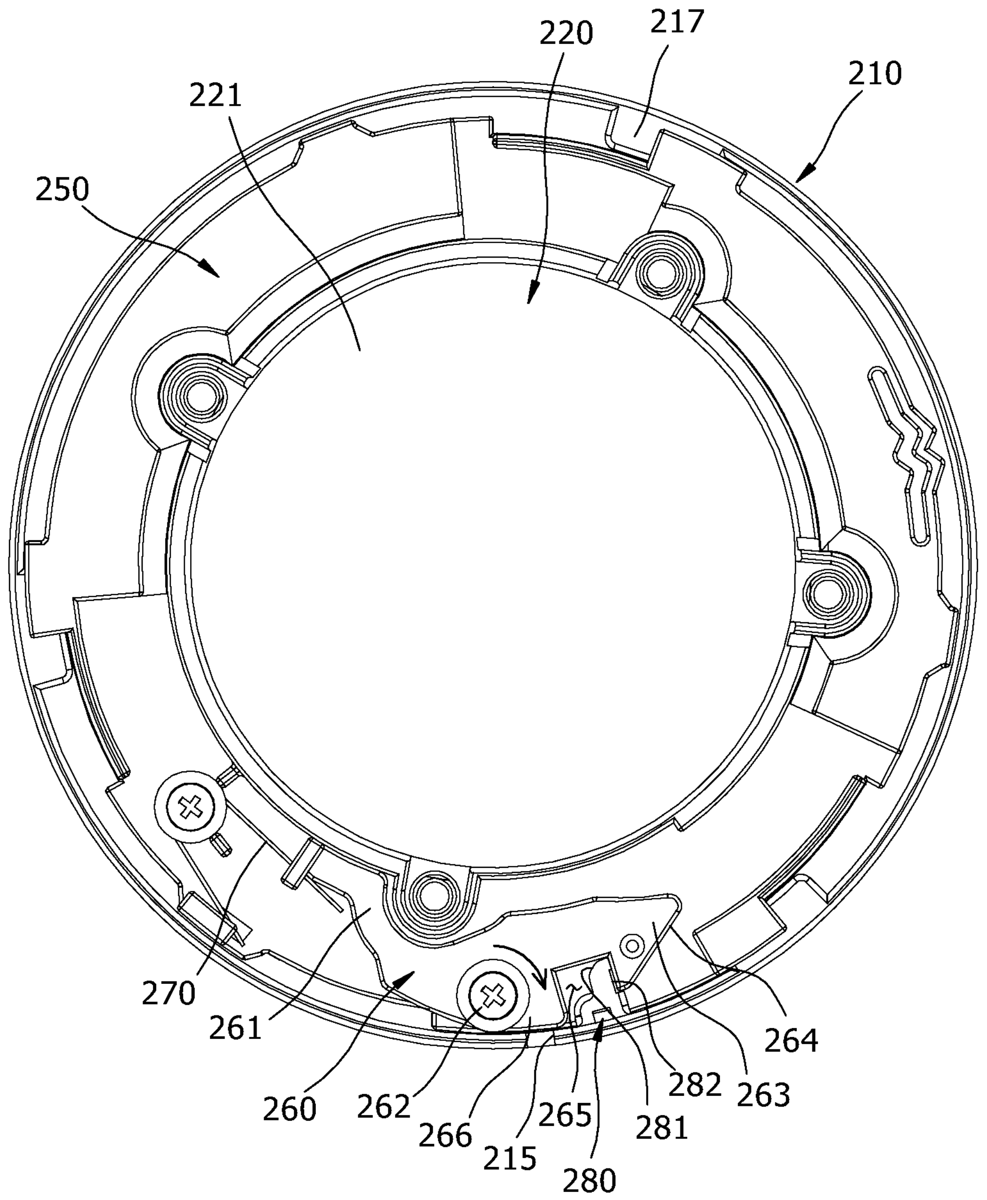
FIG. 35 shows an enlarged view illustrating a state wherein the locking unit is restrained by the restraining lever unit in the electronic device button device according to the second embodiment of the present invention.
Figure 36:
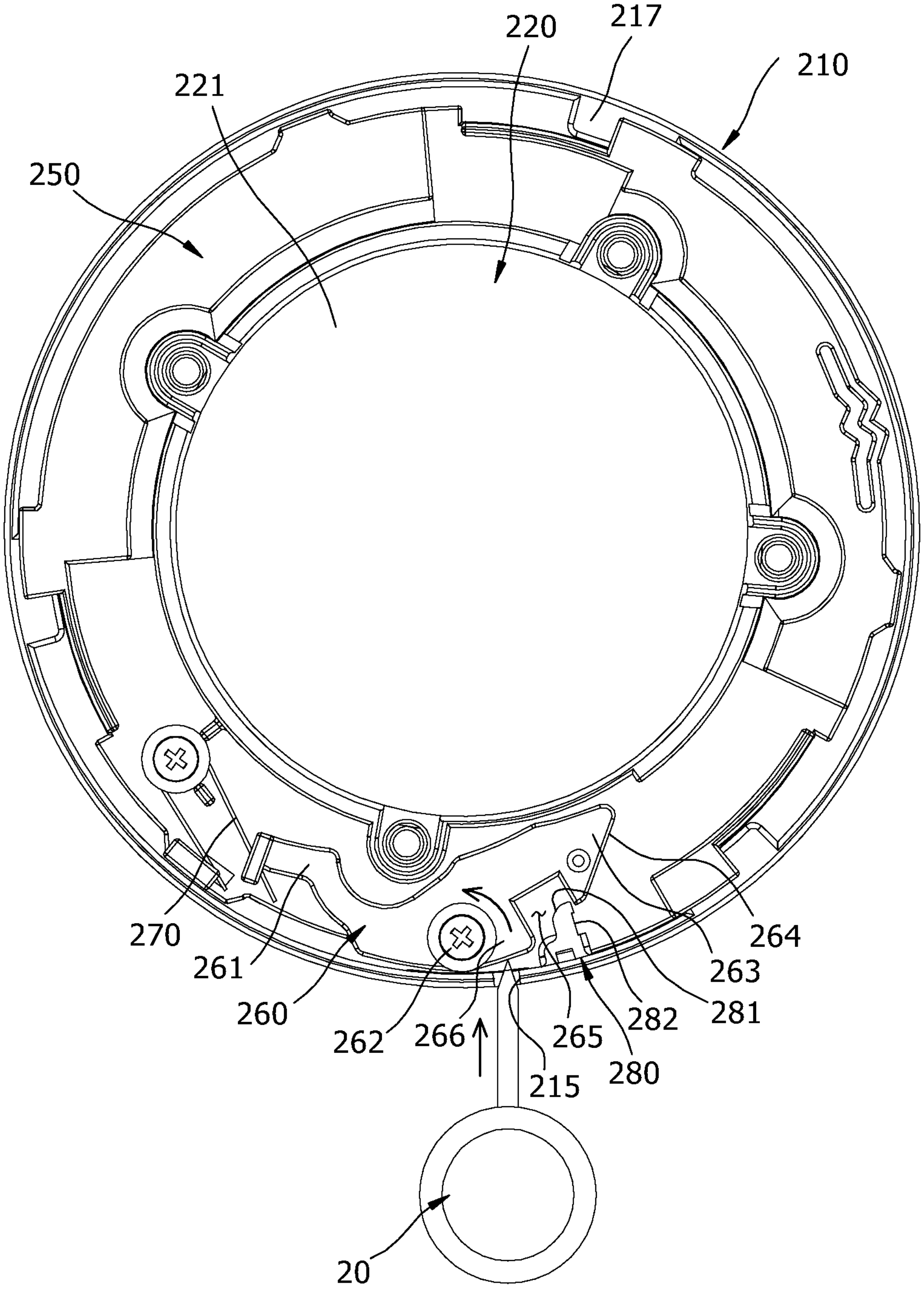
FIG. 36 shows an enlarged view illustrating a state wherein the locking unit is unrestrained by the restraining lever unit as a key is inserted into the restraining unit in the electronic device button device according to the second embodiment of the present invention.
Figure 37:
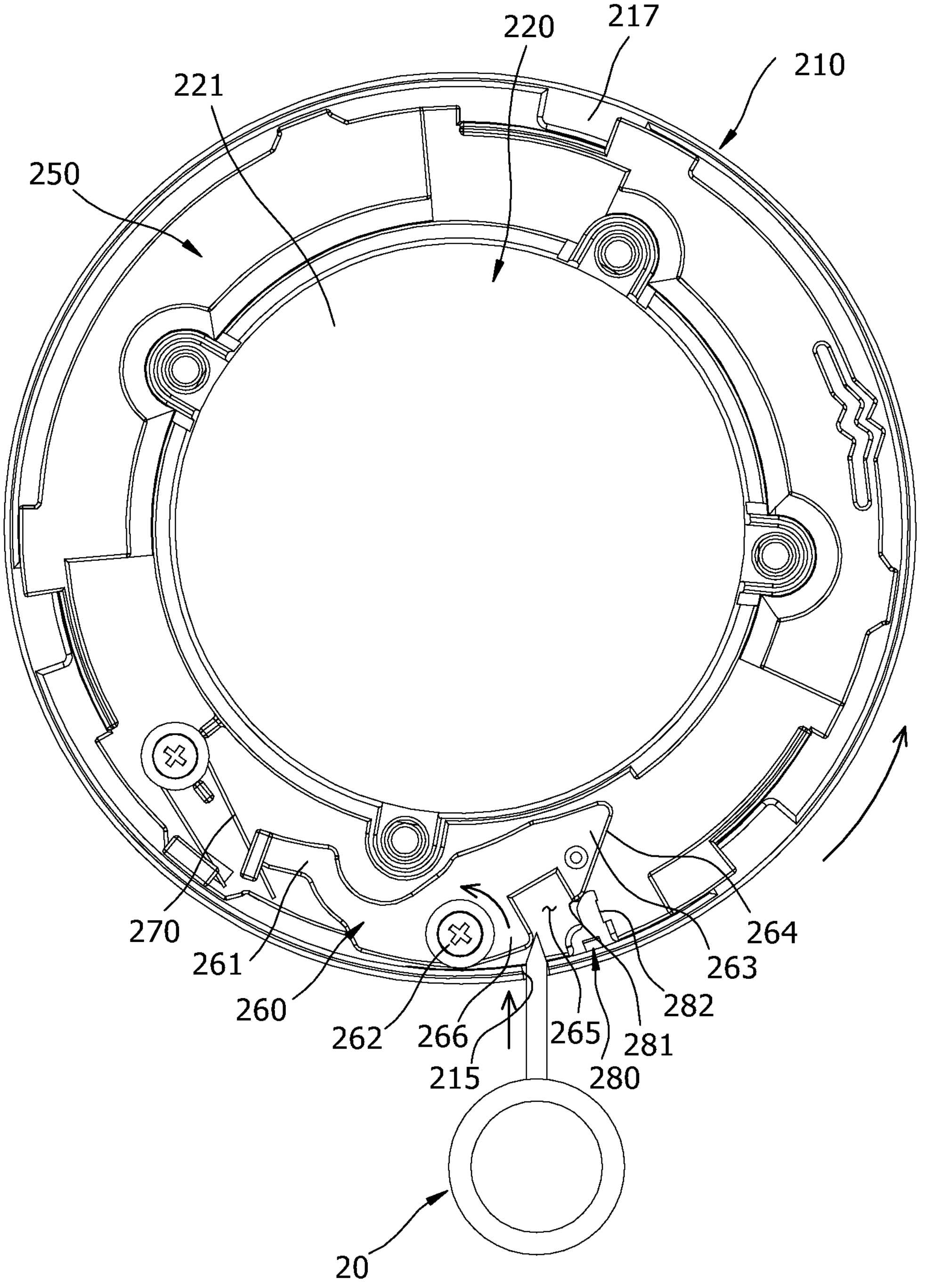
FIG. 37 shows a rear view illustrating a state wherein the locking unit is moved to a release region as the frame unit rotates while the key is pressing the restraining lever unit in the electronic device button device according to the second embodiment of the present invention.

FIG. 33 is a rear view illustrating a restraining unit and a restraining lever unit in the electronic device button device according to the second embodiment of the present invention, FIG. 34 is a rear view illustrating a state wherein a locking unit is moved while pressing a hook portion of the restraining lever unit in the electronic device button device according to the second embodiment of the present invention, FIG. 35 is an enlarged view illustrating a state wherein the locking unit is restrained by the restraining lever unit in the electronic device button device according to the second embodiment of the present invention, FIG. 36 is an enlarged view illustrating a state wherein the locking unit is unrestrained by the restraining lever unit as a key is inserted into the restraining unit in the electronic device button device according to the second embodiment of the present invention, and FIG. 37 is a rear view illustrating a state wherein the locking unit is moved to a release region as the frame unit rotates while the key is pressing the restraining lever unit in the electronic device button device according to the second embodiment of the present invention.

Referring to FIGS. 33 to 37, the electronic device button device 200 includes a restraining lever unit 260, a restraining elastic portion 270, and a locking unit 280.

The restraining lever unit 260 is rotatably installed at the adhesive conductive unit 250 to correspond to a key hole portion 215 of the frame unit 210. The restraining elastic portion 270 is connected to the restraining lever unit 260 to apply an elastic force to the restraining lever unit 260. The locking unit 280 is caught on the restraining lever unit 260 and restrained and is unrestrained by the restraining lever unit 260 when pressed by a key 20 inserted into the key hole portion 215.

The restraining lever unit 260 is disposed at the adhesive conductive unit 250 and includes a lever body portion 261 connected to the restraining elastic portion 270, a hinge shaft portion 262 installed at the adhesive conductive unit 250 to rotate the lever body portion 261, and a hook portion 263 formed at the lever body portion 261 for the locking unit 280 to be caught on the hook portion 263 and restrained. When the lever body portion 261 is pressed by the key 20, as the lever body portion 261 is rotated, the hook portion 263 releases the restrained locking unit 280. Also, when the lever body portion 261 is not pressed by the key 20, the lever body portion 261 is returned to its original position.

The hook portion 263 is formed at one side of the lever body portion 261, and the restraining elastic portion 270 is connected to the other side of the lever body portion 261. Therefore, when the key 20 is inserted into the key hole portion 215 and presses the lever body portion 261, the lever body portion 261 is rotated and presses the restraining elastic portion 270. Also, when the key 20 does not press the lever body portion 261, the lever body portion 261 is returned to its original position due to an elastic force of the restraining elastic portion 270.

The restraining lever unit 260 further includes a pressed portion 266 formed at the lever body portion 261 to correspond to the key hole portion 215. Therefore, when the key 20 is inserted into the key hole portion 215 and then presses the pressed portion 266, the restraining lever unit 260 is rotated about the hinge shaft portion 262 and releases the restrained locking unit 280.

The hook portion 263 includes a hook tapered portion 264 formed at the lever body portion 261 for the locking unit 280 to slide and move, and a hook groove portion 265 formed between the hook tapered portion 264 and the hinge shaft portion 262 for the locking unit 280 to be caught on the hook groove portion 265 and restrained. Therefore, when the frame unit 210 is rotated a predetermined angle and restrained by the adhesive conductive unit 250, the locking unit 280 may be smoothly moved along the hook tapered portion 264 and then inserted into the hook groove portion 265.

A locking tapered portion 281 is formed at one side of the locking unit 280 for the locking unit 280 to be moved along the hook tapered portion 264. Therefore, when the frame unit 210 is rotated a predetermined angle and restrained by the adhesive conductive unit 250, the locking tapered portion 281 may be smoothly moved along the hook tapered portion 264.

A concave portion 282 is formed at the other side of the locking unit 280 to reduce a contact area with one side of the hook groove portion 265. Therefore, when the locking unit 280 is moved along the hook tapered portion 264 and then inserted into the hook groove, one side surface of the hook groove portion 265 may be prevented from coming in contact with the concave portion 282 of the locking unit 280. Therefore, the locking unit 280 and the one side surface of the hook groove portion 265 may be prevented from rubbing against each other.

Figure 38:
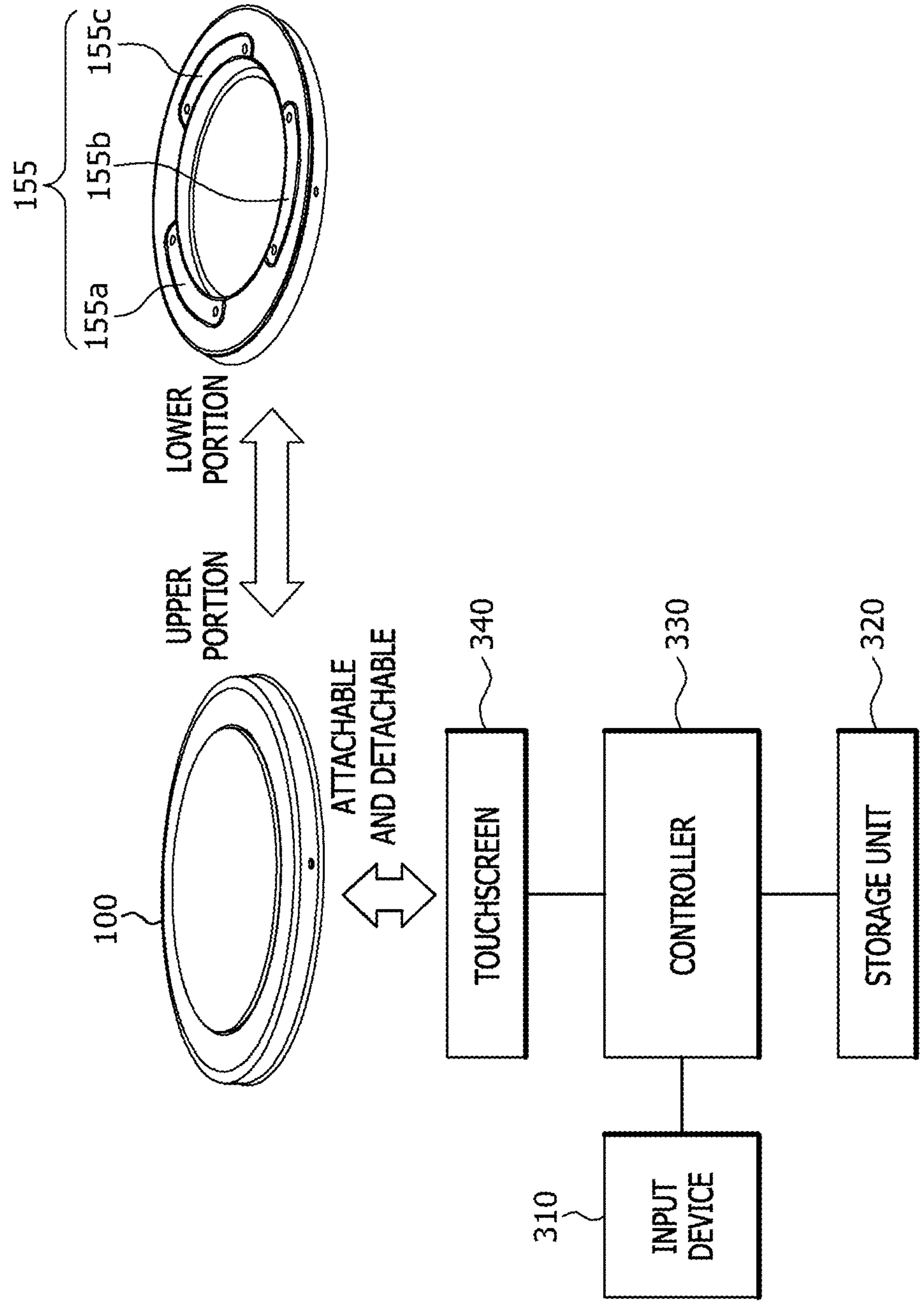
FIG. 38 shows an exemplary view showing a schematic configuration of an electrostatic button interface device according to one embodiment of the present invention.

FIG. 38 is an exemplary view showing a schematic configuration of an electrostatic button interface device according to one embodiment of the present invention.

As illustrated in FIG. 38, an electrostatic button interface device according to the present embodiment may be implemented to be included in a computing device and includes an input device 310, a storage unit 320, a controller 330, and a touchscreen 340. The button device 100 (hereinafter, in the present embodiment, the button device 100 may be referred to as "electrostatic button 100") is attachable to and detachable from an upper surface of the touchscreen 340.

The electrostatic button 100 may be attached to the upper surface of the touchscreen 340 using an adsorption member such as an adhesive, a double-sided tape, an adsorption rubber, or an adsorption pad on a rear surface (or back surface) thereof and may be relatively easily detached compared to a fixing method using a screw.

A plurality of conductive members 155 (155*a* to 155*c*) (which may hereinafter be referred to as "electrostatic points of contact") are formed on the rear surface of the electrostatic button 100, and as the user presses the button unit 120, the plurality of electrostatic points of contact 155 (155*a* to 155*c*) simultaneously protrude and come in contact with the upper surface of the touchscreen 340. Also, as the user releases the pressed button unit 120, the plurality of electrostatic points of contact 155 (155*a* to 155*c*) are simultaneously detached from the upper surface of the touchscreen 340.

Here, the button unit 120 may be formed of a transparent material to allow the user to check information displayed on the touchscreen 340.

Here, although an outer shape of the electrostatic button 100 and an outer shape of the button unit 120 are illustrated as circular shapes in the present embodiment, the electrostatic button 100 and the button unit 120 may be implemented in various other shapes such as a triangular shape, a quadrangular shape, or a pentagonal shape. Also, the plurality of electrostatic points of contact 155 (155*a* to 155*c*) formed on the rear surface of the electrostatic button 100 are likewise not limited to having any one shape and may be implemented in various shapes. It should be noted that intervals between the electrostatic points of contact 155 (155*a* to 155*c*) or the number thereof may also be implemented in various ways. For example, this indicates that, even when the outer shape of the electrostatic button 100 is a circular shape as in the present embodiment, the overall size of the electrostatic button 100 and the shape and number of the electrostatic points of contact 155 (155*a* to 155*c*) formed on the rear surface of the electrostatic button 100 may be implemented differently.

However, for example, the number of the plurality of electrostatic points of contact 155 (155*a* to 155*c*) may be at least three or more. This is because, when the controller 330 forms a virtual polygon by drawing virtual straight lines that connect centers of the plurality of electrostatic points of contact 155 (155*a* to 155*c*), it should be possible to form at least a virtual triangle having three sides. The reason will be described in detail below.

The input device 310 is an input means basically provided in addition to the electrostatic button 100. Examples of the input device 310 include a keyboard (including a software keyboard displayed on a touchscreen), a fixed button (for example, a power button, a call button, etc.), and a mouse (including a touch panel on which touch and drag functions can be performed).

Through the input device 310, the user may input a command to control an operation (or function) of the controller 330 (for example, a game operation in the case of a game device).

The storage unit 320 stores a control program and setting information necessary for the operation of the controller 330.

For example, the storage unit 320 may store a plurality of pieces of information on the electrostatic button 100 and may store a program for storing (or registering) detected information on the electrostatic button 100.

The controller 330 may process a command input through the input device 310, and here, the controller 330 may process the input command by loading, from the storage unit 320, the control program and setting information that correspond to the input command.

For example, the controller 330 may detect information on the electrostatic button 100 attached to the upper surface of the touchscreen 340, store (or register) the detected information in the storage unit 320, detect an input on the registered electrostatic button 100, and perform an operation that corresponds to the electrostatic button 100 (for example, an attacking operation or a defending operation designated to a button of a game machine).

When the controller 330 processes a command (or executes a control program), the touchscreen 340 outputs image or text information, detects a direct touch input of the user and a touch input on the electrostatic button 100, and transmits the detected touch inputs to the controller 330.

Meanwhile, a plurality of electrostatic buttons 100 may be attached to the touchscreen 340, and different commands may be set for each of the plurality of electrostatic buttons 100.

Here, in order to set different commands for each of the plurality of electrostatic buttons 100, a process of preregistering the electrostatic buttons 100 is necessary.

In other words, when positions to receive a touch input from the user (that is, positions to attach the electrostatic buttons 100) (for example, a missile firing button, a direction control button, etc. in a game machine) are predetermined according to a program executed by a computing device, the plurality of electrostatic buttons 100 are simply attached to the predetermined positions, and thus a separate process for registering the electrostatic buttons 100 is not necessary.

However, when positions to receive a touch input from the user are not predetermined, and positions to receive a touch input and commands to be executed when a touch input is made may be set by the user's selection, the user has to attach the electrostatic button 100 to a desired position, and then perform a process of registering a position to which the button is attached and a command to be executed when the button is pressed.

Accordingly, in the present embodiment, the electrostatic button interface device and the electrostatic button interface method indicate a device and method for, when the user wants to attach at least one or more electrostatic buttons 100 to the touchscreen 340 of a computing device and use the at least one or more electrostatic buttons 100, attaching the at least one or more electrostatic buttons 100 to desired positions on the touchscreen 340 and then setting (or registering) commands to be executed when an input is made on the electrostatic buttons 100.

Hereinafter, the electrostatic button interface method of the controller 330 will be described in more detail with reference to FIGS. 39 to 41.

Figure 39:
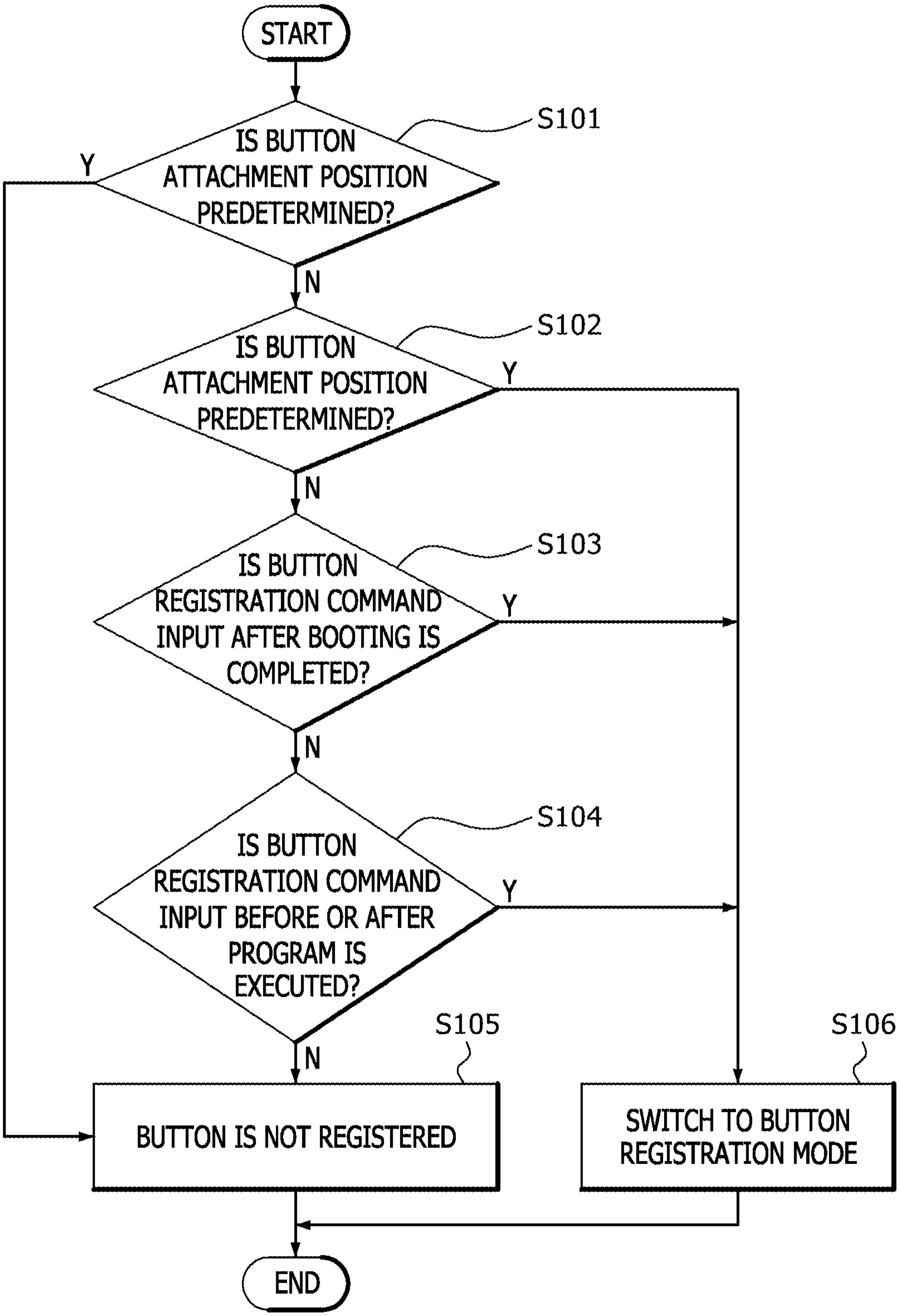
FIG. 39 shows a flowchart for describing an electrostatic button interface method according to one embodiment of the present invention.

FIG. 39 is a flowchart for describing an electrostatic button interface method according to one embodiment of the present invention.

Referring to FIG. 39, the controller 330 checks whether a button attachment position is predetermined (S101).

For example, whether a position to receive a touch input from a user (that is, a position to attach the electrostatic button 100) (for example, a missile firing button, a direction control button, etc. in a game machine) is predetermined may be checked by checking whether a predetermined specific flag is set in a computing device (or a program executed by the computing device).

When the result of checking whether the button attachment position is predetermined indicates that the button attachment position is not predetermined (No in S101), the controller 330 checks whether a button registration command is input during booting of a computing device (S102).

For example, during the booting of the computing device, the controller 330 may check whether a command to execute a button registration program is automatically input by a predetermined batch program or a predetermined specific key of the input device 310 is manually input by the user.

Accordingly, when the button registration command is input during the booting of the computing device (Yes in S102), the controller 330 immediately switches the computing device to a button registration mode (S106) (an operation of the button registration mode will be described below with reference to FIG. 40).

However, when the button registration command is not input during the booting of the computing device (No in S102), the controller 330 checks whether the button registration command is input after the booting of the computing device is completed (S103).

For example, after the booting of the computing device is completed, the controller 330 may check whether a predetermined specific key of the input device 310 is input from the user or the button registration command is input through execution of the button registration program.

Accordingly, when the button registration command is input after the booting of the computing device is completed (Yes in S103), the controller 330 immediately switches the computing device to the button registration mode (S106).

However, when the button registration command is not input even after the booting of the computing device is completed (No in S103), the controller 330 checks whether the button registration command is input when a specific program (for example, a game program) is executed in the computing device (for example, before or after the game program is executed) (S104).

Accordingly, when the button registration command is input when the specific program (for example, a game program) is executed in the computing device (for example, before or after the game program is executed) (Yes in S104), the controller 330 immediately switches the computing device to the button registration mode (S106).

However, when the button registration command is not input (No in S104) in any of the situations (S102, S103, and S104), this indicates that the user does not register a button even when the button attachment position is not predetermined (S105) (for example, there is no electrostatic button 100 to be registered by the user).

Figure 40:
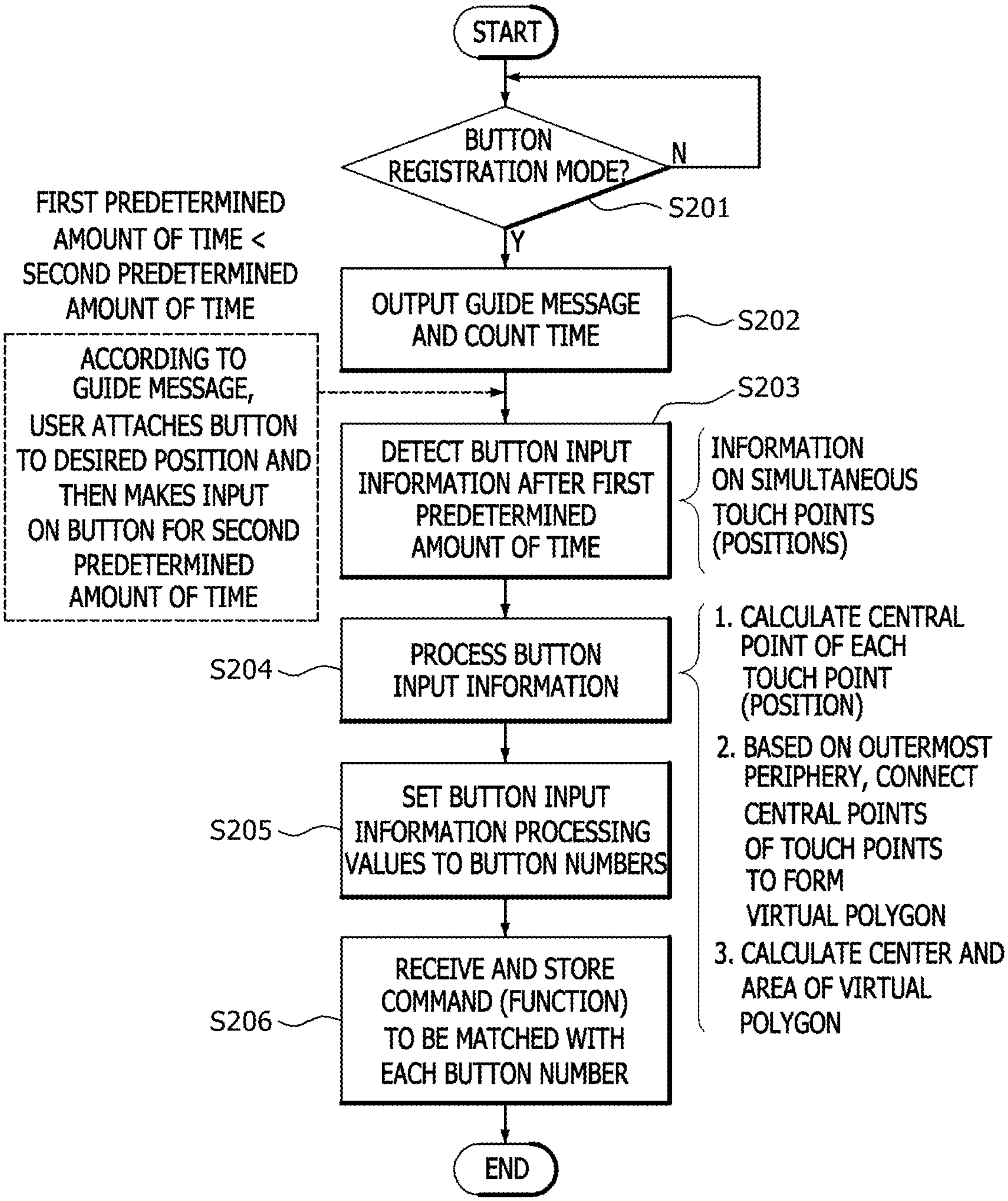
FIG. 40 shows a flowchart for describing an operation of a button registration mode in FIG. 39.

FIG. 40 is a flowchart for describing an operation of a button registration mode in FIG. 39.

Referring to FIG. 40, when the controller 330 has switched the computing device to the button registration mode (Yes in S201), the controller 330 outputs a predetermined guide message (for example, a message that guides the user to attach the electrostatic button 100 to a desired position on the touchscreen 340 and then press the electrostatic button 100 for a predetermined amount of time) and counts the time during which the user presses the electrostatic button 100 according to the guide message (S202).

Here, the controller 330 may guide the user to press the electrostatic button 100 for a second predetermined amount of time (for example, 10 seconds) through the guide message, and when a first predetermined amount of time (for example, 5 seconds) passes, the controller 330 detects button input information relating to the electrostatic button 100 pressed by the user (S203).

For example, the button input information includes information on simultaneous touch points (positions) and information on the number of simultaneous touches based on features of the electrostatic button 100 according to the present embodiment. Here, as described above, the number of simultaneous touches should be at least three or more.

When the button input information (for example, information on simultaneous touch points (positions) and information on the number of simultaneous touches) is detected as described above, the controller 330 processes the button input information according to a predetermined method (S204).

For example, the controller 330 calculates a central point of each touch point (position) from the button input information (for example, information on simultaneous touch points (positions) and information on the number of simultaneous touches), and based on the outermost periphery, connects the central points of the touch points in virtual straight lines to form a virtual closed polygon. Also, the controller 330 calculates the center and area of the virtual closed polygon. For example, when it is assumed that the number of simultaneous touches is three, the controller 330 may connect the centers of the simultaneous touch points in virtual straight lines to form a virtual triangle and may calculate the center and area of the virtual triangle.

That is, button input information processing values include simultaneous touch points (positions), the number of simultaneous touches, a central point of each touch point (position), a virtual closed polygon formed by connecting the central points of the touch points in virtual straight lines, and the center and area of the virtual closed polygon.

The button input information and the button input information processing values calculated by processing the button input information are stored in the storage unit 320 and serve as unique information that distinguishes the corresponding electrostatic button 100 from another electrostatic button 100.

When processing of the button input information is completed as described above, the controller 330 sets the button input information processing values to button numbers (for example, Button #1, Button #2, Button #3, and the like) (S205).

For example, when it is assumed that a plurality of electrostatic buttons 100 are registered, a button number (for example, Button #1, Button #2, Button #3, and the like) is set for each electrostatic button 100.

Also, the controller 330 displays a list of commands (or functions) that the user may match with the button numbers (for example, Button #1, Button #2, Button #3, and the like), receives a command (or function) to be matched with each button from the user, and stores the commands (or functions) in the storage unit 320 to complete button registration (S206).

Hereinafter, a method wherein the controller 330 detects an input on the electrostatic button 100 and operates when the user presses the corresponding electrostatic button 100 after the registration of the electrostatic button 100 is completed as described above will be described.

Figure 41:
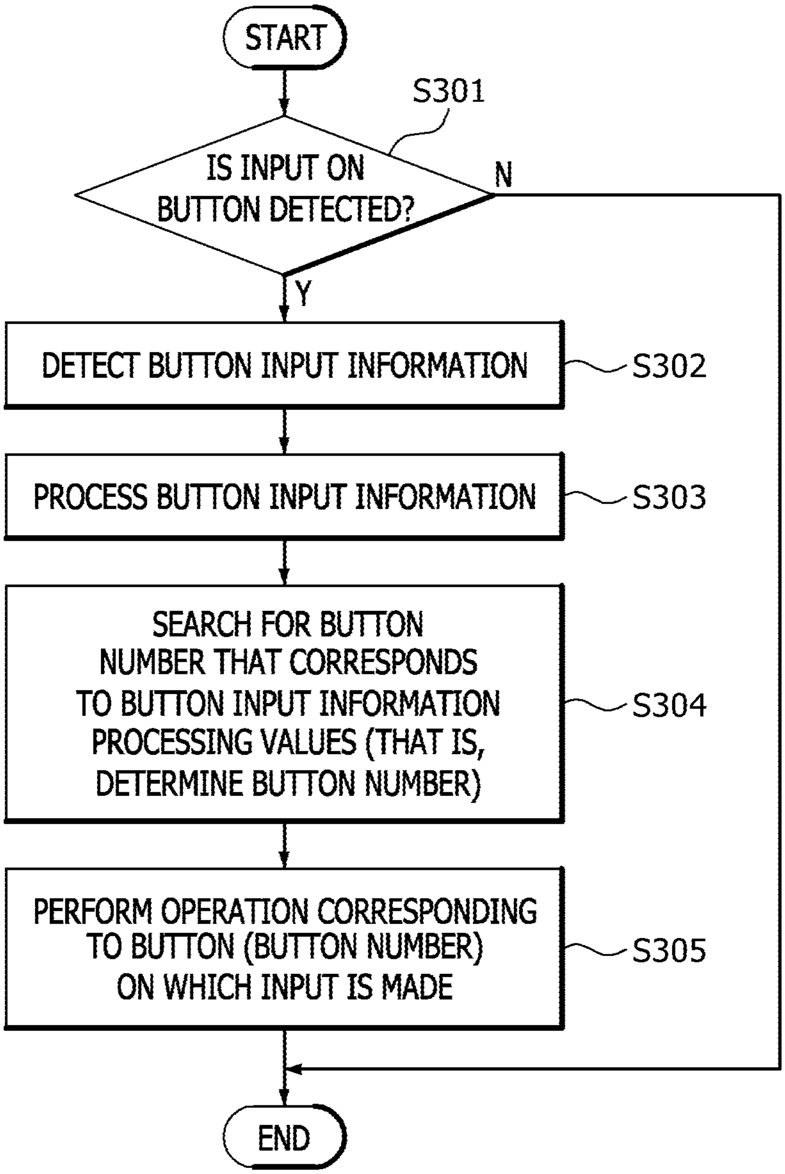
FIG. 41 shows a flowchart for describing a method of detecting an input on a registered electrostatic button and performing an operation corresponding thereto in FIG. 40.

FIG. 41 is a flowchart for describing a method of detecting an input on the registered electrostatic button 100 and performing an operation corresponding thereto in FIG. 40.

Referring to FIG. 41, when an input on a button is detected (Yes in S301), that is, pressing of the preregistered electrostatic button 100 is detected, the controller 330 detects button input information (for example, information on simultaneous touch points (positions) and information on the number of simultaneous touches) relating to the electrostatic button 100 (S302).

When the button input information (for example, information on simultaneous touch points (positions) and information on the number of simultaneous touches) is detected as described above, the controller 330 processes the button input information according to a predetermined method and calculates button input information processing values (S303).

For example, in order to calculate the button input information processing values, the controller 330 calculates a central point of each touch point (position) from the button input information (for example, information on simultaneous touch points (positions) and information on the number of simultaneous touches), and based on the outermost periphery, connects the central points of the touch points in virtual straight lines to form a virtual closed polygon. Also, the controller 330 calculates the center and area of the virtual closed polygon. For example, when it is assumed that the number of simultaneous touches is three, the controller 330 may connect the centers of the simultaneous touch points in virtual straight lines to form a virtual triangle and may calculate the center and area of the virtual triangle.

That is, the button input information processing values include simultaneous touch points (positions), the number of simultaneous touches, a central point of each touch point (position), a virtual closed polygon formed by connecting the central points of the touch points in virtual straight lines, and the center and area of the virtual closed polygon.

Also, the controller 330 searches for a button number that corresponds to the calculated button input information processing values from the storage unit 320 (that is, determines a button number that corresponds to the button input information processing values) (S304).

For example, button input information processing values relating to each of the preregistered electrostatic buttons 100 and button numbers and operations (or execution commands) that correspond thereto are stored in the form of a lookup table in the storage unit 320.

Therefore, the controller 330 searches for the button number that corresponds to the button input information processing values and performs an operation (or an execution command) set to correspond to the button number (S305).

As described above, in the present embodiment, an interface is provided for the user to attach a plurality of electrostatic buttons, which are attachable to and detachable from a surface of a touchscreen of a computing device using the touchscreen such as a game machine, to desired positions and then perform desired functions. In this way, there is an effect of allowing various functions of the computing device to be controlled using the electrostatic buttons.

Figure 42:
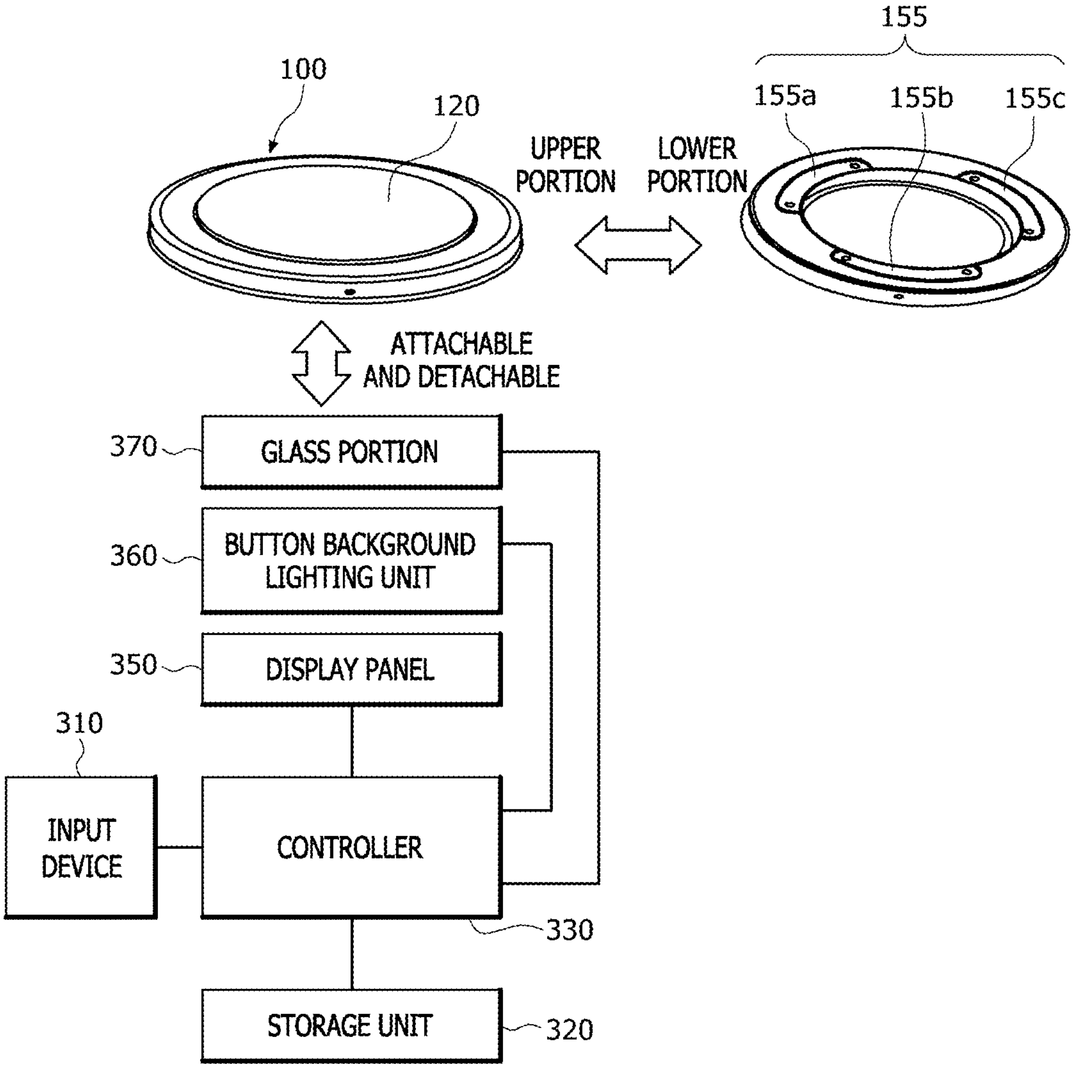
FIG. 42 shows an exemplary view showing a schematic configuration of a background lighting device for an electrostatic button according to one embodiment of the present invention.

FIG. 42 is an exemplary view showing a schematic configuration of a background lighting device for an electrostatic button according to one embodiment of the present invention.

As illustrated in FIG. 42, a background lighting device for an electrostatic button according to the present embodiment may be implemented to be included in a computing device (or a game device in a casino or the like) having a touchscreen (that is, a touchscreen including a display panel 350 and a glass portion 370) and includes an input device 310, a storage unit 320, a controller 330, the display panel 350, a button background lighting unit 360, and the glass portion 370.

The glass portion 370 serves as a touch panel that detects a touch using an electrostatic method, and the button device 100 (hereinafter, in the present embodiment, the button device 100 may be referred to as "electrostatic button 100") is attachable to and detachable from an upper surface of the glass portion 370.

The electrostatic button 100 may be attached to the upper surface of the glass portion 370 using an adsorption member such as an adhesive, a double-sided tape, an adsorption rubber, or an adsorption pad on a rear surface (or back surface) thereof and may be relatively easily detached compared to a conventional fixed button (not illustrated) fixed using a screw. Also, since a screw hole is not formed, damage to the display panel 350 and the glass portion 370 may be prevented.

A plurality of conductive members 155 (155*a* to 155*c*) (which may hereinafter be referred to as "electrostatic points of contact") are formed on the rear surface of the electrostatic button 100, and as the user presses the button unit 120, the plurality of electrostatic points of contact 155 (155*a* to 155*c*) simultaneously protrude and come in contact with the upper surface of the glass portion 370. Also, as the user releases the pressed button unit 120, the plurality of electrostatic points of contact 155 (155*a* to 155*c*) are simultaneously detached from the upper surface of the glass portion 370.

Here, the button unit 120 may be formed of a transparent material to allow the user to check information displayed on the display panel 350.

Here, although an outer shape of the electrostatic button 100 and an outer shape of the button unit 120 are illustrated as circular shapes in the present embodiment, the electrostatic button 100 and the button unit 120 may be implemented in various other shapes such as a triangular shape, a quadrangular shape, or a pentagonal shape. Also, the plurality of electrostatic points of contact 155 (155*a* to 155*c*) formed on the rear surface of the electrostatic button 100 are likewise not limited to having any one shape and may be implemented in various shapes. It should be noted that intervals between the electrostatic points of contact 155 (155*a* to 155*c*) or the number thereof may also be implemented in various ways.

For example, this indicates that, even when the outer shape of the electrostatic button 100 is a circular shape as in the present embodiment, the overall size of the electrostatic button 100 and the shape and number of the electrostatic points of contact 155 (155*a* to 155*c*) formed on the rear surface of the electrostatic button 100 may be implemented differently.

However, for example, the number of the plurality of electrostatic points of contact 155 (155*a* to 155*c*) may be at least three or more. This is because, when the controller 330 forms a virtual polygon by drawing virtual straight lines that connect centers of the plurality of electrostatic points of contact 155 (155*a* to 155*c*), it should be possible to form at least a virtual triangle having three sides. The reason will be described in detail below.

The input device 310 is an input means basically provided in addition to the electrostatic button 100. Examples of the input device 310 include a keyboard (including a software keyboard displayed on a display panel), a fixed button (for example, a power button, a call button, etc.), and a mouse (including a touch panel on which touch and drag functions can be performed).

Through the input device 310, the user may input a command to control an operation (or function) of the controller 330 (for example, a game operation in the case of a game device).

The storage unit 320 stores a control program necessary for the operation of the controller 330 (for example, a program for operating lighting of the button background lighting unit 360) and setting information for operating the lighting of the button background lighting unit 360.

The controller 330 may process a command input through the input device 310, and here, the controller 330 may process the input command by loading, from the storage unit 320, the control program and setting information that correspond to the input command.

Also, the controller 330 may process a command that corresponds to an input on the electrostatic button 100 (pressing or releasing of the electrostatic button 100) that is input through the glass portion 370, and that controller 330 controls the operation of the lighting of the button background lighting unit 360 mounted at a position that corresponds to the electrostatic button 100.

For example, when an input is made on the electrostatic button 100, the controller 330 may operate the button background lighting unit 360 with a predetermined lighting pattern, and even when an input is not made on the electrostatic button 100, the controller 330 may operate the button background lighting unit 360 with a predetermined lighting pattern to correspond to a specific event (for example, a game event).

Figure 43:
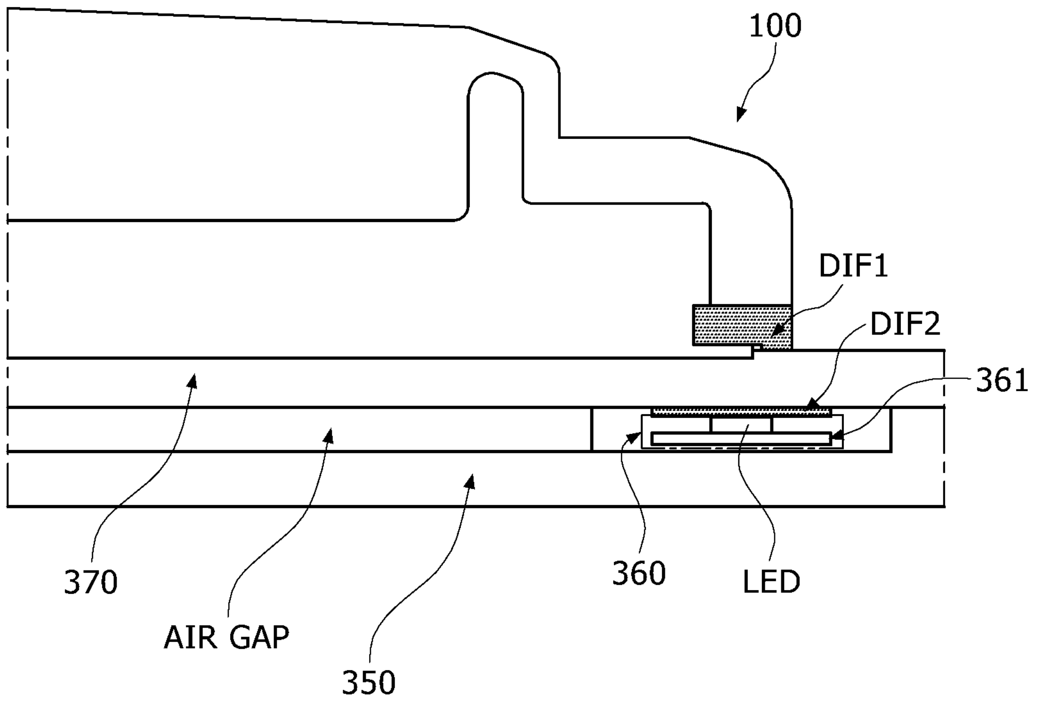
FIG. 43 shows an exemplary view shown to describe the position and configuration of a button background lighting unit installed to correspond to the position of the electrostatic button attached to a glass portion in FIG. 42.

The button background lighting unit 360 is installed in an air gap formed between the display panel 350 and the glass portion 370 (see FIG. 43).

Figure 45:
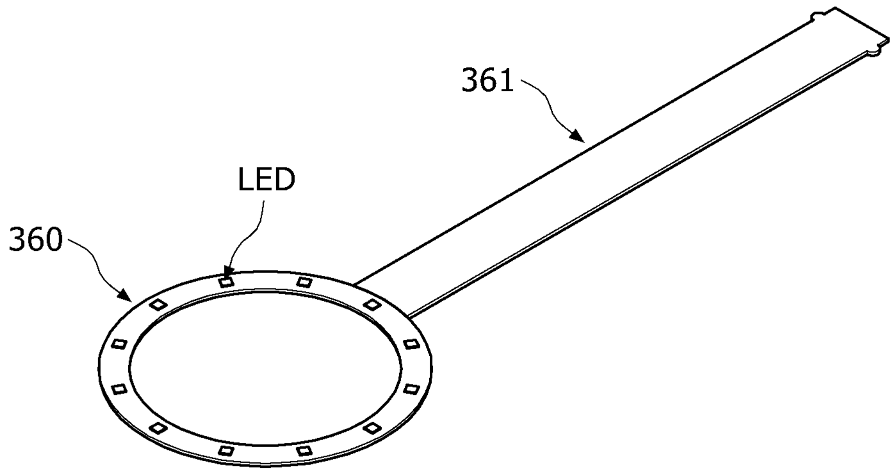
FIG. 45 shows an exemplary view shown to describe a schematic shape of the button background lighting unit in FIG. 42.

Also, the button background lighting unit 360 is formed in a shape that corresponds to an outer shape of the electrostatic button 100 (see FIG. 45).

For example, when the electrostatic button 100 has a circular shape as in the present embodiment, the button background lighting unit 360 is also formed in a circular shape, and when the outer shape of the electrostatic button 100 is a triangular shape, a quadrangular shape, or a pentagonal shape, the button background lighting unit 360 is also formed in a triangular shape, a quadrangular shape, or a pentagonal shape.

Figure 44:
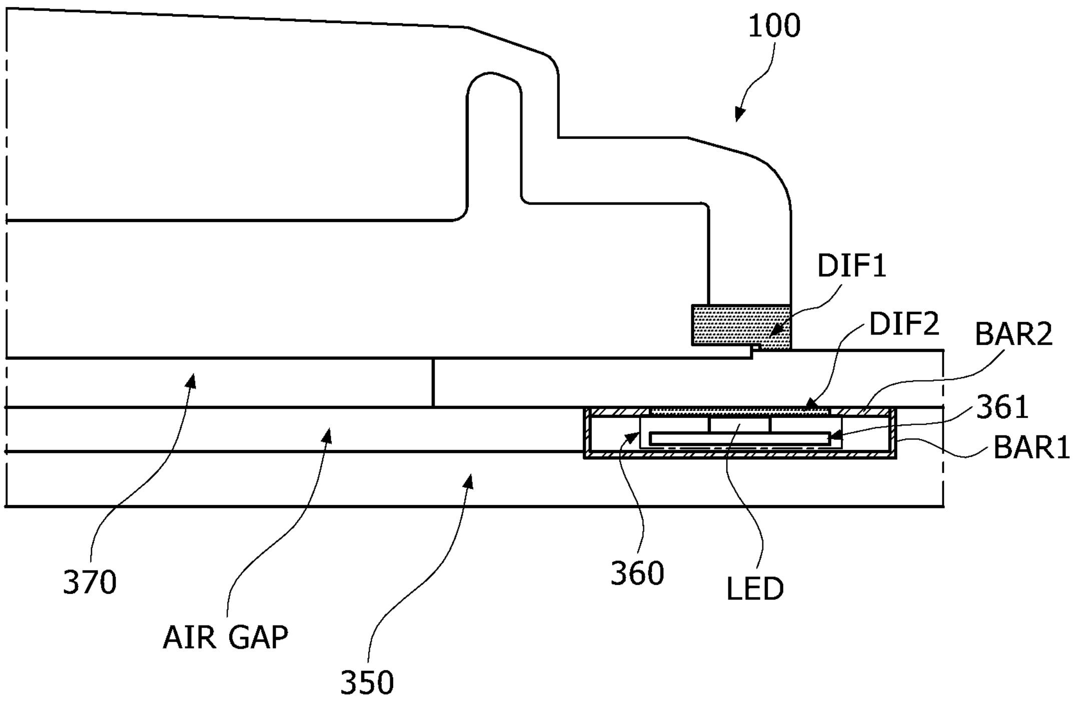
FIG. 44 shows an exemplary view shown to describe the positions and configurations of a first lighting barrier and a second lighting barrier formed to prevent the lighting from being diffused to the outside except for a background portion of the electrostatic button in FIG. 43.

FIG. 43 is an exemplary view shown to describe the position and configuration of a button background lighting unit installed to correspond to the position of the electrostatic button attached to the glass portion in FIG. 42. Also, FIG. 44 is an exemplary view shown to describe the positions and configurations of a first lighting barrier and a second lighting barrier formed to prevent the lighting from being diffused to the outside except for a background portion of the electrostatic button in FIG. 43.

Referring to FIG. 43, in the frame body portion 111 (see FIG. 4) of the electrostatic button 100, a first lighting diffuser DIF1 may be formed at an upper side of the support unit 140 (see FIG. 4) having an annular shape (or ring shape) that is in close contact with the glass portion 370.

The first lighting diffuser DIF1 serves to diffuse lighting (light) emitted from a hot spot (that is, a light emitting diode (LED)) of the button background lighting unit 360 to the outside (or an outer side) of the support unit 140 (see FIG. 4).

A second lighting diffuser DIF2 is formed at an upper side of the button background lighting unit 360. The second lighting diffuser DIF2 is formed to be larger (wider) than the first lighting diffuser DIF1 and serves to diffuse the lighting emitted from the hot spot (that is, the LED) of the button background lighting unit 360 to the outside (or outer side) of the support unit 140 (see FIG. 4).

Here, the first lighting diffuser DIF1 and the second lighting diffuser DIF2 may be formed of a white material or have a white material attached thereto (or coated thereon) to improve an effect of diffusing the lighting (light).

Here, in order to illuminate only the background portion of the electrostatic button 100 (that is, a circumferential portion of a lower side of the support unit 140 (see FIG. 4) attached to the glass portion), a first lighting barrier BAR1 is formed (installed) at the circumference of the button background lighting unit 360 to allow light to be projected only through the second lighting diffuser DIF2.

Further, a second lighting barrier BAR2 for preventing light from being projected may be formed on or attached to a region of a lower side surface of the glass portion 370 excluding the second lighting diffuser DIF2 (that is, a region up to a boundary portion of the first lighting barrier BAR1) (see FIG. 44).

Here, the first lighting barrier BAR1 and the second lighting barrier BAR2 may be formed of a black material or have a black material attached thereto (or coated thereon) to prevent the lighting (light) from being diffused to the outside except for the background portion of the electrostatic button 100 (that is, the circumferential portion of the lower side of the support unit 140 (see FIG. 4) attached to the glass portion).

FIG. 45 is an exemplary view shown to describe a schematic shape of the button background lighting unit in FIG. 42.

Referring to FIG. 45, in the button background lighting unit 360, a plurality of light sources (LEDs) are attached at predetermined intervals onto a substrate (for example, a printed circuit board (PCB)) formed in a shape that corresponds to the outer shape of the electrostatic button 100 (for example, a circular shape). A flexible flat cable (FFC) 361 may be used to provide a signal for applying power to the plurality of light sources (LEDs) and driving the same. Here, for example, the substrate (for example, a PCB) and the FFC 361 may be formed of a transparent material.

Figure 46:
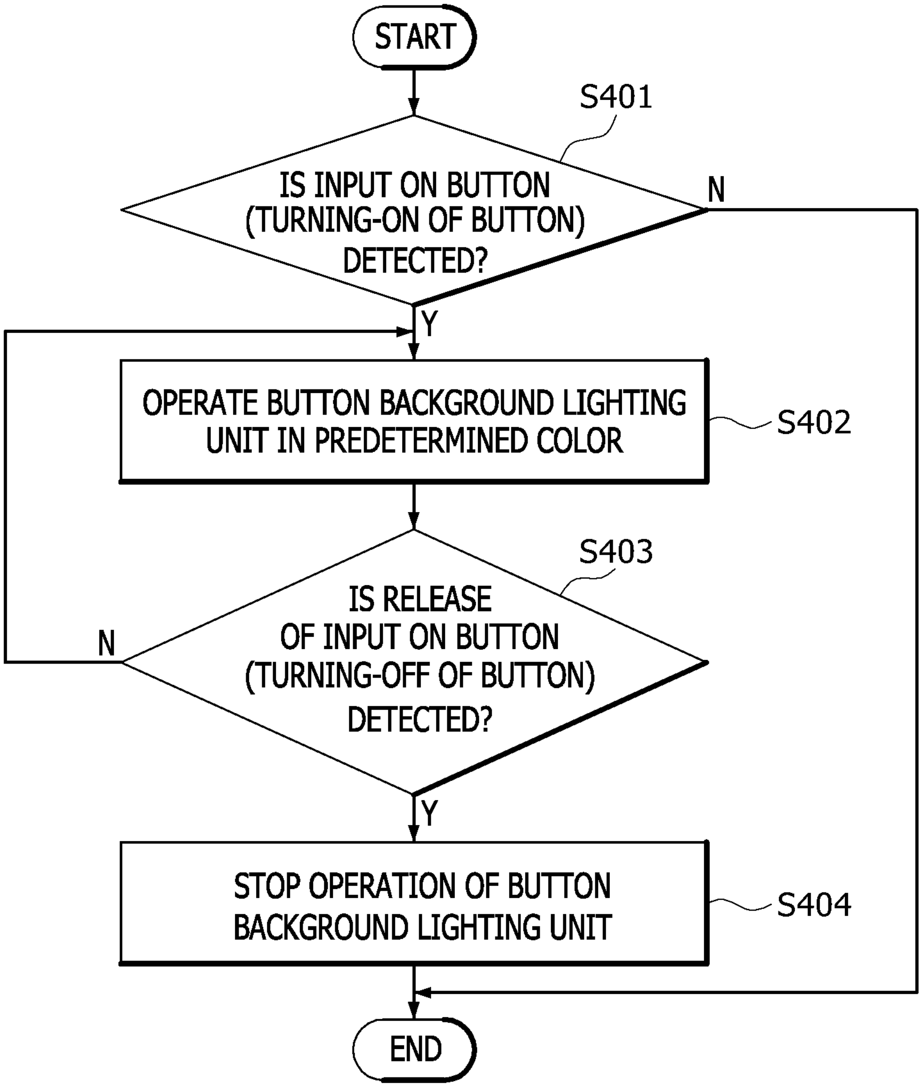
FIG. 46 shows a flowchart for describing a method of controlling a background lighting device for an electrostatic button according to a first embodiment of the present invention.

FIG. 46 is a flowchart for describing a method of controlling a background lighting device for an electrostatic button according to a first embodiment of the present invention.

Referring to FIG. 46, when an input on the electrostatic button 100 (that is, pressing, turning-on, etc.) is detected (Yes in S401), the controller 330 operates the button background lighting unit 360 in a predetermined color (or a predetermined pattern) based on data prestored in the storage unit 320 (S402).

For example, when an input is made on the electrostatic button 100, the controller 330 may operate the lighting of the button background lighting unit 360 so that light is emitted only in white (or red, yellow, blue, etc.). Alternatively, the controller 330 may operate the lighting of the button background lighting unit 360 so that light is emitted in a random color among possible colors (for example, white, red, yellow, blue, etc.) every time an input is made on the electrostatic button 100 (or every predetermined unit time while the input is made). Alternatively, the controller 330 may operate the lighting of the button background lighting unit 360 so that light is sequentially emitted in different colors according to a predetermined order (for example, white→red→yellow→blue) every time an input is made on the electrostatic button 100 (or every predetermined unit time while the input is made).

When a release of the input on the electrostatic button 100 (that is, non-pressing, turning-off, etc.) is detected (Yes in S403), the controller 330 stops the operation of the button background lighting unit 360 that is being operated using any one of the methods described above (S404).

Figure 47:
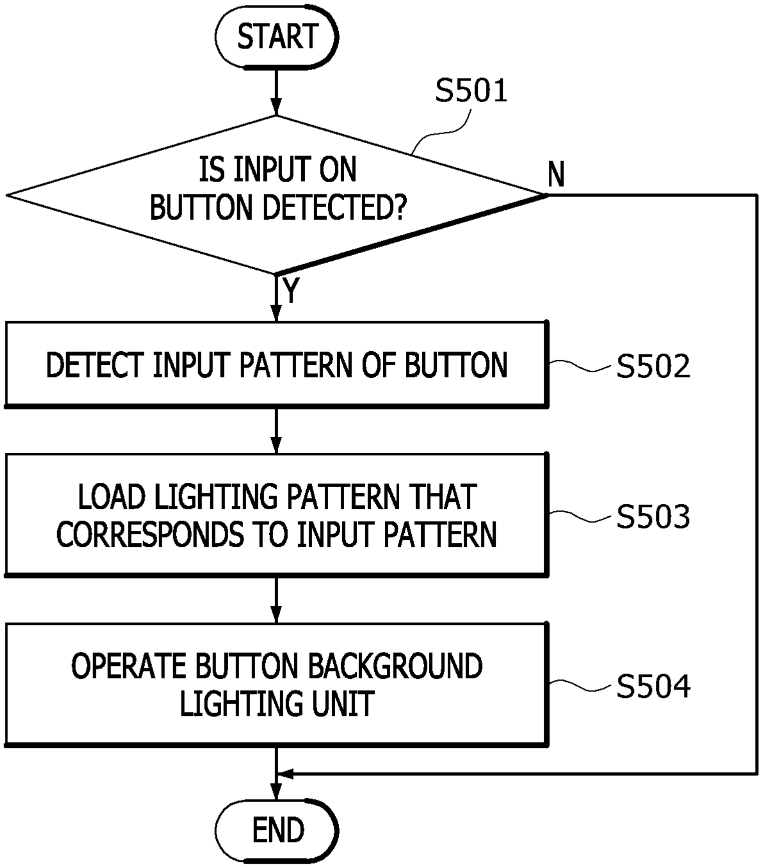
FIG. 47 shows a flowchart for describing a method of controlling a background lighting device for an electrostatic button according to a second embodiment of the present invention.

FIG. 47 is a flowchart for describing a method of controlling a background lighting device for an electrostatic button according to a second embodiment of the present invention.

Referring to FIG. 47, when an input on the electrostatic button 100 (that is, pressing, turning-on, etc.) is detected (Yes in S501), the controller 330 detects an input pattern of the electrostatic button 100 (that is, a continued pattern of a pressing time and a non-pressing time) (S502).

Also, among lighting patterns prestored in the storage unit 320 (that is, patterns wherein the color of the lighting, the on/off time of the lighting, and the order of the lighting to be operated are predetermined), the controller 330 loads a lighting pattern that corresponds to the input pattern of the electrostatic button 100 (that is, the continued pattern of the pressing time and the non-pressing time) (S503) and operates the button background lighting unit 360 according to the lighting pattern (S504).

For example, when an input is made on the electrostatic button 100 with a first input pattern, the controller 330 may operate the button background lighting unit 360 according to a first lighting pattern, when an input is made on the electrostatic button 100 with a second input pattern, the controller 330 may operate the button background lighting unit 360 according to a second lighting pattern, and when an input is made on the electrostatic button 100 with a third input pattern, the controller 330 may operate the button background lighting unit 360 according to a third lighting pattern.

Figure 48:
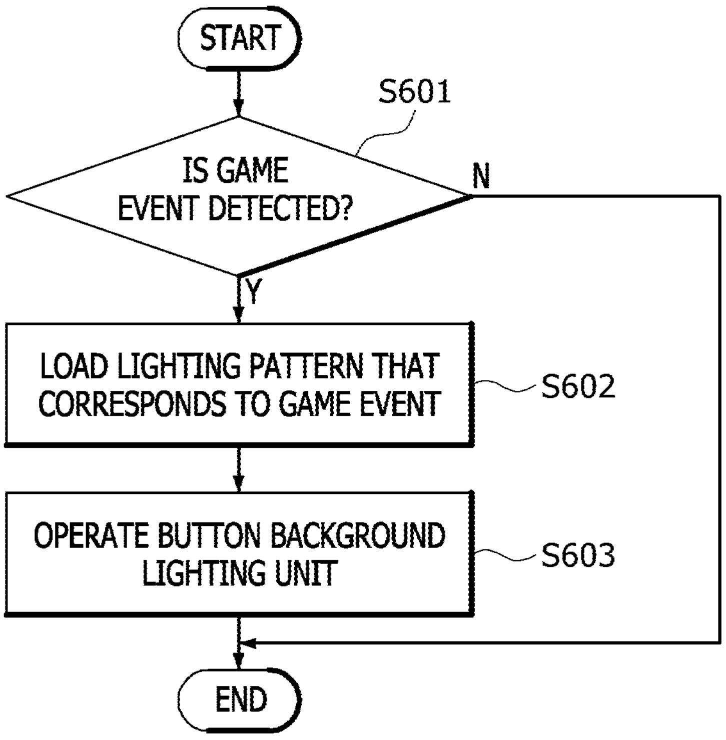
FIG. 48 shows a flowchart for describing a method of controlling a background lighting device for an electrostatic button according to a third embodiment of the present invention.

FIG. 48 is a flowchart for describing a method of controlling a background lighting device for an electrostatic button according to a third embodiment of the present invention.

Referring to FIG. 48, when occurrence of a game event (for example, a game event such as a jackpot, a warning, a bonus, or a victory/defeat) (or a predetermined event of a computing device) is detected regardless of an input on the electrostatic button 100 (Yes in S601), among lighting patterns prestored in the storage unit 320 (that is, patterns wherein the color of the lighting, the on/off time of the lighting, and the order of the lighting to be operated are predetermined), the controller 330 loads a lighting pattern that corresponds to the game event (S602) and operates the button background lighting unit 360 according to the lighting pattern (S603).

Figure 49:
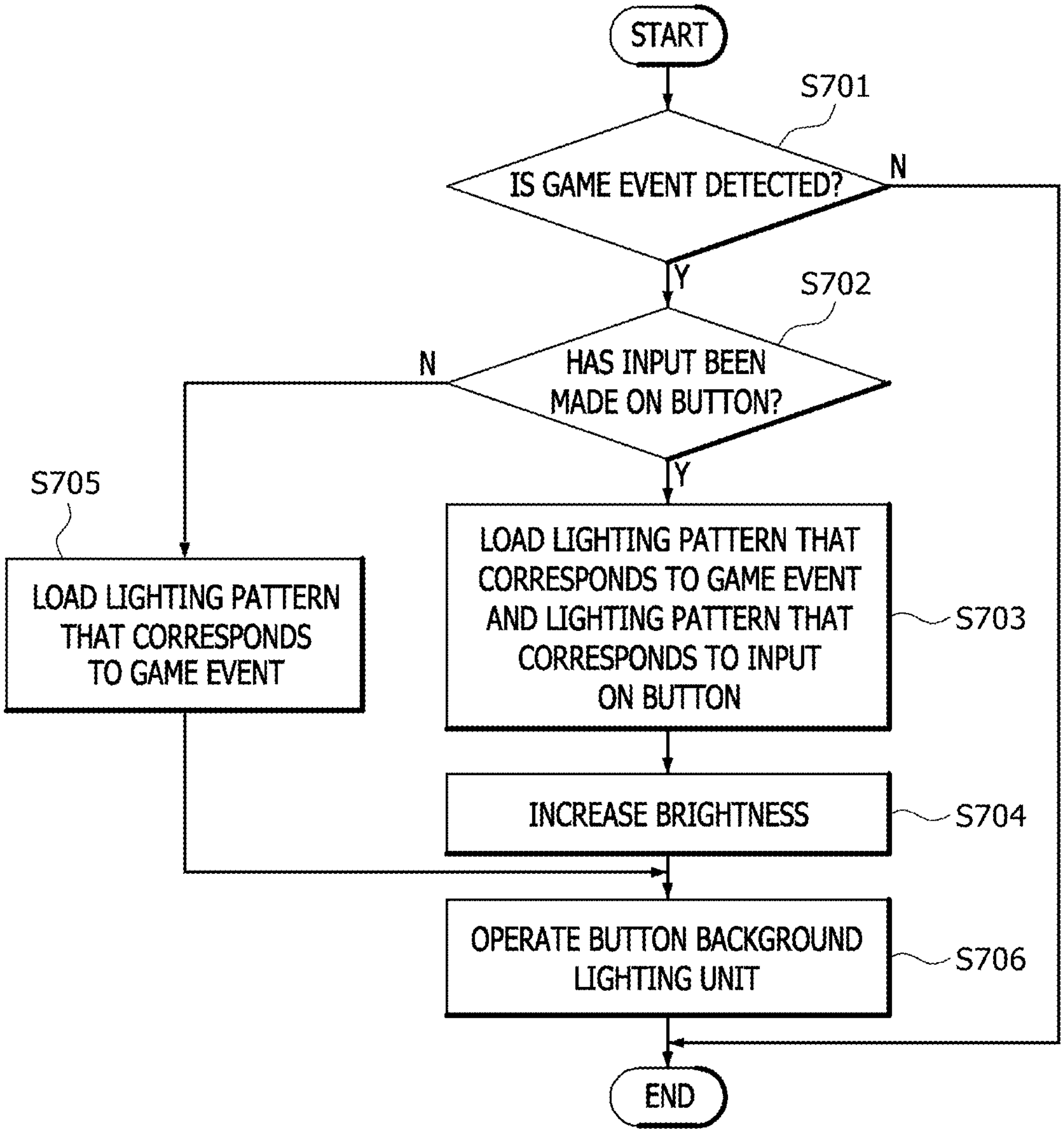
FIG. 49 shows a flowchart for describing a method of controlling a background lighting device for an electrostatic button according to a fourth embodiment of the present invention.

FIG. 49 is a flowchart for describing a method of controlling a background lighting device for an electrostatic button according to a fourth embodiment of the present invention.

Referring to FIG. 49, when occurrence of a game event (for example, a game event such as a jackpot, a warning, a bonus, or a victory/defeat) (or a predetermined event of a computing device) is detected (Yes in S701), the controller 330 checks whether an input has been made on the electrostatic button 100 (that is, whether the electrostatic button 100 has been pressed or turned on) (S702).

Accordingly, when an input has been made on the button at the time of occurrence of the game event as described above (Yes in S701 and Yes in S702), among lighting patterns prestored in the storage unit 320, the controller 330 loads both a lighting pattern that corresponds to the game event (a first lighting pattern) and a lighting pattern that corresponds to the input on the button (a second lighting pattern) (S703), increases brightness of the lighting (S704), and then combines the two lighting patterns (the first lighting pattern and the second lighting pattern) to operate the button background lighting unit 360 (S706).

However, when an input has not been made on the button at the time of occurrence of the game event (Yes in S701 and No in S702), among the lighting patterns prestored in the storage unit 320, the controller 330 loads only the lighting pattern that corresponds to the game event (the first lighting pattern) (S705), and operates the button background lighting unit 360 (S706).

As described above, in the present embodiment, even when a lighting and a power device are not installed in the electrostatic button 100 that is attachable to and detachable from a surface of a touchscreen of a computing device using the touchscreen, such as a game machine (for example, a casino game machine), a background of the electrostatic button 100 can be adaptively illuminated according to a situation in response to an operation of the electrostatic button 100 or a game event (that is, a specific event that occurs in the computing device). In this way, there is an effect of allowing a user to feel a visual input effect.

Embodiments of the present invention have been described above with reference to the embodiments illustrated in the drawings, but the embodiments are only illustrative, and those of ordinary skill in the conventional art should understand that various modifications and other equivalent embodiments are possible from the embodiments described herein. Therefore, the technical protection scope of embodiments of the present invention should be defined by the claims below. Also, for example, the implementations described herein may be implemented using a method or process, a device, a software program, a data stream, or a signal. Even when discussion is made only in the context of a single form of implementation (for example, only in the context of a method), the discussed features may also be implemented with another form of implementation (for example, a device or a program). The device may be implemented using appropriate hardware, software, firmware, and the like. For example, the method may be implemented in a device such as a processor which is generally a processing device including a computer, a microprocessor, an integrated circuit, or a programmable logic device. The processor also includes a communication device such as a computer that facilitates communication of information with an end-user, a cellphone, a portable/personal information terminal (personal digital assistant: "PDA"), and other devices.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A background lighting device for an electrostatic button, the background lighting device comprising:

a printed circuit board formed in a shape corresponding to an outer shape of the electrostatic button;

a plurality of light sources attached at predetermined intervals onto the printed circuit board;

a cable connected to the printed circuit board to provide a signal for applying power to the plurality of light sources and driving the same, wherein the cable includes a flexible flat cable, and the printed circuit board and the FFC are formed of a transparent material;

a lighting diffuser formed at an upper side of a button background lighting unit formed by integrating the printed circuit board, the light sources, and the cable; and a lighting barrier formed at a circumferential portion of the button background lighting unit, wherein the lighting diffuser implements lighting to be projected only to a background portion which is a lower side of the electrostatic button.

2. The background lighting device of claim 1, wherein:

the printed circuit board, the light sources, and the cable are integrated to form a button background lighting unit; and the button background lighting unit is installed in an air gap region formed between a display panel and a glass portion of a touchscreen.

3. The background lighting device of claim 1, wherein on a lower side surface of a glass portion installed at an upper portion of the button background lighting unit, up to a boundary portion of the lighting barrier in a remaining region excluding a region wherein the lighting diffuser is formed, a lighting barrier is further formed or attached.

4. The background lighting device of claim 1, wherein:

the lighting diffuser is formed of a white material to improve a lighting diffusion effect; and the lighting barrier is formed of a black material to improve a lighting blocking effect.

5. The background lighting device of claim 1, wherein:

the electrostatic button further includes a lighting diffuser formed at an upper side of a support unit that is in close contact with a glass portion in a frame body portion; and the lighting diffuser is implemented to receive lighting emitted from light sources of a button background lighting unit and diffuse the lighting to an outer side of the support unit.

6. A method of controlling a background lighting device for an electrostatic button, the method comprising:

detecting an input on the electrostatic button, by a controller of the background lighting device for the electrostatic button;

operating a button background lighting unit, by the controller, in a predetermined color or a predetermined pattern based on data prestored in a storage unit, in response to the input on the electrostatic button being detected; and stopping the operation of the button background lighting unit, by the controller, that is being operated in the predetermined color or the predetermined pattern, in response to a release of the input on the electrostatic button being detected;

wherein the background lighting device includes a printed circuit board formed in a shape corresponding to an outer shape of the electrostatic button, a plurality of light sources attached at predetermined intervals onto the printed circuit board, a cable connected to the printed circuit board to provide a signal for applying power to the plurality of light sources and driving the same, wherein the cable includes a flexible flat cable, and the printed circuit board and the FFC are formed of a transparent material, a lighting diffuser formed at an upper side of the button background lighting unit formed by integrating the printed circuit board, the light sources, and the cable, and a lighting barrier formed at a circumferential portion of the button background lighting unit, wherein the lighting diffuser implements lighting to be projected only to a background portion which is a lower side of the electrostatic button.

7. The method of claim 6, wherein in the operating of the button background lighting unit, the controller:

operating a lighting of the button background lighting unit so that light is emitted only in one fixed color in response to an input made on the electrostatic button;

operating the lighting of the button background lighting unit so that light is emitted in one random color among possible colors every time an input is made on the electrostatic button or every predetermined unit time while the input is made on the electrostatic button; and operating the lighting of the button background lighting unit so that light is sequentially emitted in different colors according to a predetermined order every time an input is made on the electrostatic button or every predetermined unit time while the input is made on the electrostatic button.

8. The method of claim 6, further comprising, in a case where an input on the electrostatic button is detected:

detecting, by the controller, an input pattern of the electrostatic button;

loading a lighting pattern, by the controller, that corresponds to the input pattern of the electrostatic button from the storage unit; and by the controller, operating, by the controller, the button background lighting unit according to the lighting pattern.

9. The method of claim 8, wherein:

the input pattern is a continued pattern of a pressing time and a non-pressing time of the electrostatic button; and the lighting pattern is a pattern wherein a color of the lighting, an on/off time of the lighting, and an order of the lighting to be operated are predetermined.

10. The method of claim 6, further comprising:

detecting, by the controller, occurrence of a predetermined event;

checking, by the controller, whether an input has been made on the electrostatic button when the occurrence of the predetermined event is detected;

loading, by the controller, both a lighting pattern that corresponds to the predetermined event and a lighting pattern that corresponds to the input on the button among lighting patterns prestored in the storage unit, in a case where an input has been made on the button at the time of the occurrence of the predetermined event; and further increasing, by the controller, brightness of the lighting and then combining the two lighting patterns to operate the button background lighting unit.

11. The method of claim 10, further comprising loading, by the controller, only the lighting pattern that corresponds to the predetermined event among the lighting patterns prestored in the storage unit and operating the button background lighting unit in a case where an input has not been made on the button at the time of the occurrence of the predetermined event.

* * * * *